United States Patent
Chen

(10) Patent No.: US 9,229,721 B2
(45) Date of Patent: Jan. 5, 2016

(54) EXECUTING SUBROUTINES IN A MULTI-THREADED PROCESSING SYSTEM

(75) Inventor: Lin Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 625 days.

(21) Appl. No.: 13/608,668

(22) Filed: Sep. 10, 2012

(65) Prior Publication Data

US 2014/0075165 A1    Mar. 13, 2014

(51) Int. Cl.
*G06F 9/32* (2006.01)
*G06F 9/38* (2006.01)

(52) U.S. Cl.
CPC .............. *G06F 9/322* (2013.01); *G06F 9/3851* (2013.01); *G06F 9/3887* (2013.01)

(58) Field of Classification Search
None
See application file for complete search history.

(56) References Cited

U.S. PATENT DOCUMENTS

| | | | |
|---|---|---|---|
| 4,435,758 A | | 3/1984 | Lorie et al. |
| 5,522,083 A * | | 5/1996 | Gove et al. ...................... 712/22 |
| 5,555,428 A | | 9/1996 | Radigan et al. |
| 5,689,677 A | | 11/1997 | MacMillan |
| 6,272,616 B1 * | | 8/2001 | Fernando et al. ............... 712/20 |
| 6,947,047 B1 | | 9/2005 | Moy et al. |
| 7,366,879 B2 | | 4/2008 | Rodgers et al. |
| 7,477,255 B1 | | 1/2009 | Lindholm et al. |
| 7,543,136 B1 | | 6/2009 | Coon et al. |
| 7,617,384 B1 | | 11/2009 | Coon et al. |
| 7,761,697 B1 | | 7/2010 | Coon et al. |
| 7,788,468 B1 | | 8/2010 | Nickolls et al. |
| 7,877,585 B1 | | 1/2011 | Coon et al. |
| 7,890,735 B2 | | 2/2011 | Tran |
| 8,438,554 B1 * | | 5/2013 | Grover et al. .................. 717/154 |
| 2005/0050305 A1 | | 3/2005 | Kissell |
| 2006/0004989 A1 * | | 1/2006 | Golla ............................. 712/214 |
| 2007/0234019 A1 | | 10/2007 | Terashima |
| 2009/0240931 A1 | | 9/2009 | Coon et al. |
| 2011/0072248 A1 | | 3/2011 | Nickolls et al. |
| 2011/0078417 A1 | | 3/2011 | Fahs et al. |

(Continued)

OTHER PUBLICATIONS

Collange, "Une architecture unifiee pour traiter la divergence de controle et la divergence memoire en SIMT", Symposium en Architectures, Saint-Malo, France, May 11, 2011, 13 pp., English translation of abstract only.

(Continued)

*Primary Examiner* — Corey S Faherty
(74) *Attorney, Agent, or Firm* — Shumaker & Sieffert, P.A.

(57) ABSTRACT

This disclosure is directed to techniques for executing subroutines in a single instruction, multiple data (SIMD) processing system that is subject to divergent thread conditions. In particular, a resume counter-based approach for managing divergent thread state is described that utilizes program module-specific minimum resume counters (MINRCs) for the efficient processing of control flow instructions. In some examples, the techniques of this disclosure may include using a main program MINRC to control the execution of a main program module and subroutine-specific MINRCs to control the execution of subroutine program modules. Techniques are also described for managing the main program MINRC and subroutine-specific MINRCs when subroutine call and return instructions are executed. Techniques are also described for updating a subroutine-specific MINRC to ensure that the updated MINRC value for the subroutine-specific MINRC is within the program space allocated for the subroutine.

40 Claims, 28 Drawing Sheets

(56) References Cited

U.S. PATENT DOCUMENTS

2011/0078690 A1     3/2011    Fahs et al.
2014/0047223 A1     2/2014    Chen et al.

OTHER PUBLICATIONS

Oh et al., "Exploiting Thread-Level Parallelism in Lockstep Execution by Partially Duplicating a Single Pipeline," ETRI Journal, vol. 30, No. 4, Aug. 2008, pp. 576-586.

U.S. Appl. No. 13/227,274, by Lin Chen, filed Sep. 7, 2011.

U.S. Appl. No. 13/624,657, by Lin Chen, filed Sep. 21, 2012.

Brunie et al., "Simultaneous branch and warp interweaving for sustained GPU performance," 2012 39th Annual International Symposium on Computer Architecture (ISCA), Jun. 9-13, 2012, XP032200021, DOI: 10.11 09/ISCA.2012.E1237005, ISBN: 978-1-4673-0475-7, pp. 49-60.

Diamos et al., "SIMD Re-Convergence At Thread Frontiers", Proceedings of the 44th Annual IEEE/ACM International Symposium on Microarchitecture, Dec. 3-7, 2011, XP055056138, DOI: 10.1145/2155620.2155676, pp. 477-488.

International Search Report and Written Opinion—PCT/US2013/054148—ISA/EPO—Jan. 21, 2014, 12 pages.

Meng et al., "Dynamic warp subdivision for integrated branch and memory divergence tolerance," ACM SIGARCH Computer Architecture News, vol. 38, Jun. 19-23, 2010, XP055092509, ISSN: 0163-5964, DOI: 10.1145/1815961.1815992, pp. 235-246.

Collange, "Stack-less SIMT reconvergence at low cost," Sep. 12, 2011, XP055038110, 11 pp.

Wu et al., "Characterization and Transformation of Unstructured Control flow in GPU Applications," Proceedings of the First International Workshop on Characterizing Applications for heterogeneous Exascale Systems, CACHES'11, Jun. 4, 2011, 8 pp. XP055056141.

\* cited by examiner

| OLD STATE | NEW STATE | Event | ACTION |
|---|---|---|---|
| State 0 | State 0 | S | PC+1 |
| | | Jb | Jump to target |
| | | BfuF | PC+1 |
| | | BbuT | Branch to target uniformly |
| | | BbuF | PC+1 |
| | | JfL | Jump to target |
| | | BfuTL | Branch to target uniformly |
| | | Call | Jump to subroutine entry point |
| | | Ret | Jump to return address |
| State 0 | State 1 | Bbd | Branch to target. Active threads with false condition become inactive. |
| | | Bfd | PC+1. Active threads with true condition become inactive. |
| State 1 | State 0 | n/a | Resume. All inactive threads become active |
| State 1 | State 1 | S | PC+1 |
| | | Jb | Jump to target |
| | | BbuF | PC+1 |
| | | BbuT | Branch to target uniformly |
| | | BfuF | PC+1 |
| | | Bbd | Branch to target. Active threads with false condition become inactive. |
| | | Bfd | PC+1. Active threads with true condition become inactive. |
| | | n/a | Resume. Some inactive threads become active. |
| | | JfL | Jump to target |
| | | BfuTL | Branch to target uniformly |
| | | Call | Jump to subroutine entry point |
| | | Ret | Jump to return address |
| State 1 | State 2 | JfG | Jump to MINRC. All active threads become inactive. |
| | | BfuTG | Jump to MINRC. All active threads become inactive. |
| State 2 | State 0 | n/a | Resume. All inactive threads become active. |
| State 2 | State 1 | n/a | Resume. Some inactive threads become active |
| State 2 | State 2 | JfL | Jump to target |
| | | JfG | Jump to MINRC |
| | | Other event | PC+1 |

FIG. 21

Behavior of resume check before executing each instruction:
{
  for each inactive thread {
    if(RC == PC) {
      active flag = TRUE;
      RC = MAX;
    }
  }
  updateMINRC();
}

FIG. 22

Behavior of JUMP instruction:
{
  if(backward jump) {// Jb
    if(any thread is active) // state 0 or state 1
      jump to target; // full range jump
    else // state 2
      PC++;
  }
  else { // jump forward
    if(target <= MINRC) // JfL , state 0, 1, or 2
      jump to target; // full range jump
    else { // JfG, state 1 or 2
      for each active thread {
        active flag = FALSE;
        RC = target;
      }
      Jump to MINRC;
    }
  }
}

FIG. 23

Behavior of BRANCH instruction:
{
  if(backward branching) {
    if(any thread is active) { // state 0 or state 1
      if(all active threads are uniform) {
        if(condition satisfied) // BbuT
          jump to target;
        else // BbuF
          PC++;
      } else { // Bbd
        for each active thread {
          if(condition not satisfied) {
            active flag = FALSE;
            RC = PC + 1;
          }
        }
        updateMINRC(); // MINRC = PC + 1 in this case
        jump to target;
      }
    } else // state 2
      PC++;
  } else { // forward branching
    if(all active threads are uniform) {
      if(condition satisfied) { // state 0 or state 1
        if(target <= MINRC) // BfuTL
          jump to target; // full range jump
        else { // BfuTG, state 1 only
          for each active thread {
            active flag = FLASE;
            RC = target;
          }
          jump to MINRC; // partial range jump
        }
      } else // BfuF, state 0, 1, or 2
        PC++; // no jump
    } else { // Bfd, state 0 or state 1
      for each active thread with condition satisfied {
        active flag = FALSE;
        RC = target;
      }
      updateMINRC();
      PC++; // no jump
    }
  }
}

FIG. 24

Behavior of CALL instruction:
{
    MINRC_stack.push(MINRC);        // store MINRC of caller
    MINRC = MAX;                      // initialize MINRC of callee
    call_stack.push(return address);   // store return address
    PC = target;                       // jump to subroutine entry point
}

FIG. 25

Behavior of RETURN instruction:
{
    if(call_stack is not empty)
    {
        MINRC = MINRC_stack.pop();   // restore MINRC of caller
        PC = call_stack.pop();        // get the return address and jump to the address
    }
    else
        terminates;
}

FIG. 26

```
updateMINRC()
{
   for each inactive thread {
      if(RC < MINRC and RC >= entry point)
         MINRC = RC;
   }
}
```

FIG. 27

```
updateMINRC()
{
   for each inactive thread {
      if(RC < MINRC and originalActiveFlag == ACTIVE)
         MINRC = RC;
   }
}
```

FIG. 28

EXECUTING SUBROUTINES IN A MULTI-THREADED PROCESSING SYSTEM

TECHNICAL FIELD

The disclosure relates to multi-threaded processing and, more particularly, to techniques for executing subroutines in a multi-threaded processing system.

BACKGROUND

A single instruction, multiple data (SIMD) processing system is a type of parallel computing system that includes multiple processing elements which execute the same instruction on multiple pieces of data. A SIMD system may be a standalone computer or a sub-system of a computing system. For example, one or more SIMD execution units may be used in a graphics processing unit (GPU) to implement a programmable shading unit that supports programmable shading.

A SIMD processing system allows multiple threads of execution for a program to execute synchronously on the multiple processing elements in a parallel manner, thereby increasing the throughput for programs where the same set of operations needs to be performed on multiple pieces of data. Because each thread operates on different data, if a program includes conditional branch instructions, it is possible that the branch condition may be satisfied for some of the threads executing in the system and not satisfied for other threads executing in the system. Such a condition may be referred to as a divergent branch condition and results in the SIMD system not being able to execute all of the threads in a synchronous fashion on the multiple processing elements.

SUMMARY

This disclosure is directed to techniques for executing subroutines in a single instruction, multiple data (SIMD) processing system that is subject to divergent thread conditions. In particular, a resume counter-based approach for managing divergent threads is described that utilizes program module-specific minimum resume counters (MINRCs) for the efficient processing of control flow instructions. As used herein, a program module may refer to a main program module (e.g., a top-level program module) or a subroutine program module. As such, each subroutine that is executed in the processing system may use a subroutine-specific MINRC to control the processing of control flow instructions included in the subroutine. The use of program module-specific MINRCs allows a system that implements MINRC-based control flow to support the execution of subroutine program instructions.

In one example, this disclosure describes a method that includes controlling, with one or more processors, execution of a program based on a first MINRC. The first MINRC specifies a value that is indicative of a smallest resume counter value of a plurality of resume counter values associated with a plurality of threads of execution for the program. The method further includes controlling, with the one or more processors, execution of a subroutine of the program based on a second MINRC associated with the subroutine. The second MINRC specifies a value indicative of a smallest resume counter value from a subset of the plurality of resume counter values that corresponds to all of the threads that are active when execution of the subroutine is initiated.

In another example, this disclosure describes a system that includes one or more processors configured to control execution of a program based on a first MINRC and control execution of a subroutine of the program based on a second MINRC associated with the subroutine. The first MINRC specifies a value that is indicative of a smallest resume counter value of a plurality of resume counter values associated with a plurality of threads of execution for the program. The second MINRC specifies a value indicative of a smallest resume counter value from a subset of the plurality of resume counter values that corresponds to all of the threads that are active when execution of the subroutine is initiated.

In another example, this disclosure describes an apparatus that includes means for controlling execution of a program based on a first MINRC. The first MINRC specifies a value that is indicative of a smallest resume counter value of a plurality of resume counter values associated with a plurality of threads of execution for the program. The apparatus further includes means for controlling execution of a subroutine of the program based on a second MINRC associated with the subroutine. The second MINRC specifies a value indicative of a smallest resume counter value from a subset of the plurality of resume counter values that corresponds to all of the threads that are active when execution of the subroutine is initiated.

In another example, this disclosure describes a computer-readable storage medium storing instructions that, when executed, cause one or more processors to control execution of a program based on a first MINRC. The first MINRC specifies a value that is indicative of a smallest resume counter value of a plurality of resume counter values associated with a plurality of threads of execution for the program. The instructions further cause the one or more processors to control execution of a subroutine of the program based on a second MINRC associated with the subroutine. The second MINRC specifies a value indicative of a smallest resume counter value from a subset of the plurality of resume counter values that corresponds to all of the threads that are active when execution of the subroutine is initiated.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 21 is a state transition table that characterizes exemplary operation of the control flow module illustrated in FIG. 19 according to this disclosure.

FIGS. 22-28 illustrate example pseudo-code for implementing the subroutine execution techniques of this disclosure.

DETAILED DESCRIPTION

Figure 1:
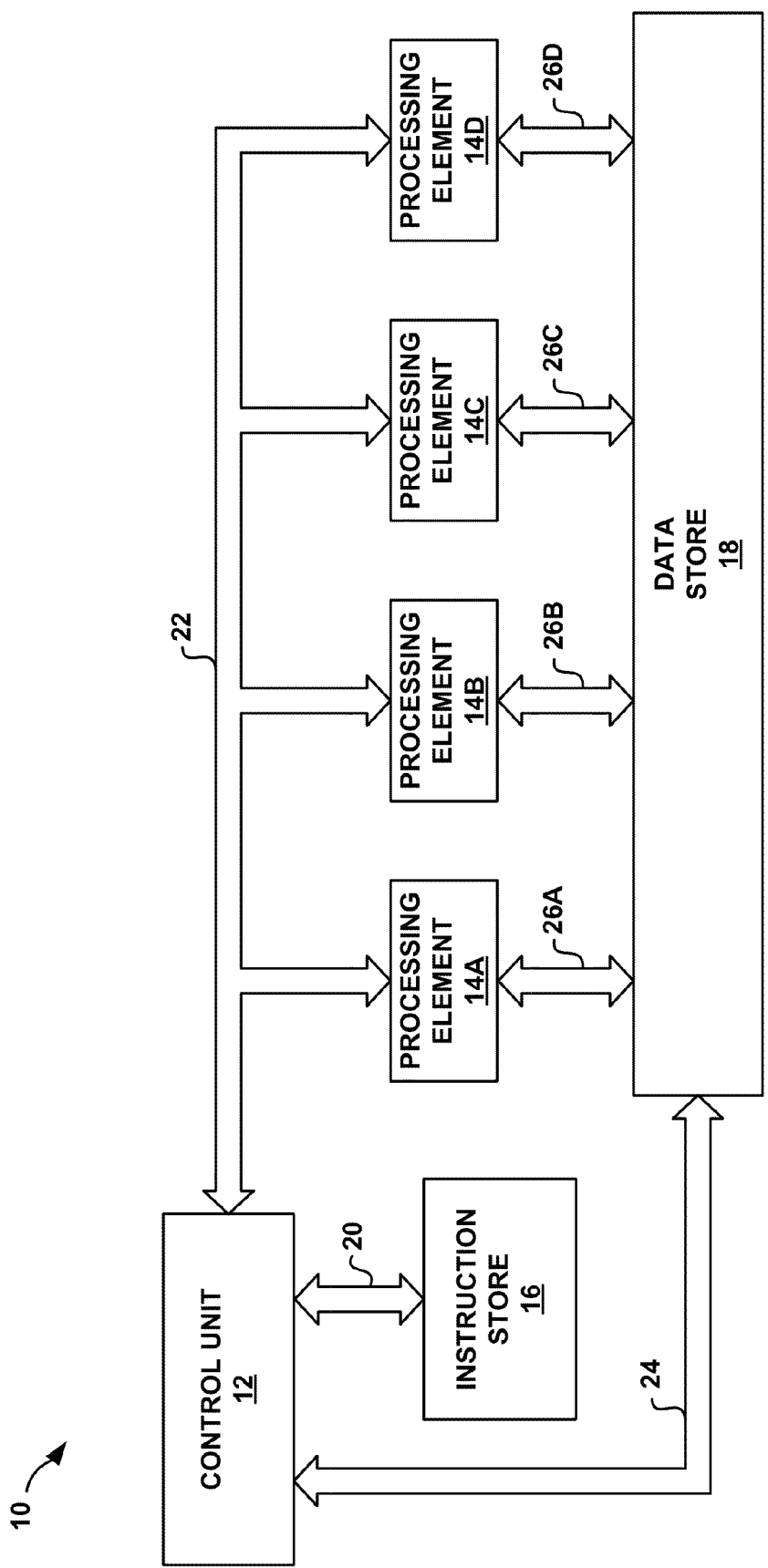
FIG. 1 is a block diagram illustrating an example processing system that may be used to implement the subroutine execution techniques of this disclosure.

This disclosure is directed to techniques for executing subroutines in a single instruction, multiple data (SIMD) processing system that is subject to divergent thread conditions. In particular, a resume counter-based approach for managing divergent threads is described that utilizes program module-specific minimum resume counters (MINRCs) for the efficient processing of control flow instructions. As used herein, a program module may refer to a main program module (e.g., a top-level program module) or a subroutine program module. As such, each subroutine that is executed in the processing system may use a subroutine-specific MINRC to control the processing of control flow instructions included in the subroutine. The use of program module-specific MINRCs allows a system that implements MINRC-based control flow to support the execution of subroutine program instructions.

In some examples, the techniques of this disclosure may include using a main program MINRC to control the execution of a main program and subroutine-specific MINRCs to control the execution of subroutines that are called by the main program or by other subroutines. The main program MINRC value may be indicative of a smallest resume counter value from a set of one or more resume counter values that corresponds to all threads that are active when execution of the main program is initiated, which is typically all of the threads executing in the system. Similarly, each subroutine-specific MINRC may specify a value that is indicative of a smallest resume counter value from a set of one or more resume counter values that corresponds to all threads that are active when execution of the respective subroutine is initiated. Each resume counter value may correspond to a respective one of a plurality of threads executing on the processing system, and if the respective thread is inactive, the resume counter value may be indicative of a program counter value at which the inactive thread is scheduled to be reactivated.

The MINRC that is currently controlling execution of the processing system may be used to control which instruction is executed after a forward jump instruction or after a forward branch instruction when one or more threads are deactivated. For example, in certain cases, after executing a forward jump instruction or a forward branch instruction, the processing system may select an instruction indicated by the MINRC as the next instruction to be executed. By using separate MINRCs for the main program and for each of the subroutines, the processing system may ensure that subroutines do not branch from a subroutine into the main program or into another subroutine outside of the execution of a call or return instruction. In this way, the techniques of this disclosure may ensure proper control flow for the execution of subroutines in a processing system that uses MINRCs to control the execution of forward jump instructions and forward branch instructions.

According to some aspects of this disclosure, techniques are described for switching a MINRC that is used to control execution of a processing system upon entry and exit of a subroutine. For example, in response to executing a call instruction, the processing system may be configured to save a state of a MINRC corresponding to the caller program, to initialize a new MINRC corresponding to the subroutine program, and to control execution of the subroutine based on the MINRC that corresponds to the subroutine program. In response to executing a return instruction, the processing system may be configured to restore the saved state of the MINRC that corresponds to the caller program, and to resume controlling execution of the caller program based on the restored state of MINRC.

According to some aspects of this disclosure, techniques are described for updating a MINRC value in response to activating and/or deactivating one or more threads in the processing system. In general, to update the MINRC value, the processing system may determine a candidate set of resume counter values for use in determining the MINRC value, and set the MINRC to a value that is indicative of a smallest resume counter value from the candidate set of resume counter values. The candidate set of resume counter values may be a subset of the entire set of resume counter values that corresponds to all threads executing in the processing system. The candidate set of resume counter values may, in some cases, exclude one or more resume counter values that correspond to threads that were not active when execution of the currently executing program module was initiated. By excluding such resume counter values from consideration while updating the MINRC, the techniques of this disclosure may ensure that a subroutine-specific MINRC is updated to values that are within the program space associated with the subroutine.

If an instruction set architecture (ISA) of a SIMD processing system supports control flow instructions, all threads may be controlled by a single control flow unit that includes a single program counter. Because each thread operates on different data, it is possible that the branch condition for a particular branch instruction may be satisfied for some of the threads executing in the system and not satisfied for other threads executing in the system. If the condition specified by a particular conditional branch instruction is either satisfied or not satisfied for all of the active threads executing in the system, then the branching divergence for the branch instruction is said to be uniform. Otherwise, if the condition is satisfied for some of the active threads and not satisfied for others of the active threads, then the branching divergence for the branch instruction is said to be divergent. If a divergent branch happens, the next instruction that is scheduled to be executed for some of the active threads may be different than the next instruction that is scheduled to be executed for others of the active threads. This may result in the SIMD processing system not being able to execute all of the threads in a lock-step fashion.

To deal with a divergent branch instruction, the techniques of this disclosure may, in some examples, deactivate one subset of the threads that either satisfied or did not satisfy the branch condition such that the remaining active threads are all synchronized to execute the same next instruction. To control the reactivation of the deactivated threads, the techniques of this disclosure may use a resume counter-based approach that involves allocating a resume counter for each thread executing in the processing system, setting the resume counter for each thread being deactivated to a value that is indicative of a program counter value at which the respective thread should be reactivated, and performing a resume check operation prior to the execution of every instruction.

For example, the resume counter-based approach may deactivate one or more threads in response to a divergent branch condition and, for each thread being deactivated, set a resume counter (e.g., a register) for the respective thread to a value indicative of a program counter value that corresponds to a next instruction to be executed by the deactivated thread. If a thread is active, the resume counter for the thread may be set to a default value. In some examples, the default value may be an "infinite value" that corresponds to a value greater than the address range of the program (e.g., a maximum register value). Each time the program counter register is loaded with a new program counter value, a resume check operation may be performed, which may reactivate any threads where the resume counter value for the thread is equal to the new program counter value.

To ensure that proper control flow is maintained in a processing system that uses the above-described resume counter-based approach for thread reactivation, the processing system may use a "least-valued address first" thread processing order. In general, the "least-valued address first" thread processing order may refer to a processing order where threads that are scheduled to process instructions at lower-valued addresses are executed prior to threads that are scheduled to process instructions at higher-valued addresses. Such a processing order may prevent the control flow from jumping over any resume points for inactive threads without first reactivating such threads. In other words, such a processing order may ensure that all threads will be active and will have completed processing by the time the last program statement has finished execution.

The "least-valued address first" thread processing order may differentiate which threads are deactivated in response to a divergent branch instruction based on the direction (i.e., forward or backward) of the branch instruction. For a divergent backward branch instruction, the techniques of this disclosure may deactivate threads for which the branching condition is not satisfied, set the resume counter value for each thread being deactivated to a value associated with a next sequential instruction that occurs after the branch instruction, load the program counter with a value associated with a target instruction specified by the branch instruction, and proceed to execute those threads for which the branching condition is satisfied. For a divergent forward branch instruction, the techniques of this disclosure may deactivate threads for which the branching condition is satisfied, set the resume counter value for each thread being deactivated to a value associated with a target instruction specified by the branch instruction, load the program counter with a value associated with a next sequential instruction that occurs after the branch instruction, and proceed to execute those threads for which the branching condition is not satisfied. Deactivating threads in this manner ensures that divergent threads that are scheduled to process instructions at lower-valued addresses execute prior to threads that are scheduled to process instructions at higher-valued addresses (i.e., a "least-valued address first" thread processing order).

In cases where one or more threads have already been deactivated and the remaining active threads execute either a forward jump instruction or a uniformly satisfied forward branch instruction (i.e., a forward branch instruction where the branching condition is uniformly satisfied for all active threads), one approach to handling the control flow may be to always jump to the target instruction specified in the forward jump or forward branch instruction because all active threads will remain active. Such an approach, however, does not guarantee a "least-valued address first" thread processing order. In particular, one or more inactive threads may, in some cases, have resume counter values that are between the current program counter value of the jump or branch instruction and the target program counter value (i.e., the program counter value associated with the target instruction specified in the branch or jump instruction). If the control flow were to jump over such inactive threads, it is possible that such threads would not be reactivated prior to finishing execution of the program.

To avoid such a situation, a global MINRC may be used that stores a value indicative of a smallest resume counter value from a set of resume counter values that correspond to all threads in the system. When any of the resume counters is set to a new value (e.g., upon deactivation of a thread), the MINRC may be updated to reflect the new smallest resume counter value. A processing system may use the MINRC to determine whether there are any resume points between a currently executed forward jump or forward branch instruction and the target instruction specified in the instruction, which in turn may be used to determine whether the processing system can jump directly to the target instruction without causing the system to skip over one or more resume points for inactive threads.

For example, when executing a forward jump instruction or a forward branch instruction that is uniformly satisfied, the processing system may compare the target program counter value specified by the jump or branch instruction to a MINRC value and select either the target program counter value or the MINRC value to load into the program counter based on the comparison. When the target program counter value is less than or equal to the MINRC value, the processing system may select the target program counter value as the value to load into the program counter. When the target program counter value is not less than or equal to the MINRC value, the processing system may select the MINRC as the value to load into the program counter. Because the MINRC value is indicative of the smallest resume counter value of all inactive threads, executing forward jumps and uniform forward branches in the above-described manner will ensure that the control flow does not skip over the resume points for any inactive threads. In this way, a MINRC may be used to ensure proper control flow when executing forward jump and forward branch instructions in a processing system that uses resume counters to control the reactivation of deactivated threads.

The MINRC-based approach for ensuring proper control flow of forward jump and forward branch instructions may also be more efficient than other techniques that may be used for the same purpose. For example, another technique for ensuring proper control flow may involve, whenever a forward jump instruction or a uniformly satisfied forward branch instruction is executed, deactivating all threads and incrementing the program counter sequentially through each program counter value between the current program counter value and the target program counter value so that any inactive threads that have resume counters values between the current program counter value and the target program counter value are properly reactivated and executed prior to executing the target instruction. Although such an approach may guarantee a "least-valued address first" thread processing order, such an approach may be less efficient than the MINRC-based approach. For example, in some cases, the resume counter values for all of the inactive threads may be greater than or equal to the target program counter value associated with the forward jump or branch instruction at issue. Sequentially traversing through each of the program counter values between the current instruction and the target instruction in such a situation may be inefficient due to wasted, dormant instruction cycles where no execution of any thread takes place.

Rather than sequentially traversing through each of the program counter values between the current instruction and the target instruction, the MINRC-based approach may directly load either the target program counter value or the MINRC value into the program counter in response to processing a forward jump instruction or a uniformly satisfied forward branch instruction. This allows the next instruction to be processed during the next instruction cycle without needing to have extra, dormant instruction cycles between execution of the current instruction and the next instruction. By allowing the next instruction to be processed during the next instruction cycle, the MINRC-based approach for control flow may improve the performance of forward jump and forward branch instructions relative to resume counter-based systems that do not use MINRCs.

One drawback of using a single, global MINRC value, however, is that such a value may not be adequate, in and of itself, to ensure proper control flow for programs that include subroutines. If a program includes a subroutine, it is possible that the global MINRC value may point to a program counter value that is located outside of the program space of the subroutine which is currently being executed. For example, one or more threads may have been deactivated in a main program module and the MINRC may have been set to a program counter value in the main program space that corresponds to the next instruction to be executed by such threads. Prior to executing the instruction at the program counter value in the main program space where the deactivated threads are scheduled to be reactivated, the remaining active threads may begin executing a subroutine. If a forward jump or forward branch instruction is executed during the subroutine, it is possible that the MINRC value may still point to the program counter value in the main program space, which is outside of the program space of the subroutine. This may cause the control flow to jump out of the subroutine and back into the main program outside of a return instruction.

In general, specialized call and return instructions are used to transfer the control flow between a main program and subroutines or between different subroutines during the execution of a program. These instructions allow the system state for one program module (i.e., the main program or a subroutine) to be saved prior to transferring control to another program module, and the system state of the other program module to be restored if it was previously saved. Causing the control flow to jump out of a subroutine and back into the main program outside of a call instruction or a return instruction, as described in the above example, could cause the system to operate with an incorrect state. Therefore, although a single, global MINRC may be able to improve the performance of forward branch and forward jump instructions in a system that uses resume counters, the global MINRC, alone, may not be able to adequately support the execution subroutines within a program.

The disclosure describes techniques for executing subroutines in a processing system that uses MINRC-based control flow techniques. The techniques for executing subroutines may include maintaining one or more program module-specific MINRCs. Each program module-specific MINRC may correspond to a particular program module of a program to be executed, and be indicative of a smallest resume counter value from a set of one or more resume counter values that corresponds to all threads that were active when execution of the currently executing program module was initiated. By using separate MINRCs for the main program and for each of the subroutines, the processing system may ensure that subroutines do not branch from a subroutine into the main program or into another subroutine outside of the execution of a call or return instruction. In this way, proper control flow for the execution of subroutines may be ensured in a processing system that uses a MINRC-based approach to control the execution of forward jump and forward branch instructions.

Other techniques for managing divergent threads may include using a stack to store synchronization tokens and divergence tokens and using a software-triggered thread reactivation system to control the reactivation of deactivated threads. For example, each time a branch instruction occurs that allows for divergence, a synchronization token may be pushed onto a stack indicating the threads that were active when the branch instruction was originally encountered. If the branch instruction is a divergent branch instruction, then the system may push a divergence token onto a stack indicating the threads that did not take the branch and a program counter value corresponding to a next instruction for the threads that did not take the branch. The system may continue executing the remaining threads that did take the branch until a specialized software flag and/or software instruction is encountered that instructs the system to pop the divergence token off of the stack. In response to popping the divergence token off of the stack, the system may proceed to deactivate the threads that did take the branch, and to reactivate and execute the threads that did not take the branch. The system may continue executing the remaining threads that did not take the branch until a specialized software flag and/or software instruction is encountered that instructs the system to pop the synchronization token off of the stack. In response to popping the synchronization token off of the stack, the system may proceed to reactivate the threads such that the thread state is the same as when the divergent branch instruction was originally encountered.

One drawback of this approach, however, is that special software instructions are needed in order to control the reactivation of threads. Moreover, because this approach places an entry in the stack each time a divergent branch occurs, the number of nested divergent branches that the system can handle is limited based on the size of the stack. A nested divergent branch may refer to a divergent branch that occurs during the execution of either the taken path or the not taken path of another divergent branch instruction. That is, a nested divergent branch is a divergent branch that occurs when one or more threads have already been deactivated due to a previously occurring divergent branch instruction and such threads have not yet reactivated.

In contrast to the software-triggered, stack-based approaches for reactivating divergent threads described above, no specialized software instructions are necessarily needed to implement the resume counter-based approach of this disclosure. Instead, a resume check may be performed, in some examples, at each instruction cycle to determine whether any deactivated threads are scheduled to be reactivated for that cycle. This may allow the manner in which divergent threads are deactivated and reactivated to be effectively hidden from the programmer and/or compiler and allow the programmer and/or compiler to generate a single set of executable code that can be executed on both a parallel system designed to process divergent threads and a non-parallel system that is not designed to process divergent threads. In addition, the resume counter-based approach is capable of executing code that was originally designed for a non-parallel system without needing to recompile and/or rewrite legacy code to enable divergent thread handling.

Moreover, because the resume counter-based approach uses a finite set of resume counters, as opposed to a stack, to control the reactivation of deactivated threads, the number of nested divergent branches that such an approach can handle is conceptually infinite and not limited based on the size of a stack. It should be noted that, in some examples, the techniques of this disclosure may use a stack to store MINRC values. However, MINRC values are pushed onto and popped off of such a stack in response to subroutine call and return instructions and not in response to divergent branches per se. Therefore, even though a MINRC stack may be used to implement the techniques of this disclosure, such a stack does not limit the number of nested divergent branches that may occur in such a system.

FIG. 1 is a block diagram illustrating an example processing system 10 that may be used to implement the subroutine execution techniques of this disclosure. Processing system 10 is configured to execute instructions for a program in a parallel manner. Processing system 10 includes a control unit 12, processing elements 14A-14D (collectively "processing elements 14"), an instruction store 16, a data store 18, and communication paths 20, 22, 24, 26A-26D. Communication paths 26A-26D may be referred to collectively as "communication paths 26."

Processing system 10 may be implemented in a personal computer, a desktop computer, a laptop computer, a computer workstation, a tablet computing device, a video game platform or console, a wireless communication device (such as, e.g., a so-called smartphone, a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer, any other type of device that processes and/or displays graphical data, or any type of device that performs computations.

In some examples, control unit 12 and processing elements 14 may be hardware components that form a programmable processor or part of a programmable processor. For example, control unit 12 and processing elements 14 may together form a graphics processing unit (GPU) or a part of a GPU.

In some examples, processing system 10 may be a single-instruction, multiple-data (SIMD) processing system that is configured to execute a plurality of threads of execution for a program using processing elements 14. In such a SIMD system, processing elements 14 may together process a single instruction at a time with respect to different data items. The program may retire after all of the threads associated with the program complete execution.

Control unit 12 is configured to control processing system 10 to execute instructions for a program stored in instruction store 16. For each instruction of the program, control unit 12 may retrieve the instruction from instruction store 16 via communication path 20, and process the instruction. In some examples, control unit 12 may process the instruction by causing an operation associated with the instruction to execute on one or more of processing elements 14. For example, the instruction retrieved by control unit 12 may be an arithmetic instruction that instructs processing system 10 to perform an arithmetic operation with respect to data items specified by the instruction, and control unit 12 may cause one or more of processing elements 14 to perform the arithmetic operation on the specified data items. In further examples, control unit 12 may process the instruction without causing an operation to be performed on processing elements 14.

Control unit 12 may cause an operation to be performed on one or more of processing elements 14 by providing an instruction to processing elements 14 via communication path 22. The instruction may specify the operation to be performed by processing elements 14. The instruction provided to the one or more of processing elements 14 may be the same as or different than the instruction retrieved from instruction store 16. In some examples, control unit 12 may cause the operation to be performed on a particular subset of processing elements 14 by one or both of activating a particular subset of processing elements 14 upon which the operation should be performed and deactivating another subset of processing elements 14 upon which the operation should not be performed. Control unit 12 may activate and/or deactivate processing elements 14 by providing respective activation and/or deactivation signals to each of processing elements 14 via communication path 22. In some examples, control unit 12 may activate and/or deactivate processing elements 14 by providing activation and/or deactivation signals to processing elements 14 in conjunction with providing an instruction to processing elements 14. In further examples, control unit 12 may activate and/or deactivate processing elements 14 prior to providing an instruction to processing elements 14.

Control unit 12 may execute a plurality of threads of execution for a program using processing elements 14. Each of processing elements 14 may be configured to process instructions of the program for a respective thread of the plurality of threads. For example, control unit 12 may assign each thread of execution to an individual one of processing elements 14 for processing. The different threads of execution for the program may execute the same set of instructions with respect to different data items in a set of data items. For example, processing element 14A may execute a first thread of execution for a program stored in instruction store 16 with respect to a first subset of data items in a plurality of data items, and processing element 14B may execute a second thread of execution for the program stored in instruction store 16 with respect to a second subset of data items in the plurality of data items. The first thread of execution may be different than the second thread of execution, and the first subset of data items may be different than the second subset of data items.

In some examples, control unit 12 may activate and deactivate individual threads in the plurality of threads of execution. When control unit 12 deactivates a thread, control unit 12 may also deactivate and/or disable the processing element 14A-14D that is assigned to execute the thread. Similarly, when control unit 12 activates a thread, control unit 12 may also activate the processing element 14A-14D that is assigned to execute the thread. Control unit 12 may activate and deactivate various combinations of one or more threads to assist in the handling of divergent branch conditions as explained in further detail later in this disclosure.

As used herein, an active thread may refer to a thread that is activated and currently configured to execute instructions of a program. An inactive thread may refer to a thread that is deactivated and currently configured to not execute instructions of the program. For a plurality of threads executing in processing system 10 during a given processing cycle, each of the active threads may be configured to process an instruction of the program identified by a global program counter register for the plurality threads during the processing cycle. For example, control unit 12 may activate processing elements 14 that are assigned to active threads in order to configure such processing elements 14 to process the instruction of the program during the processing cycle. On the other hand, each of the inactive threads may be configured to not process the instruction of the program during the processing cycle. For example, control unit 12 may deactivate processing elements 14 that are assigned to inactive threads to configure such processing elements 14 to not process the instruction of the program during the processing cycle.

In some examples, an instruction processing cycle may refer to the time interval between successive loads of the program counter. For example, an instruction processing cycle may refer to the time between when the program counter is loaded with a first value associated with a first instruction and when the program counter is loaded with a second value associated with a second instruction. The second instruction may be the instruction that is processed by the system immediately after the first instruction. The first and second values may be the same or different values, and the first and second instructions may be the same or different instructions. In some examples, an instruction processing cycle may refer to the time interval between successive synchronous loads of the program counter. A synchronous load of the program counter may, in some examples, refer to a load that is triggered by a clock signal. The instruction processing cycle may be alternatively referred to herein as an instruction cycle or as a processing cycle. In some examples, the instruction processing cycle may correspond to one or more clock cycles.

Sometime prior to the processing of the next instruction, control unit 12 determines a next instruction to be processed by processing system 10. The manner in which control unit 12 determines the next instruction to be processed is different depending on whether the most recently executed instruction is a control flow instruction. If the most recently executed instruction is not a control flow instruction, then control unit 12 may determine that the next instruction to be processed by processing system 10 corresponds to a next sequential instruction stored in instruction store 16. For example, instruction store 16 may store instructions for a program in an ordered sequence, and the next sequential instruction may be an instruction that occurs immediately after the most recently executed instruction in the ordered sequence of instructions.

If the most recently executed instruction is a control flow instruction, then control unit 12 may determine the next instruction to be processed by processing system 10 based on information specified in the control flow instruction. For example, the control flow instruction may be an unconditional control flow instruction (e.g., an unconditional branch instruction or a jump instruction) in which case control unit 12 may determine that the next instruction to be processed by processing system 10 is a target instruction identified by the control flow instruction. As another example, the control flow instruction may be a conditional control flow instruction (e.g., a conditional branch instruction) in which case control unit 12 may select one of a target instruction identified by the control flow instruction or a next sequential instruction stored in instruction store 16 as the next instruction to process from instruction store 16.

As used herein, a control flow instruction may refer to an instruction that directs control unit 12 to determine a next instruction to execute based on a technique other than unconditionally selecting a next sequential instruction. A control flow instruction may specify a target instruction stored in instruction store 16. For example, a control flow instruction may include a value indicative of a target program counter value that corresponds to a target instruction stored in instruction store 16. As another example, a control flow instruction may specify a target instruction by directing control unit 12 to pop a return address off a stack storage structure. The return address may correspond to a target instruction stored in instruction store 16. The target instruction may, in some examples, be different than the next sequential instruction stored in instruction store 16.

High-level program code may include control flow statements such as, e.g., if, switch, do, for, while, continue, break, and goto statements. A compiler may translate the high-level control flow statements into low-level, e.g., machine-level, control flow instructions. An instruction that is not a control flow instruction may be referred to herein as a sequential instruction. A sequential instruction may refer to an instruction where control unit 12 necessarily selects a next sequential instruction as being the next instruction to execute. A sequential instruction may, in some examples, not include information that identifies a target instruction.

For control flow instructions, the information that identifies the target instruction may be a value indicative of a target instruction stored in instruction store 16. In some examples, the value indicative of the target instruction may be a value indicative of an instruction address corresponding to the target instruction stored in instruction store 16. The value indicative of the instruction address may, in some cases, be the address of the target instruction stored in instruction store 16. In additional cases, the value indicative of the instruction address may be a value used to calculate the address of the target instruction. In further examples, the value indicative of the instruction address may be a value indicative of a target program counter value that corresponds to the target instruction. The value indicative of the target program counter value may, in some cases, be the target program counter value that corresponds to the target instruction. In additional cases, the value indicative of the target program counter value may be a value used to calculate the target program counter value. The target program counter value that corresponds to the target instruction may, in some examples, be equal to the address of the target instruction stored in instruction store 16.

A control flow instruction may be a forward control flow instruction or a backward control flow instruction. The property of whether the control flow instruction is forward or backward may be referred to as the direction of the control flow instruction. A forward control flow instruction may be a control flow instruction where the target instruction occurs after the control flow instruction in the ordered sequence of instructions stored in instruction store 16. A backward control flow instruction may be a control flow instruction where the target instruction occurs prior to the next sequential instruction in the ordered sequence of instructions stored in instruction store 16. The next sequential instruction may occur immediately after the control flow instruction in the ordered sequence of instructions.

A control flow instruction may be a conditional control flow instruction or an unconditional control flow instruction. A conditional control flow instruction includes information that specifies a condition for jumping to the target instruction associated with the control flow instruction. When processing a conditional control flow instruction, if control unit 12 determines that the condition is satisfied, then control unit 12 may determine that the next instruction to be processed is the target instruction. On the other hand, if control unit 12 determines that the condition is not satisfied, then control unit 12 may determine that the next instruction to be processed is the next sequential instruction stored in instruction store 16. An unconditional control flow instruction does not include information that specifies a condition for jumping to the target instruction associated with the control flow instruction. When processing an unconditional control flow instruction, control unit 12 may unconditionally determine that the next instruction to process is the target instruction identified by the control flow instruction. In other words, the determination in such a case is not conditioned upon any condition specified in the unconditional control flow instruction itself.

An example of a conditional control flow instruction includes a conditional branch instruction. The use of the generic term branch instruction in this disclosure typically refers to a conditional branch instruction unless the branch instruction is otherwise designated as an unconditional branch instruction. Examples of unconditional control flow instructions include jump instructions, call instructions, and return instructions.

A conditional branch instruction may include conditions that are specified with respect to one or more data item values. For example, one type of condition may be a comparison condition that compares a first data item value to a second data item value for each active thread executing in processing system 10. Comparing the data item values may include, e.g., determining whether the first data item value is greater than, less than, not greater than, not less than, equal to, or not equal to the second data item value. Another type of condition may be a zero check condition that determines whether a data item value for each active thread executing in processing system 10 is equal to or not equal to zero. Because each of processing elements 14 operates on different data items, the result of evaluating the condition may be different for each active thread executing in processing system 10. If either all of the active threads executing in processing system 10 satisfy the branch condition or all of the active threads executing in processing system 10 do not satisfy the branch condition, then a uniform branching condition occurs and the branching divergence for the branch instruction is said to be uniform. On the other hand, if at least one of the active threads executing in processing system 10 satisfies the branch condition and at least one of the active threads executing in processing system 10 does not satisfy the branch condition, then a divergent branching condition occurs and the branching divergence for the branch instruction is said to be divergent.

The threads executing in processing system 10 may execute the same instruction in a lockstep fashion. In other words, each of processing elements 14 may together execute the same instruction for all active threads during a processing cycle. However, when a divergent branch condition occurs, the threads that satisfy that branch condition may be scheduled to execute next instructions that are different than the next instructions scheduled to be executed by the threads that do not satisfy the branch condition. This may hinder the threads in processing system 10 from executing a single instruction in a lockstep fashion.

To deal with a divergent branch condition, control unit 12 may, in some examples, deactivate one subset of the threads that either satisfied or did not satisfy the branch condition such that the remaining active threads are all synchronized to the same program counter address. To control the reactivation of the threads, control unit 12 may use a resume counter-based approach that involves allocating a resume counter for each thread executing in the processing system, processing the divergent threads according to a "least-valued address first" thread processing order, and performing a resume check operation prior to the execution of every instruction.

More specifically, control unit 12 may deactivate one or more threads in response to a divergent branch condition and, for each thread being deactivated, set a resume counter (e.g., a register) for the respective thread to a value indicative of a program counter value at which the respective thread is scheduled to be reactivated. The program counter value at which the respective thread is scheduled to be reactivated may, in some examples, be a program counter value that corresponds to a next instruction to be executed by the deactivated thread. If a thread is active, the resume counter for the thread may be set to default value, which may correspond to a value greater than the address range of the program (e.g., a max register value). Each time the program counter register is loaded with a new program counter value, control unit 12 may perform a resume check operation, which may reactivate any threads where the resume counter value for the thread is equal to the new program counter value. The resume check operation may, in some examples, compare the resume counter value associated with each deactivated thread to the newly loaded program counter value to determine if any of the deactivated threads are scheduled to be reactivated prior to executing the instruction.

The "least-valued address first" thread processing order may differentiate which threads are deactivated in response to a divergent branch instruction based on the direction (i.e., forward or backward) of the branch instruction. For a divergent backward branch instruction, control unit 12 may deactivate threads for which the branching condition is not satisfied, set the resume counter value for each thread being deactivated to a value associated with a next sequential instruction that occurs after the branch instruction, load the program counter with a value associated with a target instruction specified by the branch instruction, and proceed to execute those threads for which the branching condition is satisfied. For a divergent forward branch instruction, control unit 12 may deactivate threads for which the branching condition is satisfied, set the resume counter value for each thread being deactivated to a value associated with a target instruction specified by the branch instruction, load the program counter with a value associated with a next sequential instruction that occurs after the branch instruction, and proceed to execute those threads for which the branching condition is not satisfied. Deactivating threads in this manner ensures that divergent threads that are scheduled to process instructions at lower-valued addresses execute prior to threads that are scheduled to process instructions at higher-valued addresses (i.e., a "least-valued address first" thread processing order). Such a processing order may prevent the control flow from jumping over any resume points for inactive threads without reactivating such threads and prematurely ending the program. In other words, such a processing order ensures that all threads will be active and will have completed processing by the time the last program statement has finished execution.

According to this disclosure, control unit 12 may control execution of a program based on a first MINRC associated with the program, and control execution of a subroutine of the program based on a second MINRC associated with the subroutine. The first MINRC may specify a value that is indicative of a smallest resume counter value of a plurality of resume counter values associated with a plurality of threads executing in processing system 10. The second MINRC may specify a value indicative of a smallest resume counter value from a subset of the plurality of resume counter values that corresponds to all of the threads that are active when execution of the subroutine is initiated. In some cases, the plurality of resume counter values for the first MINRC may correspond to all of the threads that are active when execution of the program is initiated. In some examples, when the program is a top-level program (e.g., a main program), all threads may be active when the program is initiated. In such examples, the first MINRC may be a smallest resume counter value of a set of resume counter values associated with all threads executing in processing system 10.

In general, control unit 12 may control execution of the processing system 10 based on a plurality of MINRCs. Each MINRC may be used to control a particular program module within an entire program. As used herein, a program module may refer to a main program module (i.e., the program module that the program initially executes when execution of the program is initiated) and/or to a subroutine program module that is called by the main program module or by another subroutine program module. In some examples, control unit 12 may maintain a MINRC value for the current program module being executed, and control execution of current program module based on the MINRC value corresponding to the current program module. The MINRC value may be indicative of a smallest resume counter value from a set of one or more resume counter values that corresponds to all threads that are active when execution of the current program module is initiated.

When control unit 12 switches to executing a different program module, control unit 12 may switch the MINRC that is used to control execution of processing system 10. For example, if control unit 12 switches from executing a caller program module to executing a subroutine program module, then control unit 12 may switch the MINRC that is used to control execution of processing system 10 from a first MINRC associated with the caller program module to a second MINRC associated with the subroutine module. Similarly, after completing execution of the subroutine program module, control unit 12 may switch the MINRC that is used to control execution of processing system 10 from the second MINRC associated with the subroutine module to the first MINRC value associated with the caller program module. The caller program module may be a main program module or a subroutine program module.

In some examples, controlling execution of a program module based on a particular MINRC may include controlling the execution of forward control flow instructions included in the program module based on that particular MINRC. For example, in response to executing a forward jump instruction or a forward conditional branch instruction where the branch condition is uniformly satisfied, control unit 12 may determine the next instruction to execute based on the MINRC value. Control unit 12 may, for example, compare the target program counter value specified by the branch or jump instruction to the MINRC value and select either the target program counter value or the MINRC value to load into the program counter. In one example, when the target program counter value is less than or equal to the MINRC value, control unit 12 may select the target program counter value as the value to load into the program counter. In such an example, when the target program counter value is not less than or equal to the MINRC value, control unit 12 may select the MINRC value as the value to load into the program counter. Loading either the target program counter value or the MINRC value into the program counter prevents processing system 10 from wasting program cycles due to incrementing the program counter through values where no execution takes place. Moreover, because the MINRC value is indicative of the smallest resume counter value of all inactive threads, executing forward jumps and uniform forward branches in the above-described manner will ensure that the control flow does not jump over the resume points of any inactive threads. In this way, controlling execution of processing system 10 based on one or more MINRC values may improve the performance of forward jump instructions and forward branch instructions in a system that utilizes resume counters for divergent thread handling.

According to some aspects of this disclosure, control unit 12 may be configured to switch a MINRC that is used to control execution of processing system 10 upon entry and/or exit of a subroutine. For example, in response to executing a call instruction, control unit 12 may be configured to save a state of a first MINRC that corresponds to the caller program, to initialize a second MINRC that corresponds to the subroutine program, and to control execution of the subroutine program based on the second MINRC that corresponds to the subroutine program. In response to executing a return instruction, the processing system may be configured to restore the saved state of the first MINRC that corresponds to the caller program, and to resume controlling the execution of the main program based on the restored state of first MINRC.

Control unit 12 may, in some examples, save the state of the first MINRC that corresponds to the caller program at least in part by pushing a value stored in a MINRC register for the first MINRC onto a stack storage structure. In such examples, control unit 12 may restore the saved state of the MINRC that corresponds to the caller program at least in part by popping the saved state of the first MINRC from the stack storage structure, and overwriting a value stored in the MINRC register with a value corresponding to the saved state of the first MINRC. When executing the call instruction, control unit 12 may initialize a second MINRC that corresponds to the subroutine program at least in part by setting the second MINRC equal to an a default value (e.g., a maximum register value or a value that is greater than the address range of the program).

When any of the resume counter values in processing system 10 is set to a new value, control unit 12 may update the MINRC value to reflect the new smallest resume counter value. Control unit 12 may update the MINRC value, for example, in response to deactivating one or more threads and/or in response to performing a resume check operation.

According to some aspects of this disclosure, when updating a MINRC value, control unit 12 may use various techniques to exclude resume counter values that are associated with threads that were inactive when execution of a subroutine was initiated from being used to update the MINRC associated with the subroutine. By excluding such resume counter values from consideration while updating the MINRC, the techniques of this disclosure may ensure that a subroutine-specific MINRC is updated to values that are within the program space associated with the subroutine.

In some examples, control unit 12 may exclude resume counter values that are greater than or equal to the entry point of the subroutine from affecting the resulting MINRC value during a MINRC update. In further examples, control unit 12 may maintain a set of flags where each flag in the set of flags is indicative of whether a respective thread was active when execution of a subroutine was initiated. In such examples, control unit 12 may exclude resume counter values that were not active when execution of the subroutine was initiated from affecting the resulting MINRC value during a MINRC update.

Control unit 12 is communicatively coupled to instruction store 16 via communication path 20, to processing elements 14 via communication path 22, and to data store 18 via communication path 24. Control unit 12 may use communication path 20 to send read instructions to instruction store 16. A read instruction may specify an instruction address in instruction store 16 from which an instruction should be retrieved. Control unit 12 may receive one or more program instructions from instruction store 16 in response to sending the read instruction. Control unit 12 may use communication path 22 to provide instructions to processing elements 14, and in some examples, to receive data (e.g., the result of a comparison instruction for evaluating a branch condition) from processing elements 14. In some examples, control unit 12 may use communication path 24 to retrieve data item values directly from data store 18 (e.g., to evaluate a branch condition). Although FIG. 1 illustrates processing system 10 as including communication path 24, in other examples, processing system 10 may not include communication path 24.

Each of processing elements 14 may be configured to perform operations to assist processing system 10 in processing instructions for the program stored in instruction store 16. In some examples, each of processing elements 14 may be configured to perform the same set of operations. For example, each of processing elements 14 may implement the same instruction set architecture (ISA). In additional examples, each of processing elements 14 may be an arithmetic logic unit (ALU). In further examples, processing system 10 may be a vector processor (e.g., a graphics processing unit (GPU) vector processor), and each of processing elements 14 may be a processing element within the vector processor. In additional examples, processing system 10 may be a SIMD execution unit, and each of processing elements 14 may be a SIMD processing element within the SIMD execution unit.

The operations performed by processing elements 14 may include arithmetic operations, logic operations, comparison operations, etc. Arithmetic operations may include operations such as, e.g., an addition operation, a subtraction operation, a multiplication operation, a division operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in data store 18.

Each of processing elements 14 may be configured to perform an operation in response to receiving an instruction from control unit 12 via communication path 22. In some examples, each of processing elements 14 may be configured to be activated and/or deactivated independently of the other processing elements 14. In such examples, each of processing elements 14 may be configured to perform an operation in response to receiving an instruction from control unit 12 when the respective processing element 14A-14D is activated, and to not perform the operation in response to receiving the instruction from control unit 12 when the respective processing element 14A-14D is deactivated (i.e., not activated).

Each of processing elements 14A-14D may be communicatively coupled to data store 18 via a respective communication path 26A-26D. Processing elements 14 may be configured to retrieve data from data store 18 and store data to data store 18 via communication paths 26. The data retrieved from data store 18 may, in some examples, be operands for the operations performed by processing elements 14. The data stored to data store 18 may, in some examples, be the results of operations performed by processing elements 14.

Instruction store 16 is configured to store a program for execution by processing system 10. The program may be stored as an ordered sequence of instructions. In some examples, each instruction may be addressed by a unique instruction address. In such examples, instruction addresses for later instructions in the sequence of instructions are greater than instruction addresses for earlier instructions in the sequence of instructions. The program instructions, in some examples, may be machine-level instructions. That is, in such examples, the instructions may be in a format that corresponds to the ISA of processing system 10. Instruction store 16 is configured to receive a read instruction from control unit 12 via communication path 20. The read instruction may specify an instruction address from which an instruction should be retrieved. In response to receiving the read instruction, instruction store 16 may provide an instruction corresponding to the instruction address specified in the read instruction to control unit 12 via communication path 20.

Instruction store 16 may be any type of memory, cache or combination thereof. When instruction store 16 is a cache, instruction store 16 may cache instructions associated with a program that is stored in a program memory external to processing system 10. Although instruction store 16 is illustrated as being within processing system 10, in other examples, instruction store 16 may be external to processing system 10.

Data store 18 is configured to store data items used by processing elements 14. In some examples, data store 18 may comprise a plurality of registers, each register being configured to store a respective data item within a plurality of data items operated on by processing system 10. Data store 18 may be coupled to one or more communication paths (not shown) that are configured to transfer data between the registers in data store 18 and a memory or cache (not shown).

Communication paths 20, 22, 24, 26 may be configured to provide communication of signals, instructions and/or data between the different components in processing system 10 as illustrated in FIG. 1. Communication paths 20, 22, 24, 26 may each be implemented, for example, as one or more busses (e.g., on-chip buses) and/or electrical interconnects (e.g., wires and/or circuit traces) that carry electrical signals between the different components shown in FIG. 1.

Although FIG. 1 illustrates a single data store 18 for storing data used by processing elements 14, in other examples, processing system 10 may include separate, dedicated data stores for each of processing elements 14. FIG. 1 illustrates a processing system 10 having four processing elements 14 for exemplary purposes. In other examples, however, processing system 10 may have the same or a different number of processing elements 14 in the same or a different configuration.

Figure 2:
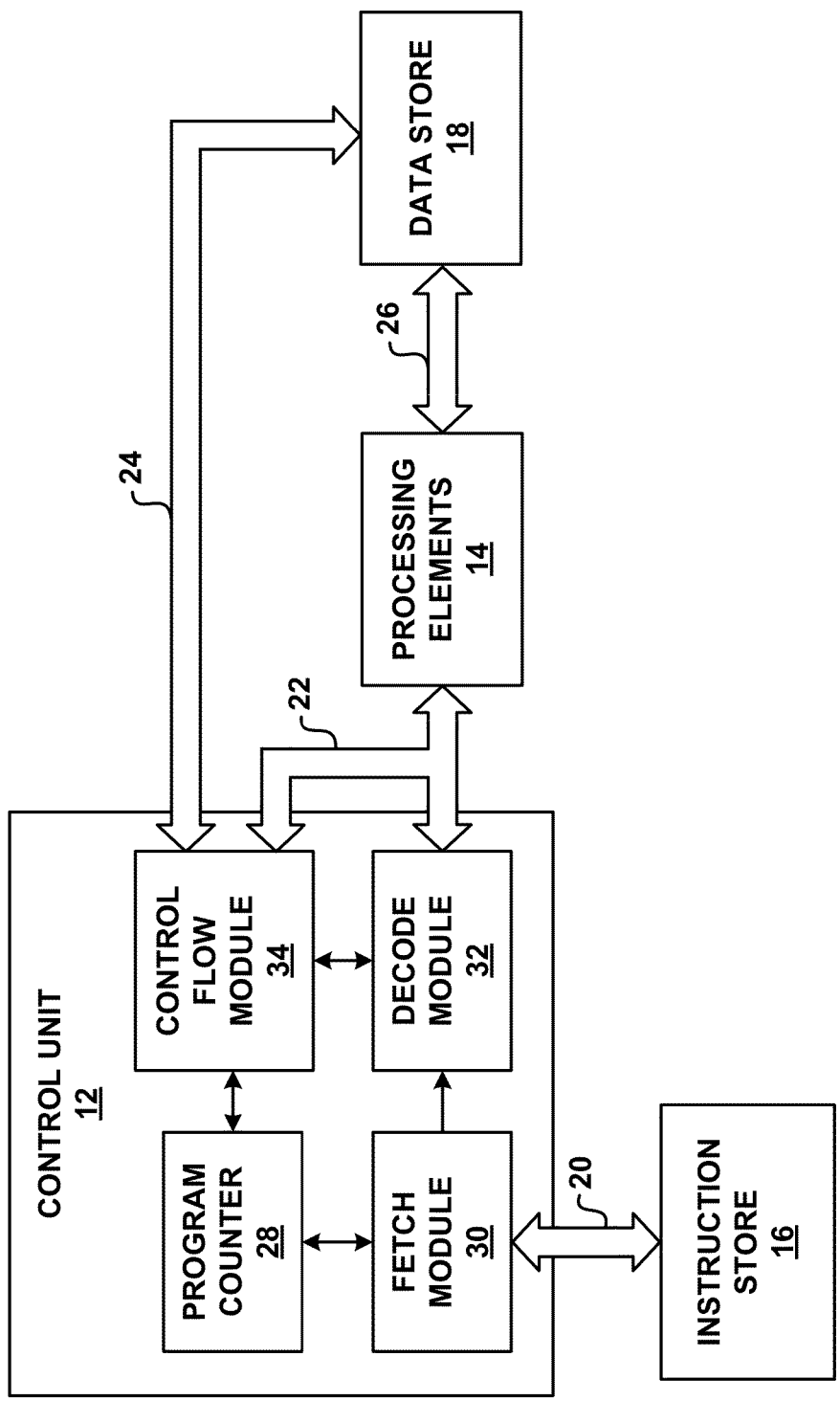
FIG. 2 is a block diagram illustrating the control unit in the example processing system of FIG. 1 in greater detail according to this disclosure.

FIG. 2 is a block diagram illustrating the control unit 12 in the example processing system 10 of FIG. 1 in greater detail according to this disclosure. Control unit 12 includes a program counter 28, a fetch module 30, a decode module 32 and a control flow module 34. Control flow module 34 may be alternatively referred to herein as a control flow unit.

Program counter 28 is configured to store a program counter value. In some examples, program counter 28 may be a hardware register, such as, e.g., a program counter register. The program counter value may be indicative of an instruction stored in instruction store 16. The program counter value may, in some cases, be equal to the instruction address of the instruction stored in instruction store 16. In additional cases, the program counter value may be used to compute the instruction address of the instruction stored in instruction store 16. For example, the program counter value may be added to an offset value to generate the instruction address. Program counter 28 may be referred to herein as a "global program counter" or a "global program counter register"

because program counter 28 may be used as a single program counter for all of processing elements 14.

Fetch module 30 is configured to fetch (e.g., retrieve) an instruction from instruction store 16 based on the program counter value stored in program counter 28. For example, fetch module 30 may fetch an instruction from an instruction address identified by the program counter value stored in program counter 28. Fetch module 30 may provide the fetched instruction to decode module 32 for further processing.

Decode module 32 is configured to decode the instruction received from fetch module 30. Decoding the instruction may involve determining whether the instruction is a type of instruction that can be processed by processing elements 14. If the instruction is a type of instruction that can be processed by processing elements 14, then decode module 32 may cause the instruction to execute on one or more of processing elements 14. In some examples, decode module 32 may cause the instruction to execute on all of processing elements 14. In other examples, decode module 32 may cause the instruction to execute on less than all of processing elements 14. Causing the instruction to execute on one or more of processing elements 14 may, in some cases, include issuing the instruction to one or more of processing elements 14 for execution. For example, decode module 32 may issue a sequential instruction to all processing elements 14 that correspond to active threads for processing. If the instruction is not the type of instruction that can be processed by processing elements 14, then control unit 12 may process the instruction without issuing the instruction to any of processing elements 14 for processing. For example, the instruction may be a control flow instruction of the type that does not require processing by processing elements 14, in which case control unit 12 may process the instruction without issuing the instruction to any of processing elements 14.

In either case, decode module 32 may forward control information to control flow module 34 for further processing. In some examples, the control information may be the instruction itself. In further examples, the control information may include, e.g., information indicative of whether the instruction is a control flow instruction or a sequential instruction. If the instruction is a control flow instruction, the control information may further include, e.g., information indicative of whether the instruction is a branch instruction, a jump instruction, a call instruction, or a return instruction. If the instruction is a branch or jump instruction, the control information may further include, e.g., information indicative of whether the branch or jump instruction is a forward or backward branch or jump instruction. If the instruction is a branch instruction, the control information may further include, e.g., information specifying the branch condition.

Instructions that are of a type that can be processed by processing elements 14 may include arithmetic instructions and logic instructions. An arithmetic instruction may refer to an instruction that instructs processing elements 14 to perform an arithmetic operation, and a logic instruction may refer to an instruction that instructs processing elements 14 to perform a logic operation. In some examples, a control flow instruction may be an instruction that can be processed by processing elements 14 (e.g., the control flow instruction may include a branch condition that is evaluated by processing elements 14). Instructions that are not of a type that can be processed by processing elements 14 may include control flow instructions where the branch condition is evaluated by control unit 12 and/or control flow instructions that do not have a branch condition.

Control flow module 34 may determine a program counter value associated with a next instruction to be processed by control unit 12, and load the program counter value into program counter 28. If the previously fetched instruction is a sequential instruction, then control flow module 34 may select a program counter value that is indicative of a next sequential instruction to load into program counter 28. If the previously fetched instruction is a branch or jump instruction, then control flow module 34 may utilize a MINRC to select a new program counter value to load into program counter 28. For example, control flow module 34 may select one of a target program counter value associated with a target instruction specified by the control flow instruction, a program counter value indicative of a next sequential instruction, or a MINRC value to load into program counter 28. If the previously fetched instruction is a call instruction, then control flow module 34 may select a target program counter value indicative of the target instruction specified by the call instruction to load into program counter 28. If the previously fetched instruction is a return instruction, then control flow module 34 may select a program counter value indicative of a return address that is popped from a subroutine call stack to load into program counter 28.

Control flow module 34 may store a resume counter value for each thread executing in processing system 10. For example, the number of resume counter values stored in control flow module 34 may be equal to the number of processing elements 14 contained in processing system 10. For each resume counter value, if the thread corresponding to the respective resume counter value is inactive, then the resume counter value may be indicative of a program counter value at which the inactive thread is scheduled to be activated or reactivated. Otherwise, if the thread corresponding to the respective resume counter value is active, then the resume counter value may be, in some examples, set to a default value (e.g., a maximum register value or a value that is a largest value that can be represented in a storage slot or register for the resume counter).

Control flow module 34 may store a MINRC value for the for the program module that is currently being executed in processing system 10. The MINRC value may be indicative of a smallest resume counter value from the set of resume counter values associated with the threads that are active when the execution of the processing module is initiated. If all threads are active, the minimum resume counter value may, in some examples, be set to a maximum value, i.e., a value that is the largest value that can be represented in the storage slot for the minimum resume counter.

Control flow module 34 may store an active flag for each thread executing in processing system 10. For example, the number of active flags stored in control flow module 34 may be equal to the number of processing elements 14 contained in processing system 10. Each active flag may indicate whether or not the thread associated with the active flag is active or inactive. In some examples, the active flag may be a single bit that is set to indicate that the thread associated with the active flag is active, and reset to indicate that the thread associated with the active flag is inactive. Control flow module 34 may set and reset the active flag for a particular thread when activating and deactivating the thread.

Control flow module 34 may manage one or more stacks to assist in processing subroutine call instructions and subroutine return instructions. For example, control flow module 34 may push a return address onto a subroutine stack and a MINRC value onto a MINRC stack in response to executing a call instruction. As another example, control flow module 34 may pop a return address from the subroutine stack and a MINRC value from the MINRC stack in response to executing a return instruction. The subroutine stack and the MINRC stack may be the same or different stacks.

In some examples, control flow module 34 may store a set of flags where each flag in the set of flags indicates whether a respective thread was active at the time execution of the program module currently being executed was activated. In such examples, control flow module 34 may push the flag values for the set of flags onto the stack in response to executing a call instruction and pop the flag values for the set flags off of the stack in response to executing a return instruction.

Control flow module 34 may, in some examples, store a program state. For example, a first program state may indicate that all threads are active, a second program state may indicate that at least on thread is active and at least one thread is inactive and a third program state may indicate that all threads are inactive. The program state may be used in such examples, to select a program counter value to load into program counter 28.

Control flow module 34 may be configured, in some examples, to activate and deactivate one or more of processing elements 14 via communication path 22. In additional examples, control flow module 34 may instruct decode module 32 to activate and deactivate particular processing elements 14.

In some examples, processing system 10 of FIGS. 1 and 2 may be included in a graphics processing unit (GPU). In such examples, processing system 10 may be used to implement a shader unit contained within the GPU, such as, e.g., a vertex shader unit, a pixel shader unit, a fragment shader unit, a geometry shader unit, a unified shader unit, etc. In such examples, processing system 10 may be configured to execute shader programs, such as, e.g., vertex shader programs, fragment shader programs, geometry shader programs, etc.

Figure 3:
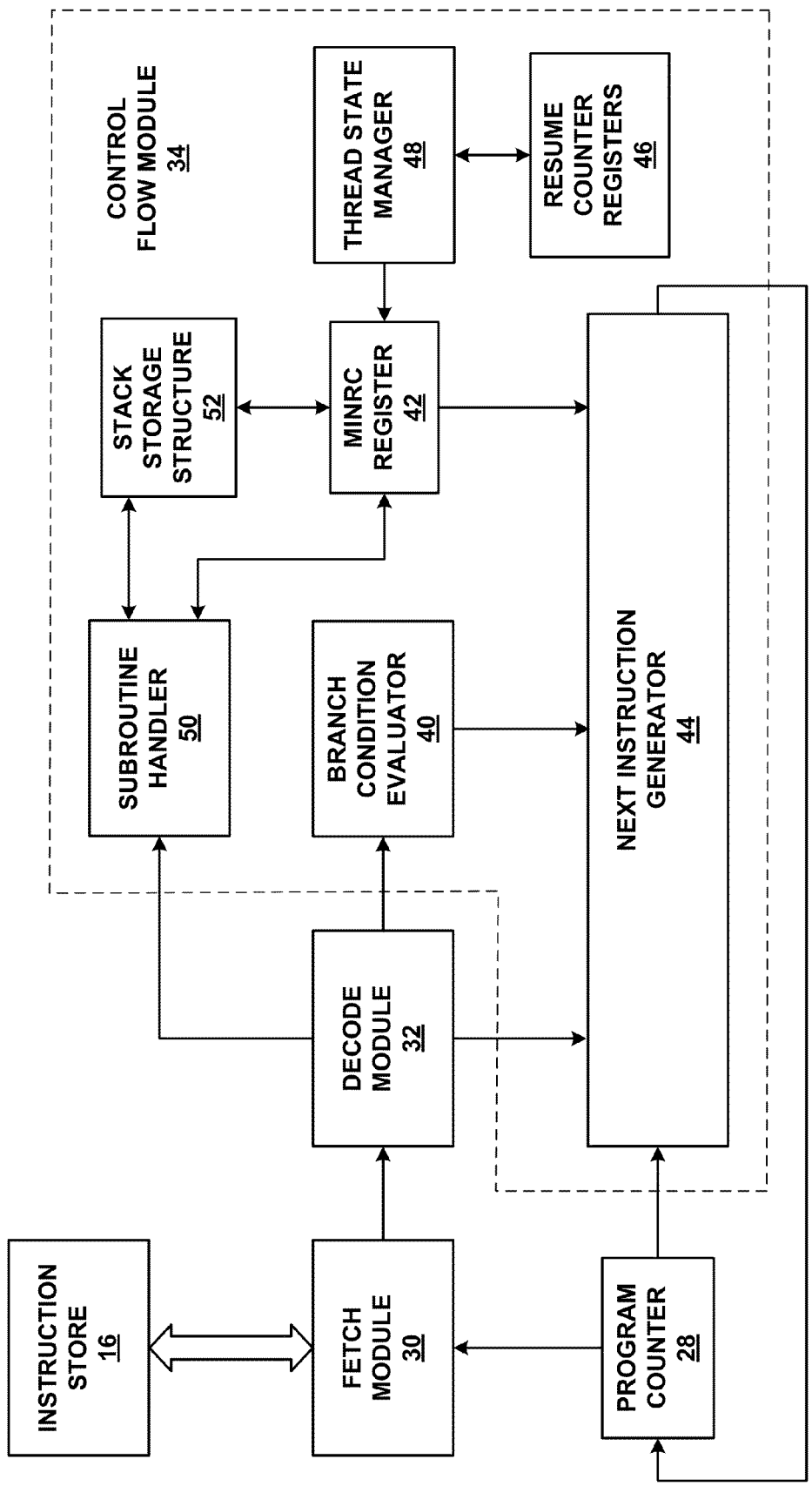
FIG. 3 is a block diagram illustrating an example control flow module that may be used to implement the subroutine execution techniques of this disclosure.

FIG. 3 is a block diagram illustrating an example control flow module 34 that may be used to implement the subroutine execution techniques of this disclosure. Control flow module 34 includes a branch condition evaluator 40, a minimum resume counter (MINRC) register 42, a next instruction generator 44, resume counter registers 46, a thread state manager 48, a subroutine handler 50 and a stack storage structure 52.

Branch condition evaluator 40 is configured to evaluate the branch condition specified by a conditional branch instruction for each active thread executing in processing system 10. Branch condition evaluator 40 may receive information indicative of whether the currently processed instruction is a branch instruction from decode module 32, and if the currently processed instruction is a branch instruction, branch condition evaluator 40 may also receive from decode module 32 information indicative of a branch condition for the currently processed branch instruction. In some examples, one or both of the information indicative of whether the currently processed instruction is a branch instruction and the information indicative of a branch condition may be a representation of the instruction itself. In further examples, one or both of these information components may be a signal that is generated by decode module 32.

Branch condition evaluator 40 may evaluate the same branch condition for each thread using thread-specific data. In some examples, branch condition evaluator 40 may obtain any data needed for evaluating the branch condition for each thread, and internally evaluate the branch condition for each thread to generate a branch condition evaluation result for each thread. In further examples, branch condition evaluator 40 may direct each processing element 14 that corresponds to an active thread to obtain the data needed for evaluating the branch condition for the respective thread, to evaluate the branch condition, and to provide a branch condition evaluation result for the respective thread to branch condition evaluator 40. In either case, branch condition evaluator 40 may determine, for each active thread, whether the branching condition is satisfied for the respective thread.

In some examples, branch condition evaluator 40 may determine whether the branching divergence for the branch instruction is uniform or divergent. For example, branch condition evaluator 40 may determine whether all active threads satisfied the branch condition and whether all active threads did not satisfy the branch condition. If all active threads either satisfied or did not satisfy the branch condition, then branch condition evaluator 40 may determine that the branching divergence for the branch instruction is uniform. If some active threads satisfied the branch condition and some active threads did not satisfy the branch condition, then branch condition evaluator 40 may determine that the branching divergence for the branch instruction is divergent. In examples where the branching divergence is uniform, branch condition evaluator 40 may determine whether the branching condition is uniformly satisfied or uniformly not satisfied.

Branch condition evaluator 40 may provide branch condition status information to thread state manager 48. The branch condition status information may indicate, for each active thread executing in processing system 10, whether the respective thread satisfied the branch condition or did not satisfy the branch condition (i.e., the branch condition evaluation result for the thread). Thread state manager 48 may use the branch condition status information to determine whether to activate and/or deactivate particular threads in response to executing the branch instruction.

Branch condition evaluator 40 may provide branching divergence information to next instruction generator 44. The branching divergence information may include information indicative of whether the branching divergence for the branch instruction is uniform or divergent. If the branching divergence for the branch instruction is uniform, then the branching divergence information may also include information indicative of whether the branch condition is uniformly satisfied or uniformly not satisfied. In some examples, the branching divergence information may take the form of branch condition status information for each of the active threads. In other examples, the branching divergence information may not necessarily include branch condition status information for the individual threads.

MINRC register 42 may store a MINRC value for the currently executing program module in processing system 10. The MINRC value may be indicative of a smallest resume counter value of all threads that are active when execution of the currently executing program module is initiated. The MINRC value may be updated and/or modified by one or more of thread state manager 48, subroutine handler 50 and stack storage structure 52. Control flow module 34 is configured to control the execution of the currently executing program module based on MINRC register 42 as will be described in further detail with respect to next instruction generator 44. MINRC register 42 is communicatively coupled to next instruction generator 44, resume counter registers 46, subroutine handler 50 and stack storage structure 52.

Next instruction generator 44 is configured to generate a program counter value corresponding to a next instruction to be executed based on information indicative of the type of instruction currently being executed, information indicative of the branching divergence of the instruction currently being executed if the instruction is a branch instruction, information indicative of a target instruction specified by the instruction currently being executed if any, information indicative of a return address if the instruction is a return instruction, and the MINRC value stored in MINRC register 42 if the instruction is a forward branch or jump instruction. Next instruction generator 44 may cause the program counter value generated by next instruction generator 44 to be loaded into program counter 28 when execution of the next instruction cycle in initiated.

The information indicative of the type of instruction currently being executed may be received from decode module 32 and include, e.g., information indicative of whether the instruction is a sequential instruction or a control flow instruction. If the instruction is a control flow instruction, the information indicative of the type of instruction may include, e.g., information indicative of whether the instruction is a branch instruction, a jump instruction or a subroutine instruction (e.g., a call or return instruction). If the instruction is a branch or jump instruction, the information indicative of the type of instruction may include, e.g., information indicative of whether the instruction is a forward branch or jump instruction or whether the instruction is a backward branch or jump instruction.

The information indicative of the branching divergence of the instruction may be received from branch condition evaluator 40 and include, e.g., information indicative of whether the branching divergence is uniform or divergent. If the branching divergence is uniform, the information indicative of the branching divergence of the instruction may include, e.g., information indicative of whether the branch condition is uniformly satisfied or uniformly not satisfied.

The information indicative of the target instruction may be received from decode module 32 and include, e.g., a target program counter value or an offset value that is indicative of a target program counter value. The offset value may be, for example, a value that is added to the program counter to generate the target program counter value. The information indicative of the target instruction may be used to determine a program counter for the next instruction to be executed when the current instruction specifies a target instruction. These instructions may include, for example, conditional branch instructions, jump instructions, and call instructions.

The information indicative of the return address may be received from stack storage structure 52. For example, subroutine handler 50 may push a return address onto stack storage structure 52 when a subroutine call instruction is executed. When the return instruction for the subroutine is executed, subroutine handler 50 may pop the return address off of stack storage structure 52, and provide the return address to next instruction generator 44 to determine the program counter value for the next instruction to be executed.

For sequential instructions, next instruction generator 44 selects a program counter value that corresponds to a next sequential instruction as the program counter value to load into program counter 28. The next sequential instruction may refer to an instruction that occurs immediately after the instruction currently being executed in an ordered sequence of instructions for the program stored in instruction store 16.

For a backward jump instruction, next instruction generator 44 may select a target program counter value indicative of the target instruction specified by the backward jump instruction as the program counter value to load into program counter 28. For a forward jump instruction, next instruction generator 44 may select a program counter value to load into program counter 28 based on the MINRC value stored in MINRC register 42 as described in further detail below.

For a backward branch instruction, next instruction generator 44 may determine whether the branch condition for the backward branch instruction is uniformly not satisfied. If the branch condition for the backward branch instruction is uniformly not satisfied, then next instruction generator 44 may select a program counter value that corresponds to a next sequential instruction as the program counter value to load into program counter 28. On the other hand, if the branch condition for the backward branch instruction is uniformly satisfied or divergent, then next instruction generator 44 may select a target program counter value indicative of the target instruction specified by the backward branch instruction as the program counter value to load into program counter 28.

For forward branch instructions, next instruction generator 44 may determine whether the branch condition for the forward branch instruction is uniformly not satisfied or divergent. If the branch condition for the forward branch instruction is uniformly not satisfied or divergent, then next instruction generator 44 may select a program counter value that corresponds to a next sequential instruction as the program counter value to load into program counter 28. If the branch condition for the forward branch instruction is uniformly satisfied, then next instruction generator 44 may select a program counter value to load into program counter 28 based on the MINRC value stored in MINRC register 42 as described in further detail below.

For call instructions, next instruction generator 44 may select a target program counter value indicative of a target instruction specified by the call instruction as the program counter value to load into program counter 28. For return instructions, next instruction generator 44 may select a program counter indicative of a return address popped from stack storage structure 52 as the program counter value to load into program counter 28.

As discussed above, in response to executing a forward jump instruction or a forward branch instruction where the branch condition is uniformly satisfied, next instruction generator 44 may select a program counter value to load into program counter 28 based on the MINRC value stored in MINRC register 42. In some examples, next instruction generator 44 may select one of a target program counter value specified by the instruction or the MINRC value stored in MINRC register 42 as a program counter value to load into program counter 28 based on the MINRC value. For example, next instruction generator 44 may, in some examples, determine whether the target program counter value is less than or equal to the MINRC value. If the target program counter value is less than or equal to the MINRC value, then next instruction generator 44 may select the target program counter value as the program counter value to load into program counter 28. On the other hand, if the target program counter value is not less than or equal to the MINRC value, then next instruction generator 44 may select the MINRC value as the program counter value to load into program counter 28. Other comparison operations are also possible in other examples including, e.g., determining whether the target program counter value is less than the MINRC value or whether the MINRC value is greater than the target program counter value. In this manner, next instruction generator 44 may control execution of the currently executing program module based on the MINRC value stored in MINRC register 42.

Resume counter registers 46 store a plurality of resume counter values for the threads executing in processing system 10. Each resume counter value may correspond to a respective thread executing in processing system 10 and may be indicative of a program counter value at which the respective thread is scheduled to be activated if the respective thread is inactive. If the thread is active, the resume counter value is set to a default value, which in some cases may be a value that is greater than the range of valid program counter values used to execute programs. For example, if the thread is active, the resume counter may be set to a value that is a maximum value (i.e., a value that is the largest value that can be represented in a storage slot or register for the resume counter). Because the resume counter for a corresponding thread is set to a default value when the thread is active, each resume counter may also be indicative of whether a thread corresponding to the respective resume counter is active.

In some examples, resume counter registers 46 may include a plurality of registers configured to store a plurality of resume counter values. For example, each register may be a resume counter register that is configured to store a resume counter value for a respective one of the plurality of threads executing in processing system 10. Resume counter registers 46 are communicatively coupled to thread state manager 48.

Thread state manager 48 is configured to manage the state of the threads executing in processing system 10. For example, thread state manager 48 may activate and deactivate threads executing in processing system 10, update resume counter registers 46, and update MINRC register 42 as appropriate.

Thread state manager 48 may deactivate one or more threads in response to processing system 10 executing a branch instruction with a divergent branch condition. For example, thread state manager 48 may receive information indicative of whether a divergent branch condition has taken place from branch condition evaluator 40, information indicative of whether the branch instruction is a forward branch instruction or a backward branch instruction from either branch condition evaluator 40 or decode module 32, and information indicative of which threads satisfied the branch condition and which threads did not satisfy the branch condition. Thread state manager 48 may determine whether the divergent branch instruction is a forward branch instruction or a backward branch instruction. If the divergent branch instruction is a forward branch instruction, then thread state manager 48 may deactivate each active thread that satisfied the branch condition. If the divergent branch instruction is a backward branch instruction, then thread state manager 48 may deactivate each active thread that did not satisfy the branch condition.

For each thread being deactivated, thread state manager 48 may set a resume counter value stored in resume counter registers 46 that corresponds to the respective thread to a value indicative of a program counter value at which the respective thread should be reactivated (e.g., a program counter value at which the respective thread is scheduled to be reactivated). When deactivating a thread in response to a divergent forward branch instruction, thread state manager 48 may set the resume counter value for the thread to a value indicative of a target program counter value specified by the forward branch instruction. When deactivating a thread in response to a divergent backward branch instruction, thread state manager 48 may set the resume counter value for the thread to a value indicative of a program counter value that corresponds to a next sequential instruction. After setting the resume counter values for the deactivated threads, thread state manager 48 may update the MINRC value stored in MINRC register 42 for the currently executing program module as described in further detail below.

In some examples, to deactivate a particular thread, thread state manager 48 may deactivate a respective one of processing elements 14 that corresponds to the particular thread. In additional examples, to deactivate a particular thread, thread state manager 48 may send a signal to a portion of data store 16 that corresponds to the particular thread indicating that data store 16 should not store any computational results that correspond to the particular thread. When deactivating threads, thread state manager 48 may, in some examples, set an active flag corresponding to the thread to be deactivated to a value that indicates that the thread has been deactivated.

Thread state manager 48 may be configured to perform a resume check operation for each instruction cycle to determine whether any deactivated threads need to be reactivated for the respective instruction cycle. In some examples, to perform the resume check operation, thread state manager 48 may compare each of a plurality of resume counter values to a program counter value associated with a currently processed instruction (i.e., the program counter value that is currently loaded into program counter 28). For example, thread state manager 48 may determine whether each resume counter value is equal to the current program counter value stored in program counter 28. If a resume counter value for a particular thread equals the current program counter value, then thread state manager 48 may reactivate the thread. Otherwise, if the resume counter value for a particular thread does not equal the current program counter value, then thread state manager 48 may maintain the deactivated status of the thread.

For each thread being reactivated, thread state manager 48 may set a resume counter value corresponding to the respective thread to a default value that indicates that the thread is active. For example, the default value may be a largest value that can be represented in a register for the resume counter value. After setting the resume counter values for any reactivated threads, thread state manager 48 may update the MINRC value stored in MINRC register 42 as described in further detail below.

In some examples, to reactivate a particular thread, thread state manager 48 may activate a respective one of processing elements 14 that corresponds to the particular thread. In further examples, to reactivate a particular thread, thread state manager 48 may send a signal to a portion of data store 16 that corresponds to the particular thread indicating that data store 16 should store computational results that correspond to the particular thread. When reactivating threads, thread state manager 48 may, in some examples, set an active flag corresponding to the thread to a value that indicates that the thread has been activated.

In some examples, the resume check operation may be initiated in response to loading a program counter value into program counter 28. The instruction cycle may, in some examples, be of sufficient length to allow processing elements 14 to perform computational operations for any threads that have been reactivated as part of the resume check operation after the resume check operation has completed. In further examples, execution of the instruction corresponding to the program counter value stored in program counter 28 may be delayed until after the resume check operation is complete and any threads that are scheduled to be reactivated for the instruction are activated. In such examples, after the resume check operation is complete, thread state manager 48 may cause processing elements 14 to begin performing any computational operations associated with the current instruction.

As discussed above, in response to updating one or more resume counter values when deactivating and/or reactivating threads, thread state manager 48 may update the MINRC value stored in MINRC register 42. In general, thread state manager 48 may determine a candidate set of resume counter values for use in determining the updated MINRC value, and set the MINRC value to a value that is indicative of a smallest resume counter value from the candidate set of resume counter values. The candidate set of resume counter values may be a subset of the entire set of resume counter values, which includes resume counter value for all threads executing in processing system 10. A subset may include all or less than all of the elements of the parent set. The candidate set of resume counter values may, in some cases, exclude one or more resume counter values that correspond to threads that were not active when execution of the currently executing program module was initiated. By excluding such resume counter values from consideration while updating the MINRC, the techniques of this disclosure may ensure that a subroutine-specific MINRC is updated to values that are within the program space associated with the subroutine.

In some examples, thread state manager 48 may determine whether each resume counter value from the entire set of resume counter values is greater than or equal to the entry point of the currently executing program module (e.g., the entry point of the subroutine), and select those resume counters where the resume counter value is greater than or equal to the entry point of the currently executing program module as being the candidate set of resume counter values. The entry point of the currently executing program module may be a program counter value that is indicative of a starting address for the program space that corresponds to the currently executing program module. In cases where the program module is a main program (i.e., a top-level program), the entry point of the program module may be the starting address of the top-level program. In cases where the program module is a subroutine program module, the entry point of the program module may be the starting address of the subroutine program module.

In additional examples, thread state manager 48 may maintain a set of flags where each flag in the set of flags is indicative of whether a respective thread was active when execution of a program module (e.g., a subroutine) was initiated. For example, in response to executing a subroutine call instruction, thread state manager 48 may set each flag in the set of flags to a value indicative of whether a thread corresponding to the respective flag is active when the call instruction is executed. In such examples, when thread state manager 48 updates the MINRC value, thread state manager 48 may determine whether each resume counter value from the entire set of resume counter values corresponds to a respective flag that indicates that the thread corresponding to the resume counter value was active when execution of the program module was initiated, and select those resume counters values having a flag value that indicates that the thread was active as being the candidate set of resume counter values.

Subroutine handler 50 is configured to manage the execution of subroutine control flow statements in processing system 10. Subroutine handler 50 may receive information from decode module 32 indicative of whether the currently processed instruction is a call instruction or a return instruction. A call instruction may refer to an instruction that instructs processing system 10 to start execution of a subroutine program module. A return instruction may refer to an instruction that instructs processing system 10 to end execution of the currently executing subroutine module and to resume executing the caller program module at an instruction in the caller program that occurs immediately after the call instruction that initiated the execution of the subroutine program. The caller program may be either the main program or another subroutine program.

In response to executing a call instruction, subroutine handler 50 may save a state of MINRC register 42 associated with the caller program. For example, subroutine handler 50 may push the MINRC value stored in MINRC register 42 onto a stack within stack storage structure 52. Pushing the MINRC value onto the stack may include storing the MINRC value in the stack of stack storage structure 52. Also in response to executing a call instruction, subroutine handler 50 may push a return address onto a stack within stack storage structure 52. The return address may be indicative of a program counter value corresponding to a next sequential instruction after the call instruction in the caller program.

In some examples, the stack onto which the MINRC value is pushed may be the same stack as the stack onto which the return address is pushed. For example, subroutine handler 50 may push a stack frame onto a stack in stack storage structure 52 where the stack frame includes both a MINRC value corresponding to the call instruction and a return address corresponding to the call instruction. In additional examples, subroutine handler 50 may push the MINRC value onto a first stack in stack storage structure 52, and push the return address onto a second stack in stack storage structure 52. In such examples, the first stack may be different than the second stack.

Also in response to executing a call instruction, subroutine handler 50 may configure processing system 10 to control execution of the subroutine based on a MINRC that corresponds to the subroutine. For example, subroutine handler 50 may overwrite the MINRC value stored in MINRC register 42 with an initial value for a MINRC that corresponds to the subroutine. In other words, subroutine handler 50 may initialize MINRC register 42 to store a default MINRC value for execution of the subroutine. The default value may, in some examples, be a largest value that can be represented in MINRC register 42.

In response to executing a return instruction, subroutine handler 50 may restore the saved state of the MINRC that corresponds to the caller program. For example, subroutine handler 50 may pop a saved state of the MINRC that corresponds to the caller program from a stack in stack storage structure 52. Popping the saved state of the MINRC from the stack may include popping a MINRC value from the stack that corresponds to the saved state of the MINRC. Popping the MINRC value from the stack may involve retrieving the most recently stored MINRC value from stack storage structure 52. Also in response to executing a return instruction, subroutine handler 50 may pop a return address off a stack within stack storage structure 52. The return address may be indicative of a program counter value corresponding to a next sequential instruction after the call instruction in the caller program.

In examples where subroutine handler 50 pushes the MINRC value onto the same stack as the stack onto with the return address is pushed, subroutine handler 50 may pop the MINRC value and return address from the same stack. For example, subroutine handler 50 may pop a stack frame off of a stack in stack storage structure 52 where the stack frame includes both a MINRC value and a return address. In examples where subroutine handler 50 pushes the MINRC value and the return address onto different stacks, subroutine handler 50 may pop the MINRC value off of a first stack in stack storage structure 52, and pop the return address off of a second stack in stack storage structure 52.

Subroutine handler 50 may provide the return address that was popped from stack storage structure 52 to next instruction generator 44, which may use the return address to select a program counter value as a next program counter value to load into program counter 28. The selected program counter value may be indicative of the next sequential instruction after the call instruction in the caller program that initiated execution of the subroutine.

Also in response to executing a return instruction, subroutine handler 50 may configure processing system 10 to control execution of the caller program based on the saved state of the MINRC that corresponds to the caller program. For example, subroutine handler 50 may overwrite the MINRC value stored in MINRC register 42 with a value corresponding to the saved state of the MINRC value popped from stack storage structure 52.

Stack storage structure 52 is configured to provide storage for MINRC values and return addresses. In some examples, stack storage structure 52 may include a first stack storage structure that is configured to store return addresses and a second stack storage structure that is configured to store MINRC values. In such examples, the first stack storage structure may be different than the second stack storage structure. In additional examples, stack storage structure 52 may include a stack storage structure that is configured to store stack frames where each stack frame may include a return address corresponding to a particular call instruction and a MINRC value corresponding to the particular call instruction.

A stack storage structure may be configured to store and retrieve data according to a Last In, First Out (LIFO) processing scheme. According to a LIFO processing scheme, whenever the stack storage structure receives a request (e.g., a pop request) to retrieve a data unit (e.g., a stack frame, a return address, a MINRC value, etc.) from the stack storage structure, the stack storage structure may return the most recent data unit that was stored on the stack (e.g., the most recent data unit to be pushed onto the stack). A stack storage structure may be configured to process push commands and pop commands, which specify whether to store or retrieve data units, but do not necessarily specify a particular data address to which to store the data units or from which to retrieve the data units.

In some examples, stack storage structure 52 may be a hardware-based stack storage structure 52. For example, stack storage structure 52 may be implemented as one or more registers and/or shift registers. Although stack storage structure 52 is shown in FIG. 3 as being implemented on the same processor as control flow module 34, in other examples, all or a part of stack storage structure 52 may be implemented in an on-chip cache or in an external memory device. For example, stack storage structure 52 may include storage space for a finite number of stack storage slots. If an overflow condition occurs in such an example, subroutine handler 50 may utilize an on-chip cache or an external memory to store additional data over and above the finite number of stack storage slots included in stack storage structure 52.

Figure 4:
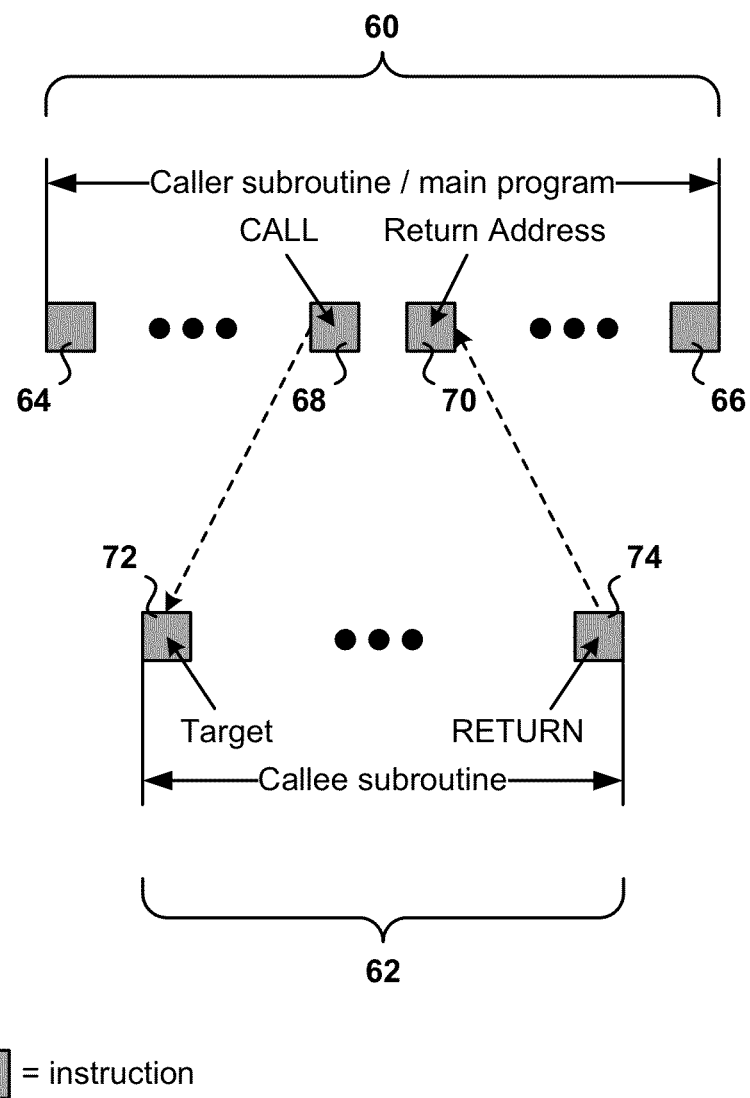
FIG. 4 is a conceptual diagram illustrating an example control flow for the subroutine execution techniques of this disclosure.

FIG. 4 is a conceptual diagram illustrating an example control flow for the subroutine execution techniques of this disclosure. As shown in FIG. 4, a caller program space 60 is associated with a caller program module, and a callee program space 62 is associated with a subroutine program module. The caller program module may be either a main program or a caller subroutine. Caller program space 60 includes a sequence of program instructions starting with a starting instruction 64 and ending with an ending instruction 66. Between starting instruction 64 and ending instruction 66 in the sequence of program instructions is a call instruction 68, which directs processing system 10 to pass control from the caller program module to the callee subroutine module. The instruction immediately after call instruction 68 in the sequence of program instructions is instruction 70, which may be any type of instruction. Callee program space 62 includes a sequence of program instructions starting with a starting instruction 72 and ending with a return instruction 74. Return instruction 74 directs processing system 10 to pass control from the callee subroutine module back to the caller program module. Starting instruction 64 may be referred to herein as the entry point of the caller program module, and starting instruction 72 may be referred to herein as the entry point of the callee subroutine module.

The caller program module begins executing instructions at starting instruction 64 and continues executing instructions in caller program space 60 until call instruction 68 is encountered. Call instruction 68 directs processing system 10 to pass control from the caller program module to the callee subroutine. Call instruction 68 includes a value that is indicative of a program counter value that corresponds to starting instruction 72. In response to executing call instruction 68, the return address, which corresponds to instruction 70 (i.e., the next sequential instruction after call instruction 68 in the caller program), is pushed onto (i.e., stored in) a call stack. Also in response to executing call instruction 68, a MINRC value corresponding to the caller program module is pushed onto a stack. Also in response to executing call instruction 68, a MINRC corresponding to the callee subroutine program module is initialized to a default value. Also in response to executing call instruction 68, the program counter for processing system 10 is loaded with a program counter value that corresponds to starting instruction 72 of the callee subroutine. The program counter value corresponding to starting instruction 72 may be specified by a value contained in call instruction 68.

The callee subroutine module begins executing instructions at a starting instruction 72 and continues executing instructions in callee program space 62 until return instruction 74 is encountered. In response to executing return instruction 74, the return address is popped off of (i.e., retrieved from) the call stack and loaded into the program counter. Again, the return address corresponds to instruction 70 in caller program space 60. Also in response to executing return instruction 74, a MINRC value corresponding to the caller program module is popped off the stack. The caller program module resumes executing instructions at instruction 70 until ending instruction 66 is encountered which indicates the end of the program.

Figure 5:
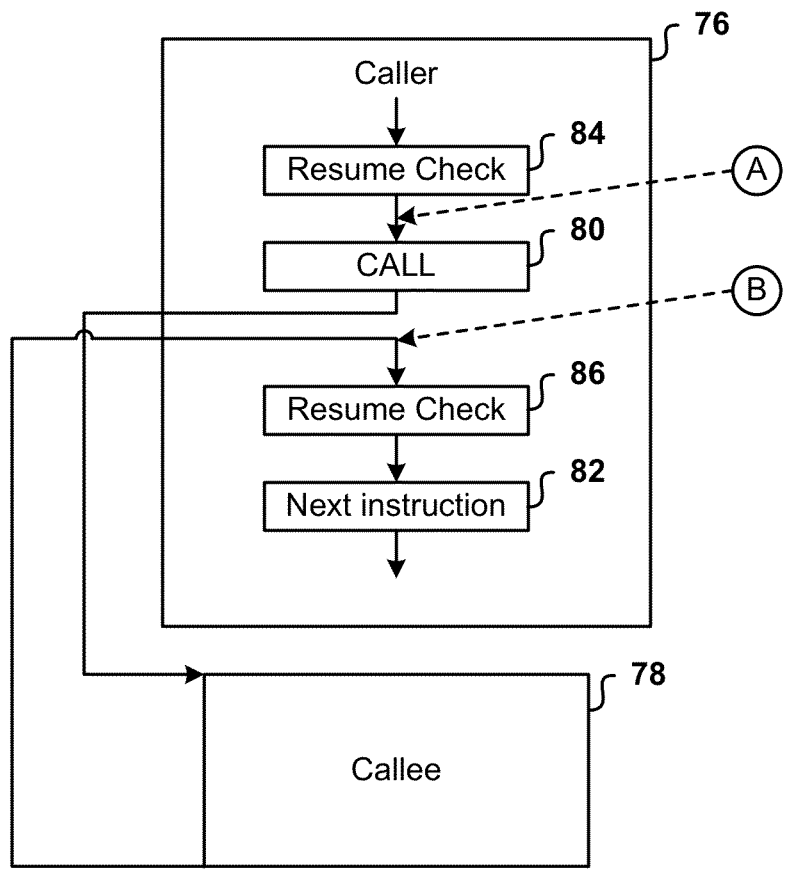
FIG. 5 is a conceptual diagram illustrating another example control flow for the subroutine execution techniques of this disclosure.

FIG. 5 is a conceptual diagram illustrating another example control flow for the subroutine execution techniques of this disclosure. A caller program module 76 and a callee program module 78 are shown in FIG. 5. Caller program module 76 and callee program module 78 may be a part of the same program, and callee program module 78 may be a subroutine of the program. Caller program module 76 may be a main program module or a subroutine program module. Caller program module 76 includes a call instruction 80 and a next instruction 82 immediately after call instruction 80. Prior to the execution of each of call instruction 80 and next instruction 82, resume check operations 84 and 86, respectively, are performed. During execution, call instruction 80 may transfer control of the processing system to callee program module 78 for execution of subsequent instructions. After the last instruction is executed in callee program module 78, control may be passed back to caller program module 76 at a point prior to resume check operation 86 for next instruction 82.

Points A and B in FIG. 5 depict two different points in time during the execution of the program. Point A defines a point in time that is during the instruction cycle of call instruction 80, after the completion of resume check operation 84 for call instruction 80, and prior to the transfer of control from caller program module 76 to callee program module 78. Point B defines a point in time that is during the instruction cycle of next instruction 82, prior to the initiation of resume check operation 86 for next instruction 82, and after the transfer of control back from callee program module 78 to caller program module 76.

The threads that are active at Point A define the set of threads that are active immediately prior to initiating execution of callee program module. Similarly, the threads that are active at Point B define the set of threads that are active immediately after finishing execution of callee program module 78.

Subroutine convergence refers to the property that the thread state for all of the threads in processing system 10 immediately prior to initiating execution of a subroutine is the same as the thread state immediately after finishing execution of the subroutine. That is, if a thread is active at point A in FIG. 5, then subroutine convergence requires that the thread must also be active at point B in FIG. 5. Similarly, if a thread is inactive at point A in FIG. 5, then subroutine convergence requires that the thread must also be inactive at point B in FIG. 5. The techniques of this disclosure may, in some examples, be able to guarantee subroutine convergence, thereby ensuring stable operation of subroutine statements in processing system 10.

In general, to ensure proper operation in a subroutine environment, the control flow between the caller and the callee must be passed through the call and return instructions. In other words, the caller cannot branch or jump into the callee outside of a call instruction, and the callee cannot branch or jump into the caller outside of a return instruction. This is because the call and return instructions do not merely modify the program counter, but also modify the state of the system, e.g., by pushing and popping return addresses and/or other variables onto the stack. If dynamic caller-callee branching were permitted outside of call and return instructions, the system state would not be guaranteed to be correct and it is possible that the program could prematurely terminate without all of the threads completing execution. The program module-specific MINRC techniques of this disclosure, however, prevent such dynamic caller-callee branches from occurring outside of call and return instructions as described below with respect to FIG. 6.

Figure 6:
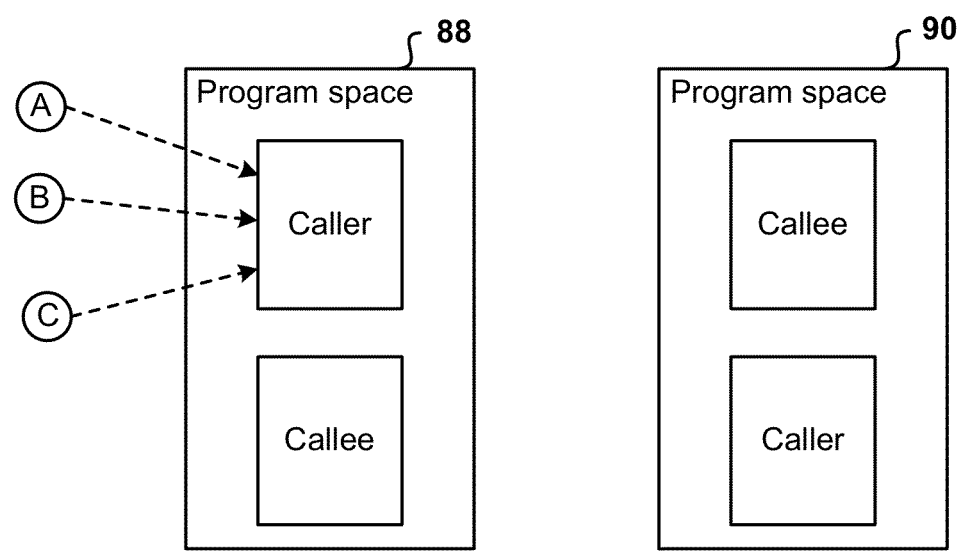
FIG. 6 is a conceptual diagram illustrating example program space arrangements in accordance with the techniques of this disclosure.

FIG. 6 is a conceptual diagram illustrating example program space arrangements 88, 90 in accordance with the techniques of this disclosure. Each of program space arrangements 88, 90 includes a caller program and a callee program. As shown in FIG. 6, the program spaces for the caller and the callee do not overlap in the program memory. Therefore, the caller program space is either above or below the callee program space as shown in FIG. 3. Consider the case on the left-hand side where the caller program space is above the callee program space. FIG. 6 illustrates three different instructions (A, B, C) in the caller program space. Instruction B occurs after Instruction A in the sequence of instructions for the caller program, and Instruction C occurs after Instruction B in the sequence of instructions for the caller program. Assume that, at Instruction A, the caller program deactivates one or more threads in response to the execution of a divergent branch instruction, and assume that the MINRC for the deactivated threads points to Instruction C. Prior to executing Instruction C, the caller program executes Instruction B, which is a call instruction. In response to executing Instruction B, control is transferred to the callee subroutine.

Consider the case where the same MINRC is used for controlling execution of the caller program and for controlling execution of the callee subroutine. In such a case, if the callee subroutine includes any forward jump instructions or forward branch instructions that are uniformly satisfied, such instructions are configured to jump to the lesser of the MINRC and the target instruction. In this case, because the MINRC points to an instruction in the caller program space (i.e., Instruction C), the MINRC is always less than any target program instruction in the callee program space. Therefore, a forward jump or forward branch instruction that is uniformly satisfied would cause the callee program to branch into the caller program space outside of a return instruction. As discussed above, such branching would not ensure proper operation of the system.

The program-module specific MINRC techniques of this disclosure, however, prevent caller-callee branching from occurring outside of call and return instructions. For example, a subroutine-specific MINRC for the callee program would not store a value that points to Instruction C in this example. Instead, when execution of the subroutine begins, a new subroutine-specific MINRC is initialized which is used for controlling execution of the subroutine. The subroutine-specific MINRC is indicative of a smallest resume counter value of all threads that are active when execution of the subroutine is initiated. Because the threads that have resume counter values pointing to Instruction C were already deactivated when execution of the subroutine began, such resume counter values would not affect the subroutine-specific MINRC. In this way, the techniques of this disclosure ensure that the control flow between the caller and the callee is passed through the call and return instructions FIGS. 7-18 are flow diagrams illustrating example instruction processing techniques that utilize the subroutine execution techniques of this disclosure. The example techniques shown in FIGS. 7-18 may be implemented, in some examples, in control flow unit 34 of either of FIGS. 2 and 3 and/or within processing system 10 of any of FIGS. 1-3. For ease of explanation, the techniques will be described with respect to control flow unit 34 shown in FIG. 2, but it should be understood that the techniques may be performed in other systems with the same or different components in the same or a different configuration.

Figure 7:
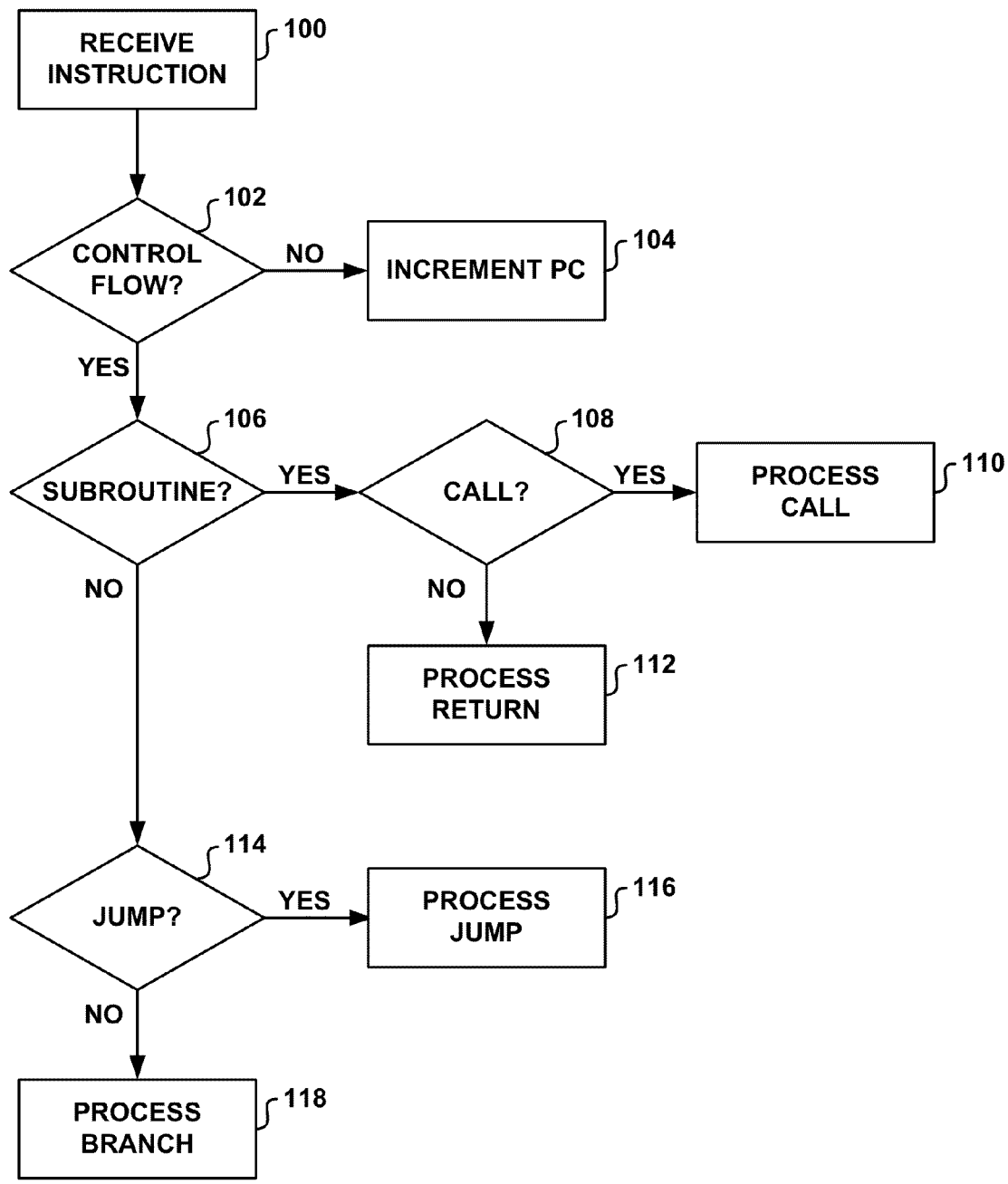
FIGS. 7-18 are flow diagrams illustrating example instruction processing techniques that utilize the subroutine execution techniques of this disclosure.

FIG. 7 is a flow diagram illustrating an example technique for determining a program counter value for a next instruction to be executed according to this disclosure. Control flow module 34 receives an instruction and/or control information associated with an instruction (100). Control flow module 34 determines whether the instruction is a control flow instruction (102). In response to determining that the instruction is not a control flow instruction, control flow module 34 increments program counter 28 (104). For example, control flow module 34 may select a program counter value to load into program counter 28 that is indicative of a next sequential instruction.

On the other hand, in response to determining that the instruction is a control flow instruction, control flow module 34 determines whether the control flow instruction is a subroutine instruction (106). Example subroutine instructions may include a call instruction and a return instruction. In response to determining that the instruction is subroutine instruction, control flow module 34 determines whether the instruction is a call instruction (108). In response to determining that the instruction is a call instruction, control flow module 34 processes the call instruction according to the techniques described in FIG. 8 (110). On the other hand, in response to determining that the instruction is a not call instruction (i.e., determining that the instruction is a return instruction), control flow module 34 processes the return instruction according to the techniques described in FIG. 9 (112).

Returning to decision box 106, in response to determining that the instruction is not a subroutine instruction, control flow module 34 determines whether the control flow instruction is a jump instruction (114). The jump instruction may be alternatively referred to as an unconditional branch instruction. In response to determining that the control flow instruction is a jump instruction, control flow module 34 processes the jump instruction according to the techniques described in FIG. 10 (116). Otherwise, in response to determining that the control flow instruction is a not a jump instruction (i.e., that the control flow instruction is a conditional branch instruction), control flow module 34 processes the conditional branch instruction according to the techniques described in FIGS. 12 and 13 (118).

Figure 8:
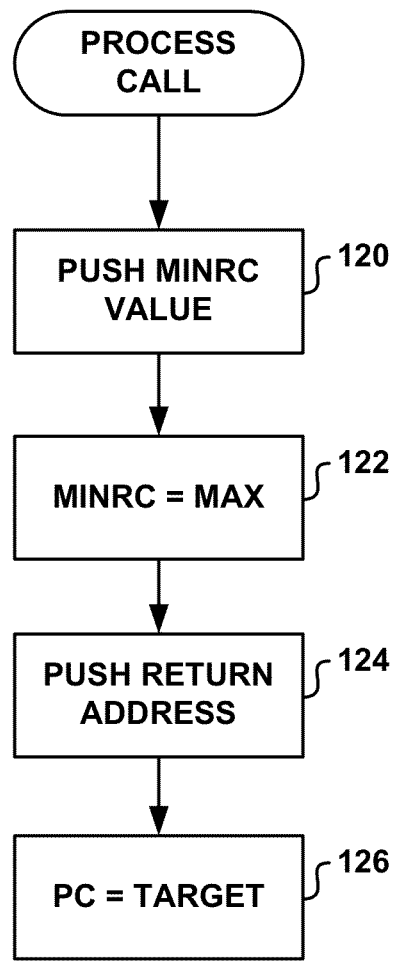

FIG. 8 is a flow diagram illustrating an example technique for processing a call instruction in accordance with the program module-specific MINRC execution techniques of this disclosure. Control flow module 34 pushes a value stored in a MINRC register for a MINRC associated with the caller program onto a MINRC stack (120). Control flow module 34 initializes the MINRC register to an initial value corresponding to the subroutine program module (122). In other words, control flow module 34 may overwrite the value stored in the MINRC register with an initial value for a MINRC associated with the callee program. Control flow module 34 pushes a return address onto a call stack (124). The return address may be indicative of a next sequential instruction in the caller program that occurs immediately after the call instruction. Control flow module 34 sets the program counter to a value indicative of the target instruction (i.e., a target program counter value) (126). The target instruction and/or the target program counter may be specified in the call instruction.

Figure 9:
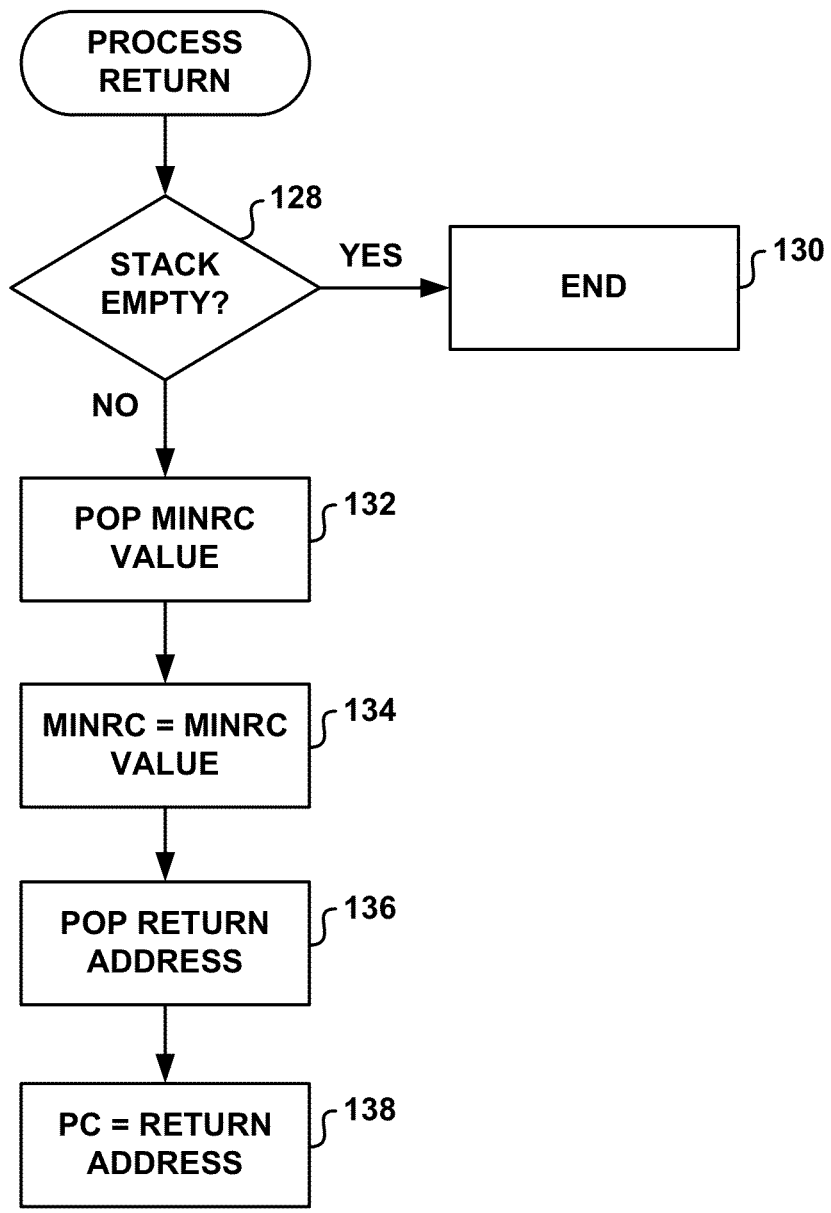

FIG. 9 is a flow diagram illustrating an example technique for processing a return instruction in accordance with the program module-specific MINRC execution techniques of this disclosure. Control flow module 34 determines whether the call stack is empty (128). In response to determining that the call stack is empty, control flow module 34 terminates the process (130). If the call stack is empty, this may mean that the return instruction is the ending instruction of a top-level program (i.e., a main program). In response to determining that the call stack is not empty, control flow module 34 pops a MINRC value off of the MINRC stack (132) and sets the MINRC register equal to the popped MINRC value (134). Control flow module 34 pops a return address off of the call stack (136) and sets the program counter register equal to the popped return address (138). The return address may be indicative of an instruction that occurs immediately after the call instruction that initiated execution of the subroutine which includes the return instruction currently being executed.

Figure 10:
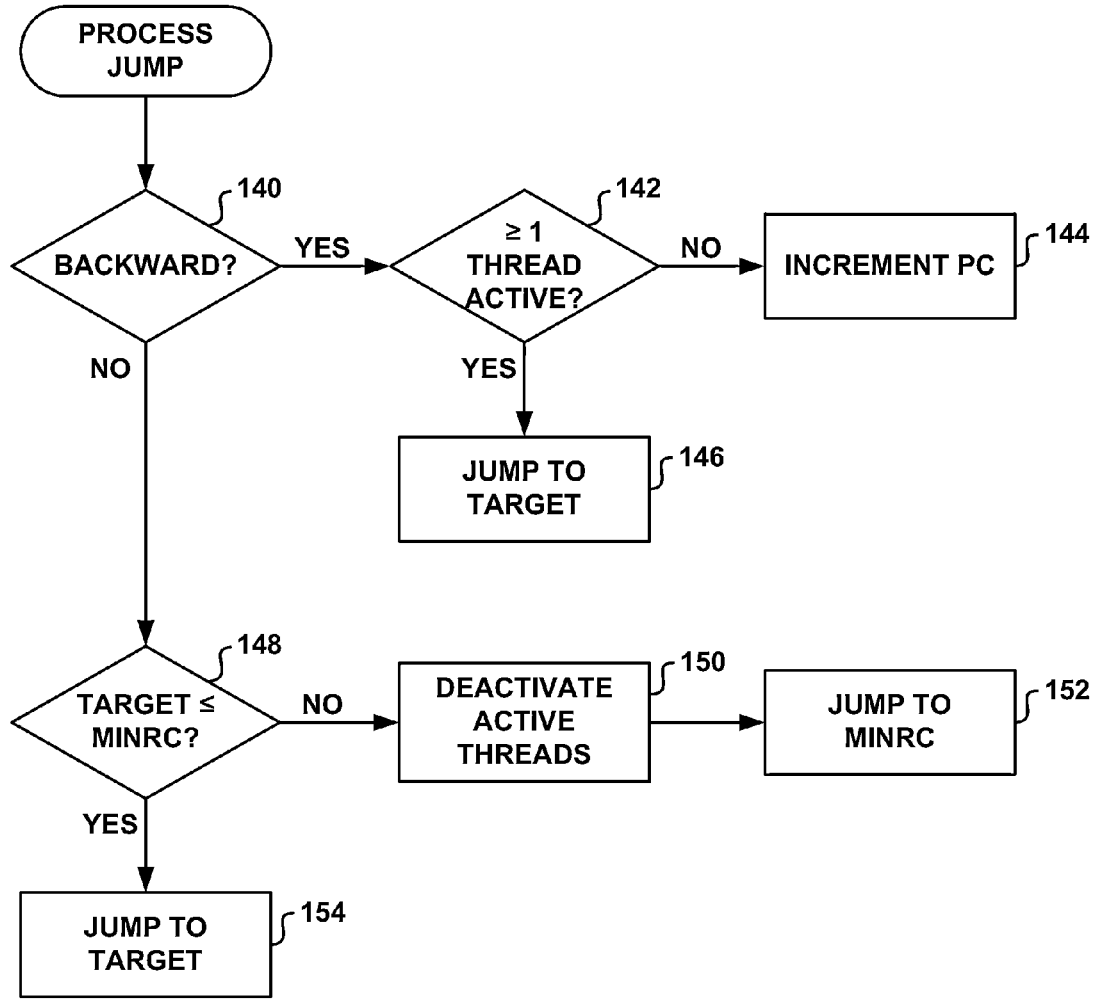

FIG. 10 is a flow diagram illustrating an example technique for processing a jump instruction in accordance with this disclosure. Control flow module 34 determines whether the jump instruction is a backward jump instruction (140). In some examples, control flow module 34 may determine whether the jump instruction is a backward jump instruction by determining whether the target program counter value for the jump instruction is greater than the program counter value that identifies the jump instruction. In further examples, the target program counter value for the jump instruction may be a relative target program counter value, which may indicate the difference between the target instruction and the program counter value which identifies the jump instruction. In such examples, control flow module 34 may determine whether the jump instruction is a backward jump instruction by determining whether the relative target program counter value for the jump instruction is less than zero. In additional examples, the forward and backward jump instructions may include different operational codes, i.e., opcodes. In such examples, control flow module 34 may determine whether the jump instruction is a backward jump instruction based on the opcode of the instruction.

If control flow module 34 determines that the jump instruction is a backward jump instruction, then control flow module 34 determines whether at least one thread is active (142). If control flow module 34 determines that no threads are active, then control flow module 34 increments program counter 28 (144). For example, control flow module 34 may select a program counter value to load into program counter 28 that is indicative of a next sequential instruction. On the other hand, if control flow module 34 determines that at least one thread is active, then control flow module 34 jumps to the target instruction (146). For example, control flow module 34 may select a target program counter value indicative of a target instruction identified by the jump instruction to load into program counter 28.

If control flow module 34 determines that the jump instruction is not a backward jump instruction (i.e., that the jump instruction is a forward jump instruction), then control flow module 34 determines whether target program counter value is less than or equal to the MINRC value (148). If control flow module 34 determines that that the target program counter value is not less than or equal to the MINRC value, then control flow module 34 deactivates all active threads (150). In some examples, control flow module 34 may use the technique illustrated in FIG. 11 to deactivate all of the active threads. In further examples, deactivating the active threads may include, for each thread being deactivated, deactivating and/or disabling a processing element 14 that is assigned to process instructions for the respective thread. Control flow module 34 proceeds to jump to the instruction identified by the MINRC value (152). For example, control flow module 34 may select the MINRC value as a value to load into program counter 28 in response to determining that the target program counter value is not less than or equal to the MINRC value. On the other hand, if control flow module 34 determines that the target program counter value is less than or equal to the MINRC value, then control flow module 34 jumps to the target instruction (154). For example, control flow module 34 may select a target program counter value indicative of a target instruction identified by the jump instruction as a value to load into program counter 28 in response to determining that the target program counter value is less than or equal to the MINRC value.

In this example, control flow module 34 selects the MINRC value to load into program counter 28 when the MINRC is less than the target program counter value in order to ensure that divergent threads that are scheduled to process instructions at lower-valued addresses execute prior to threads that are scheduled to process instructions at higher-valued addresses (i.e., a "least-valued address first" thread processing order).

Figure 11:
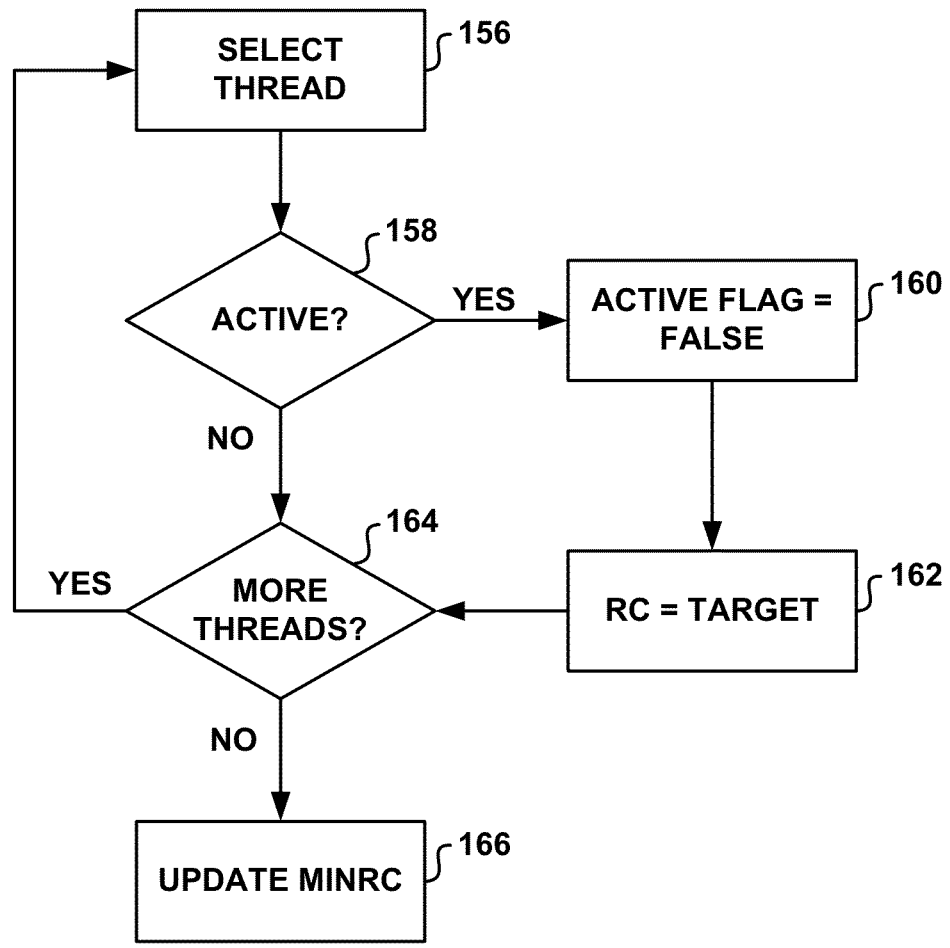

FIG. 11 is a flow diagram illustrating an example technique for deactivating all threads according to this disclosure. In some examples, the technique illustrated in FIG. 11 may be used to implement process box 150 illustrated in FIG. 10 or process box 198 illustrated in FIG. 13. Control flow module 34 selects a thread (156). Control flow module 34 determines whether the selected thread is active (158). If control flow module 34 determines that the selected thread is active, then control flow module 34 resets the active flag associated with the thread to a value of false (160), sets the resume counter associated with the thread to a target program counter value indicative of the target instruction identified by the jump or branch instruction (162), and proceeds to decision box 164. On the other hand, if control flow module 34 determines that the selected thread is not active, then control flow module 34 proceeds to decision box 164 without resetting the active flag for the thread and without setting the resume counter for the thread. In either case, control flow module 34 determines whether there are any more threads to process (164). If control flow module 34 determines that there are more threads to process, then control flow module 34 returns to process box 156 to process another thread.

Otherwise, if control flow module 34 determines that there are not any more active threads to process, then control flow module 34 updates the MINRC (166). For example, control flow module 34 may determine a smallest resume counter value from the set of resume counter values that corresponds to threads that are active when the execution of currently executing program module is initiated, and set the MINRC to a value indicative of the smallest resume counter value. In some examples, control flow module 34 may use either of the techniques illustrated in FIGS. 17 and 18 to update the MINRC.

Figure 13:
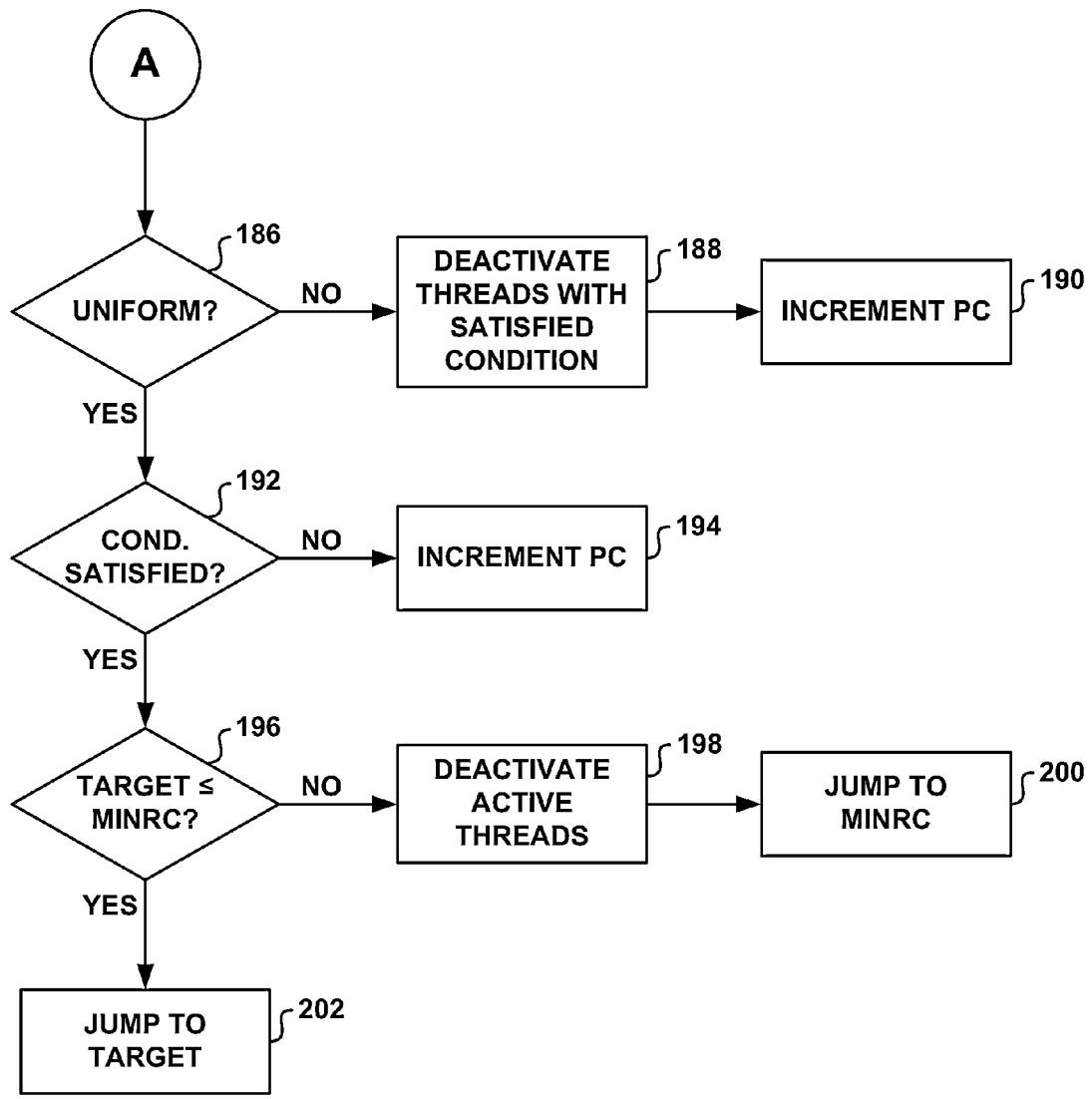

After updating the MINRC value, control flow module 34 ends the deactivation process and returns to the calling process, e.g., process box 152 in FIG. 10 or process box 200 in FIG. 13. Although FIG. 11 illustrates an example technique that deactivates multiple threads by sequentially deactivating each of the threads, in other examples, the multiple threads may be deactivated partially or fully in parallel, e.g., by using a strobe or common control line.

Figure 12:
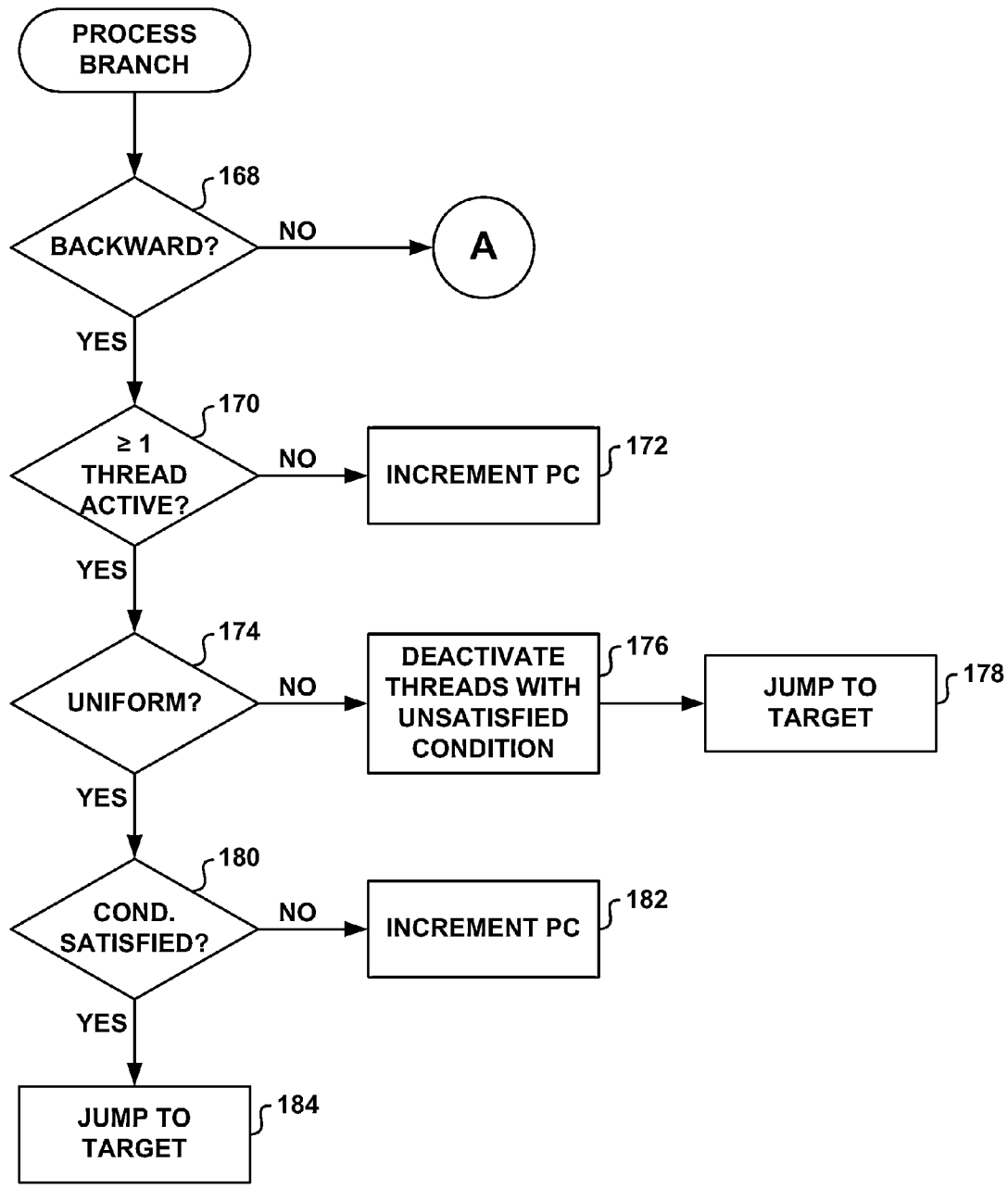

FIGS. 12 and 13 are flow diagrams illustrating an example technique for processing a branch instruction in accordance with this disclosure. Control flow module 34 determines whether the branch instruction is a backward branch instruction (168). The manner in which control flow module 34 may determine whether the branch instruction is a backward branch instruction may be substantially similar to that which was described above with respect to FIG. 10 for determining whether a jump instruction is a backward jump instruction, and in the interest of brevity, will not be described in further detail.

If control flow module 34 determines that the branch instruction is a backward branch instruction, then control flow module 34 determines whether at least one thread is active (170). If control flow module 34 determines that no threads are active, then control flow module 34 increments program counter 28 (172). For example, control flow module 34 may select a program counter value to load into program counter 28 that is indicative of a next sequential instruction. In this example, control flow module 34 may sequentially cycle through the program counter values until a lowest-valued resume counter is detected in order to ensure that divergent threads that are scheduled to process instructions at lower-valued addresses execute prior to threads that are scheduled to process instructions at higher-valued addresses.

On the other hand, if control flow module 34 determines that at least one thread is active, then control flow module 34 determines whether the divergence condition is uniform (i.e., whether the branching condition is uniformly satisfied or uniformly unsatisfied) (174). If control flow module 34 determines that the divergence condition is not uniform (i.e., the branch is divergent), then control flow module 34 may deactivate any active threads that do not satisfy the branch condition (176). In some examples, control flow module 34 may use the technique illustrated in FIG. 14 to deactivate the active threads that do not satisfy the branch condition. In further examples, deactivating the active threads that do not satisfy the branch condition may include, for each thread being deactivated, deactivating and/or disabling a processing element 14 that is assigned to process instructions for the respective thread. Control flow module 34 proceeds to jump to the target instruction (178). For example, control flow module 34 may select a target program counter value indicative of a target instruction identified by the branch instruction to load into program counter 28.

In this example, control flow module 34 deactivates threads that do not satisfy the branch condition in order to ensure that divergent threads that are scheduled to process instructions at lower-valued addresses execute prior to threads that are scheduled to process instructions at higher-valued addresses (i.e., a "least-valued address first" thread processing order). More specifically, the active threads that do not satisfy the branch condition are scheduled to execute the next sequential instruction, and the program counter value for the next sequential instruction is greater than the target program counter value associated with the target instruction. Thus, in a backward branch instruction, the active threads that do satisfy the branch condition are scheduled to execute prior to the threads that do not satisfy the branch condition.

Returning to decision box 174, if control flow module 34 determines that the divergence condition is uniform, then control flow module 34 determines whether the branching condition is satisfied (180). If control flow module 34 determines that the branching condition is not satisfied, then control flow module 34 increments program counter 28 (182). For example, control flow module 34 may select a program counter value to load into program counter 28 that is indicative of a next sequential instruction. In this case, control flow module 34 increments program counter 28 because all active threads are scheduled to execute the next sequential instruction due to the uniformly unsatisfied branch condition. On the other hand, if control flow module 34 determines that the branching condition is satisfied, then control flow module 34 jumps to the target instruction (184). For example, control flow module 34 may select a target program counter value indicative of a target instruction identified by the branch instruction to load into program counter 28. In this case, control flow module 34 jumps to the target instruction because all active threads are scheduled to execute the target instruction due to the uniformly satisfied branch condition.

Returning to decision box 168, if control flow module 34 determines that the branch instruction is not a backward branch instruction (i.e., that the branch instruction is a forward branch instruction), then control flow module 34 proceeds to decision box 186 in FIG. 13 where control flow module 34 determines whether the divergence condition is uniform (i.e., whether the branching condition is uniformly satisfied or uniformly unsatisfied) (186). If control flow module 34 determines that the divergence condition is not uniform (i.e., that the branching is divergent), then control flow module 34 may deactivate any active threads that satisfy the branch condition (188). In some examples, control flow module 34 may use the technique illustrated in FIG. 15 to deactivate the active threads that satisfy the branch condition. In further examples, deactivating the active threads that satisfy the branch condition may include, for each thread being deactivated, deactivating and/or disabling a processing element 14 that is assigned to process instructions for the respective thread. Control flow module 34 increments program counter 28 (190).

In this example, control flow module 34 deactivates threads that satisfy the branch condition in order to ensure that divergent threads that are scheduled to process instructions at lower-valued addresses execute prior to threads that are scheduled to process instructions at higher-valued addresses (i.e., a "least-valued address first" thread processing order). More specifically, the active threads that do not satisfy the branch condition are scheduled to execute the next sequential instruction, and the program counter value for the next sequential instruction is less than the target program counter value associated with the target instruction. Thus, in a forward branch instruction, the active threads that do not satisfy the branch condition are scheduled to execute prior to the threads that satisfy the branch condition.

Returning to decision box 186, if control flow module 34 determines that the divergence condition is uniform, then control flow module 34 determines whether the branching condition is satisfied (192). If control flow module 34 determines that the branching condition is not satisfied, then control flow module 34 increments program counter 28 (194). For example, control flow module 34 may select a program counter value to load into program counter 28 that is indicative of a next sequential instruction. In this case, control flow module 34 increments program counter 28 because all active threads are scheduled to execute the next sequential instruction due to the uniformly unsatisfied branch condition.

On the other hand, if control flow module 34 determines that the branching condition is satisfied, then control flow module 34 determines whether target program counter value is less than or equal to the MINRC value (196). If control flow module 34 determines that that the target program counter value is not less than or equal to the MINRC value, then control flow module 34 deactivates all active threads (198). In some examples, control flow module 34 may use the technique illustrated in FIG. 11 to deactivate all of the active threads. In further examples, deactivating the active threads may include, for each thread being deactivated, deactivating and/or disabling a processing element 14 that is assigned to process instructions for the respective thread. Control flow module 34 proceeds to jump to the instruction identified by the MINRC value (200). For example, control flow module 34 may select the MINRC value as a value to load into program counter 28 in response to determining that the target program counter value is not less than or equal to the MINRC value. On the other hand, if control flow module 34 determines that the target program counter value is less than or equal to the MINRC value, then control flow module 34 jumps to the target instruction (202). For example, control flow module 34 may select a target program counter value indicative of a target instruction identified by the branch instruction as a value to load into program counter 28 in response to determining that the target program counter value is less than or equal to the MINRC value.

In this example, control flow module 34 selects the MINRC value to load into program counter 28 when the MINRC is less than the target program counter value in order to ensure that divergent threads that are scheduled to process instructions at lower-valued addresses execute prior to threads that are scheduled to process instructions at higher-valued addresses (i.e., a "least-valued address first" thread processing order).

Figure 14:
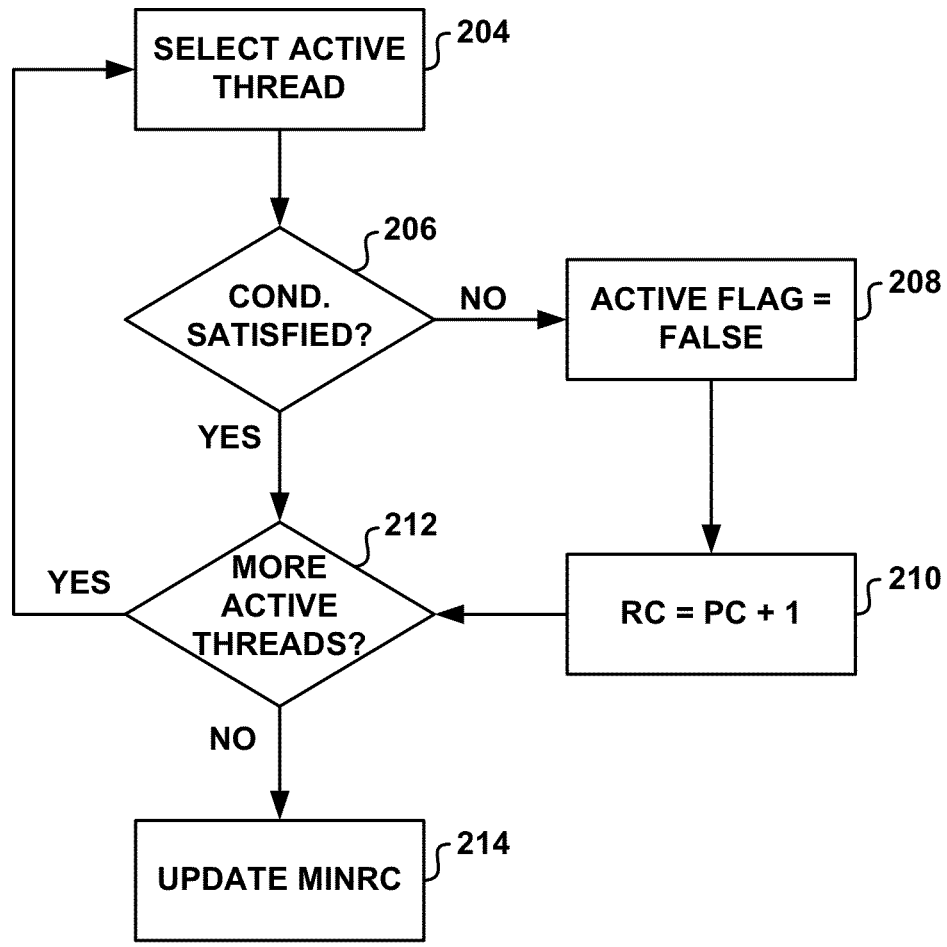

FIG. 14 is a flow diagram illustrating an example technique for deactivating active threads that do not satisfy a branch condition according to this disclosure. In some examples, the technique illustrated in FIG. 14 may be used to implement process box 176 illustrated in FIG. 12. Control flow module 34 selects an active thread (204). Control flow module 34 determines whether the branch condition is satisfied for the selected thread (206). If control flow module 34 determines that the branch condition is not satisfied for the selected thread, then control flow module 34 resets the active flag associated with the thread to a value of false (208), sets the resume counter associated with the thread to a program counter value indicative of the next sequential instruction (e.g., "PC+1") (210), and proceeds to decision box 212. In this case, the resume counter is set to a value indicative of the next sequential instruction because the branch condition was unsatisfied for the thread.

On the other hand, if control flow module 34 determines that the branch condition is satisfied for the selected thread, then control flow module 34 proceeds to decision box 212 without resetting the active flag for the thread and without setting the resume counter for the thread. In either case, control flow module 34 determines whether there are any more active threads to process (212). If control flow module 34 determines that there are more active threads to process, then control flow module 34 returns to process box 204 to process another active thread. Otherwise, if control flow module 34 determines that there are not any more active threads to process, then control flow module 34 updates the MINRC (214). Control flow module 34 may update the MINRC in a manner similar to that which is described above with respect to process box 166 in FIG. 11. After updating the MINRC, control flow module 34 ends the deactivation process and returns to the calling process, e.g., process box 178 in FIG. 12.

Figure 15:
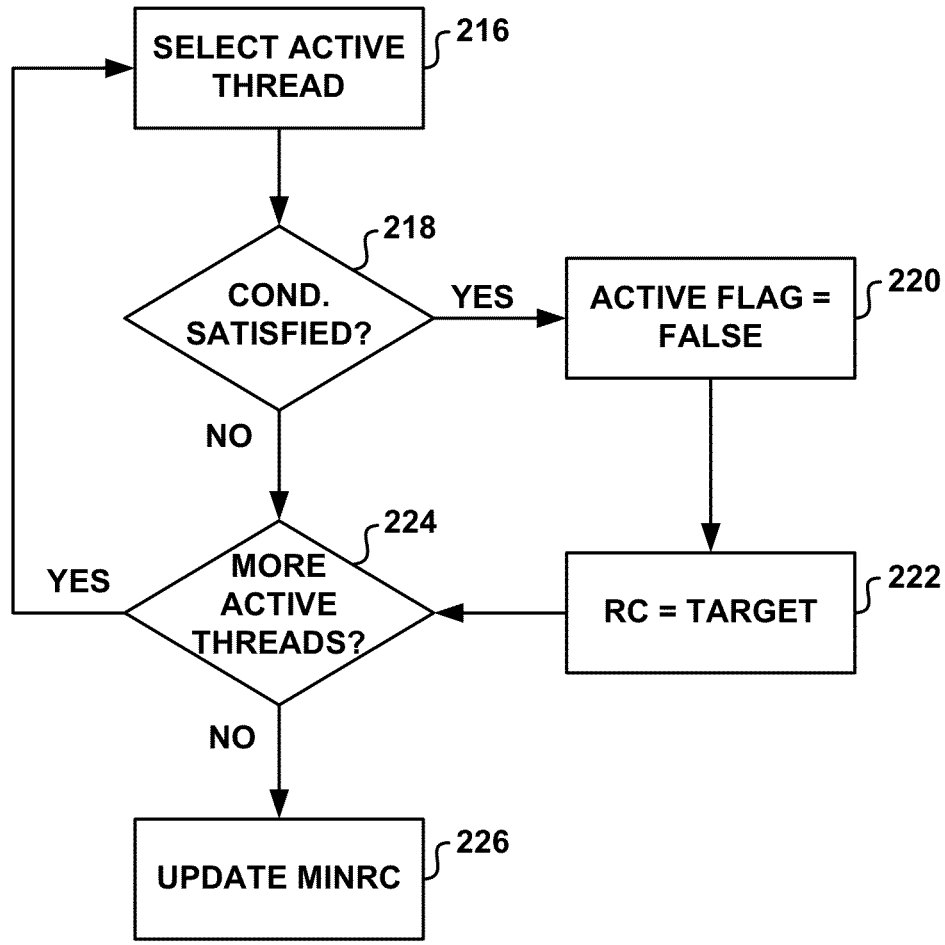

FIG. 15 is a flow diagram illustrating an example technique for deactivating active threads that satisfy a branch condition according to this disclosure. In some examples, the technique illustrated in FIG. 15 may be used to implement process box 188 illustrated in FIG. 13. Control flow module 34 selects an active thread (216). Control flow module 34 determines whether the branch condition is satisfied for the selected thread (218). If control flow module 34 determines that the branch condition is satisfied for the selected thread, then control flow module 34 resets the active flag associated with the thread to a value of false (220), sets the resume counter associated with the thread to a target program counter value indicative of the target instruction identified by the branch instruction (222), and proceeds to decision box 224. In this case, the resume counter is set to a value indicative of the target instruction because the branch condition was satisfied for the thread.

On the other hand, if control flow module 34 determines that the branch condition is not satisfied for the selected thread, then control flow module 34 proceeds to decision box 224 without resetting the active flag for the thread and without setting the resume counter for the thread. In either case, control flow module 34 determines whether there are any more active threads to process (224). If control flow module 34 determines that there are more active threads to process, then control flow module 34 returns to process box 216 to process another active thread. Otherwise, if control flow module 34 determines that there are not any more active threads to process, then control flow module 34 updates the MINRC (226). Control flow module 34 may update the MINRC in a manner similar to that which is described above with respect to process box 166 in FIG. 11. After updating the MINRC, control flow module 34 ends the deactivation process and returns to the calling process, e.g., process box 190 in FIG. 13.

Figure 16:
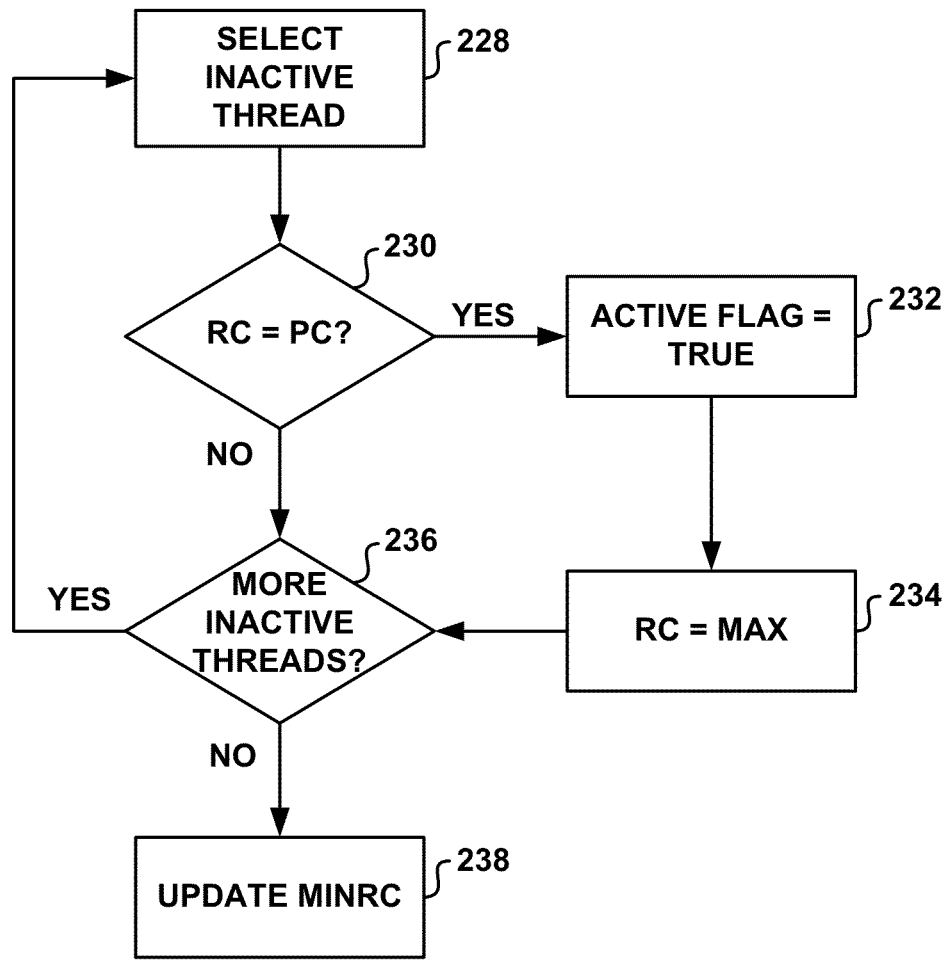

FIG. 16 is a flow diagram illustrating an example resume check technique for reactivating threads in accordance with this disclosure. In some examples, the technique illustrated in FIG. 16 may be performed each time a new program counter value is loaded into program counter 28. Control flow module 34 selects an inactive thread (228). Control flow module 34 determines whether the resume counter value for the inactive thread is equal to the program counter value (230). If control flow module 34 determines that the resume counter value for the inactive thread is equal to the program counter value, then control flow module 34 sets the active flag associated with the thread to a value of true (232), sets the resume counter associated with the thread to a maximum value (234), and proceeds to decision box 236. The maximum value, in some examples, may be a value that is the largest value that can be represented in the storage slot or register for the resume counter.

On the other hand, if control flow module 34 determines that the resume counter value for the inactive thread is not equal to the program counter value, then control flow module 34 proceeds to decision box 236 without setting the active flag for the thread and without setting the resume counter for the thread. In either case, control flow module 34 determines whether there are any more inactive threads to process (236). If control flow module 34 determines that there are more inactive threads to process, then control flow module 34 returns to process box 228 to process another inactive thread. Otherwise, if control flow module 34 determines that there are not any more inactive threads to process, then control flow module 34 updates the MINRC (238). Control flow module 34 may update the MINRC in a manner similar to that which is described above with respect to process box 166 in FIG. 11. After updating the MINRC value, control flow module 34 ends the resume check process.

Figure 17:
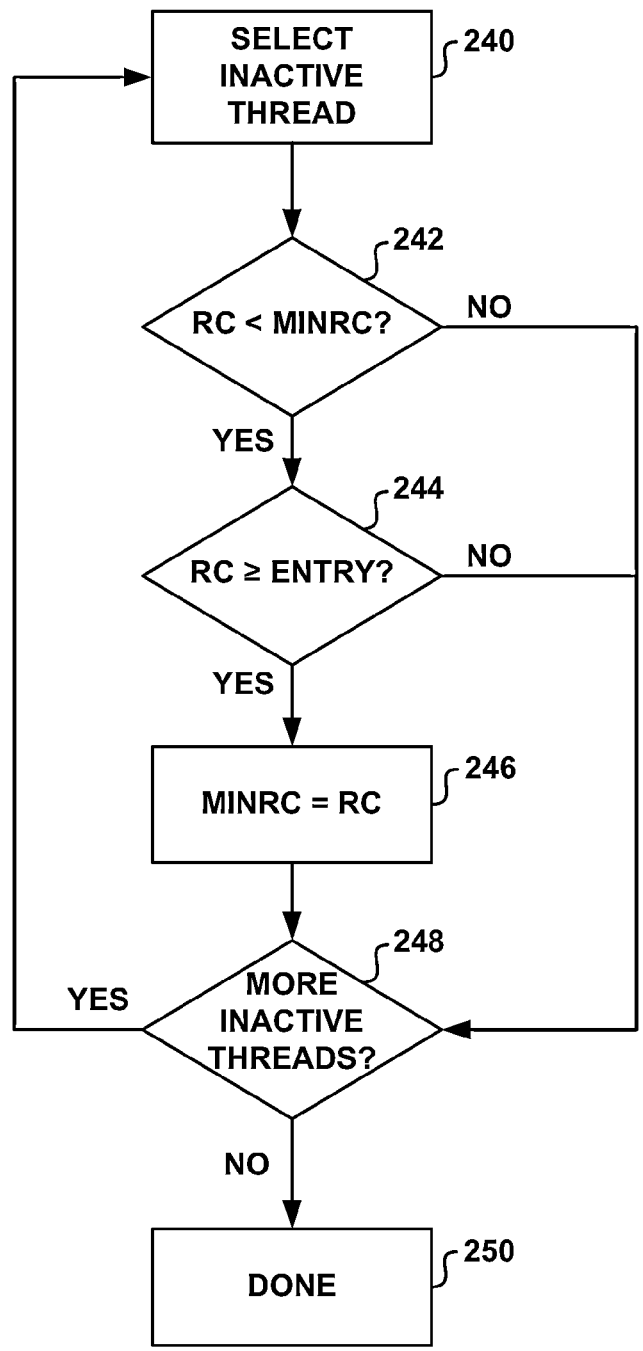

FIG. 17 is a flow diagram illustrating an example technique for updating a MINRC in accordance with this disclosure. In some examples, the technique illustrated in FIG. 17 may be used to implement process box 166 illustrated in FIG. 11, process box 214 illustrated in FIG. 14, process box 226 illustrated in FIG. 15 and/or process box 238 illustrated in FIG. 16. In general, the technique illustrated in FIG. 17 may be performed in response to updating one or more resume counters, which may occur in response to activating one or more threads as part of a resume check operation and/or in response to deactivating one or more threads in response to a divergent branch condition.

Control flow module 34 selects an inactive thread (240). Control flow module 34 determines whether the resume counter value for the inactive thread is less than the MINRC value (242). If control flow module 34 determines that the resume counter value for the inactive thread is less than the MINRC value, then control flow module 34 determines whether the resume counter value for the inactive thread is greater than or equal to an entry point for the currently executing program module (244). The entry point for the currently executing program module may refer to a program counter value that corresponds to a starting address of the program module that is currently being executed. If control flow module 34 determines that the resume counter value for the inactive thread is greater than or equal to an entry point for the currently executing program module, then control flow module 34 sets the MINRC equal to the resume counter value for the inactive thread (246), and proceeds to decision box 248.

Returning to decision box 242, if control flow module 34 determines that the resume counter value for the inactive thread is not less than the MINRC value (i.e., that the resume counter value for the inactive thread is greater than or equal to the MINRC value), then control flow module 34 may proceed to decision box 248 without setting the MINRC equal to the resume counter value for the inactive thread. Returning to decision box 244, if control flow module 34 determines that the resume counter value for the inactive thread is not greater than or equal to an entry point for the currently executing program module (i.e., the resume counter is less than the entry point), then control flow module 34 may proceed to decision box 248 without setting the MINRC equal to the resume counter value for the inactive thread.

In any case, control flow module 34 determines whether there are any more inactive threads to process (248). If control flow module 34 determines that there are more inactive threads to process, then control flow module 34 returns to process box 240 to process another inactive thread. Otherwise, if control flow module 34 determines that there are not any more inactive threads to process, then control flow module 34 ends the update MINRC process (250).

It should be noted that the flow diagram shown in FIG. 17 is just one example of a technique for updating a MINRC based on a comparison of resume counter values to entry points of a currently processed programming module. In additional examples, the order of decision boxes 242 and 244 may be switched or decision boxes 242 and 244 may be performed contemporaneously.

Figure 18:
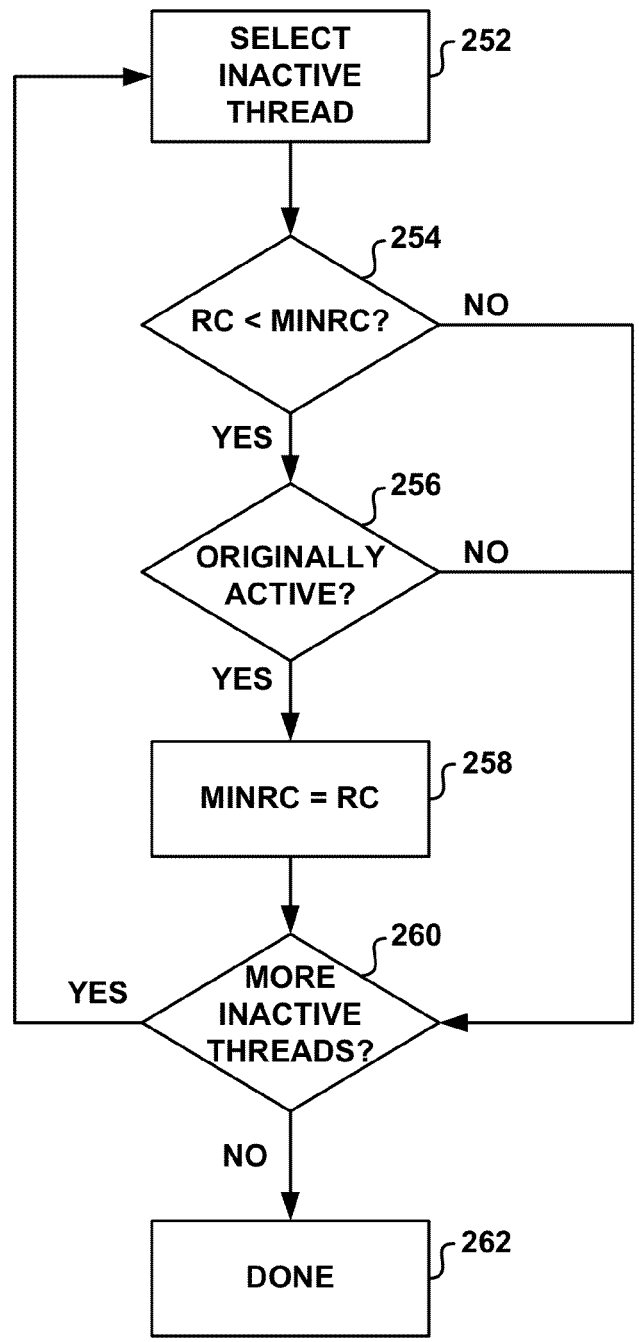

FIG. 18 is a flow diagram illustrating another example technique for updating a MINRC in accordance with this disclosure. In some examples, the technique illustrated in FIG. 18 may be used to implement process box 166 illustrated in FIG. 11, process box 214 illustrated in FIG. 14, process box 226 illustrated in FIG. 15 and/or process box 238 illustrated in FIG. 16. In general, the technique illustrated in FIG. 18 may be performed in response to updating one or more resume counters, which may occur in response to activating one or more threads as part of a resume check operation and/or in response to deactivating one or more threads in response to a divergent branch condition.

Control flow module 34 selects an inactive thread (252). Control flow module 34 determines whether the resume counter value for the inactive thread is less than the MINRC value (254). If control flow module 34 determines that the resume counter value for the inactive thread is less than the MINRC value, then control flow module 34 determines whether the inactive thread was originally active when execution of the currently executing program module was initiated (256). For example, control flow module 34 may maintain a set of flags where each flag stores a value that is indicative of whether a thread corresponding to the respective flag was active when execution of the currently executing program module was initiated. In such an example, control flow module 34 may determine whether the flag value corresponding to the inactive thread that is currently being processed indicates that the thread was active when execution of the currently executing program module was initiated. If control flow module 34 determines that the inactive thread was originally active when execution of the currently executing program module was initiated, then control flow module 34 sets the MINRC equal to the resume counter value for the inactive thread (258), and proceeds to decision box 260.

Returning to decision box 254, if control flow module 34 determines that the resume counter value for the inactive thread is not less than the MINRC value (i.e., that the resume counter value for the inactive thread is greater than or equal to the MINRC value), then control flow module 34 may proceed to decision box 260 without setting the MINRC equal to the resume counter value for the inactive thread. Returning to decision box 256, if control flow module 34 determines that the inactive thread was not originally active when execution of the currently executing program module was initiated, then control flow module 34 may proceed to decision box 260 without setting the MINRC equal to the resume counter value for the inactive thread.

In any case, control flow module 34 determines whether there are any more inactive threads to process (260). If control flow module 34 determines that there are more inactive threads to process, then control flow module 34 returns to process box 252 to process another inactive thread. Otherwise, if control flow module 34 determines that there are not any more inactive threads to process, then control flow module 34 ends the update MINRC process (262).

It should be noted that the flow diagram shown in FIG. 18 is just one example of a technique for updating a MINRC based on a comparison of resume counter values to entry points of a currently processed programming module. In additional examples, the order of decision boxes 254 and 256 may be switched or decision boxes 254 and 256 may be performed contemporaneously.

Figure 19:
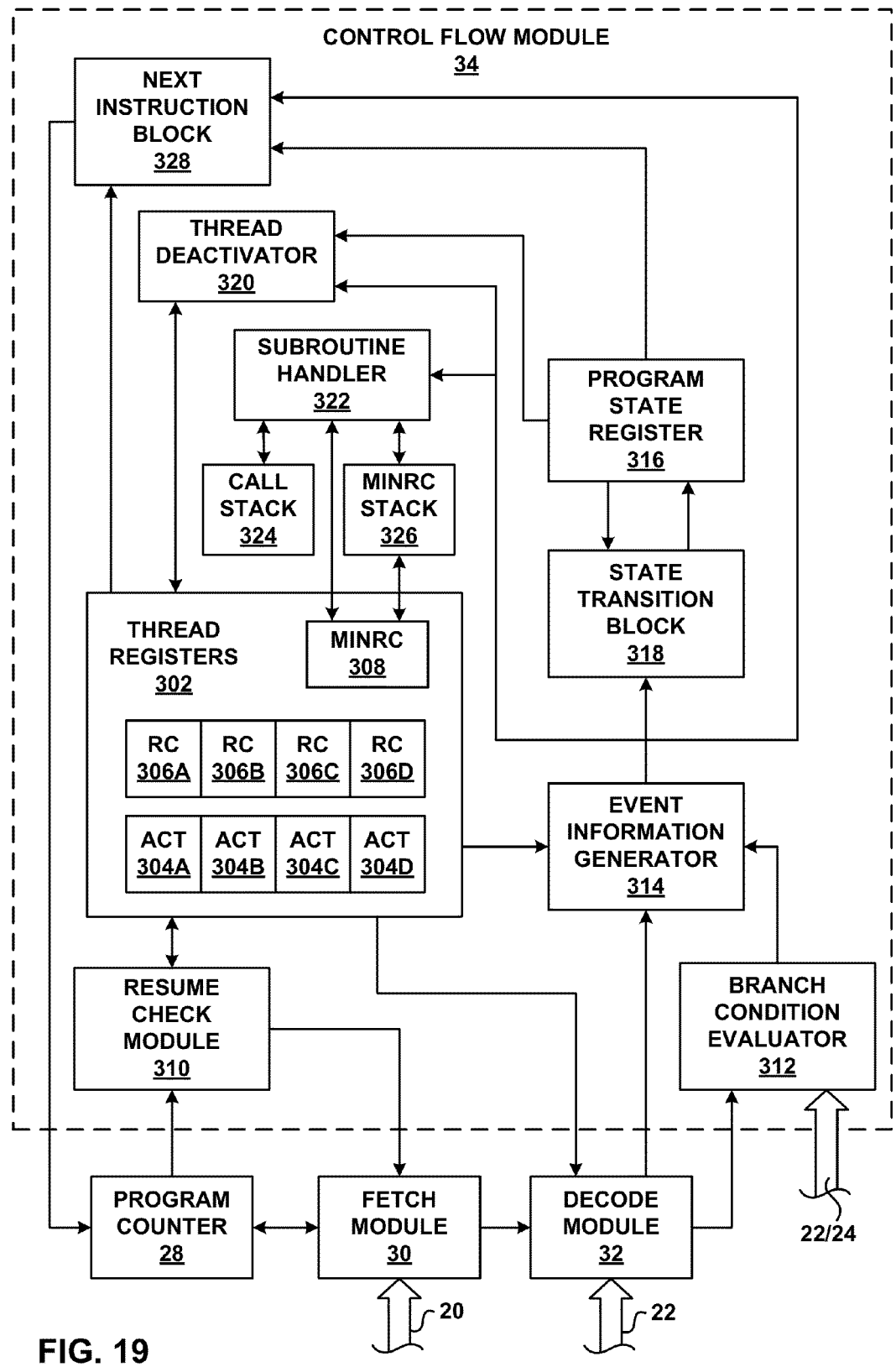
FIG. 19 is a block diagram illustrating another example control flow module that may be used to implement the subroutine execution techniques of this disclosure.

FIG. 19 is a block diagram illustrating an example control flow module 34 that may be used to implement the subroutine execution techniques of this disclosure. In some examples, the example control flow module 34 illustrated in FIG. 19 may be used to implement the techniques described above with respect to FIGS. 7-18. Control flow module 34 includes thread registers 302, active flags 304A-304D (collectively "active flags 304"), resume counters 306A-306D (collectively "resume counters 306"), a minimum resume counter (MINRC) 308, a resume check module 310, a branch condition evaluator 312, an event information generator 314, a program state register 316, a state transition block 318, a thread deactivator 320, a subroutine handler 322, a call stack 324, a MINRC stack 326, and a next instruction block 328.

In some examples, the example control flow module 34 illustrated in FIG. 19 may be used to implement the example control flow module 34 shown in FIG. 3. In such examples, resume counters 306 shown in FIG. 19 may correspond to resume counters 46 shown in FIG. 3, MINRC 308 shown in FIG. 19 may correspond to MINRC register 42 shown in FIG. 3, branch condition evaluator 312 shown in FIG. 19 may correspond to branch condition evaluator 40 shown in FIG. 3, and subroutine handler 322 shown in FIG. 19 may correspond to subroutine handler 50 shown in FIG. 3. Accordingly, in the interest of brevity and to avoid redundancy, the construction and operation of these shared components is not described in further detail. Moreover, event information generator 314, program state register 316, state transition block 318 and next instruction block 328 may be configured to implement the functionality of next instruction generator 44 shown in FIG. 3. Similarly, resume check module 310, event information generator 314, program state register 316, state transition block 318, and thread deactivator 320 may be configured to implement the functionality of thread state manager 48 shown in FIG. 3. In addition, call stack 324 and MINRC stack 326 may correspond to stack storage structure 52 shown in FIG. 3.

Thread registers 302 are configured to store the thread state for each of the threads executing in processing system 10. As shown in FIG. 19, thread registers 302 include active flags 304 and resume counters 306. Each of active flags 304 stores an active flag indicative of whether the status of a thread corresponding to the respective active flag 304A-304D is active. Each of resume counters 306 stores a resume counter value for a respective thread. In some examples, each thread may be assigned to a respective one of processing elements 14. In such examples, each of active flags 304 and resume counters 306 may correspond to a respective one of processing elements 14. For example, active flag 304A and resume counter 306A may each correspond to processing element 14A illustrated in FIG. 1, and active flag 304B and resume counter 306B may each correspond to processing element 14B illustrated in FIG. 1. Although the example control flow module 34 illustrated in FIG. 19 illustrates a system having four active flags 304 and four resume counters 306, in other examples, control flow module 34 may have the same or different numbers of active flags 304 and resume counters 306.

Thread registers 302 also includes a MINRC 308. MINRC 308 is configured to store a value indicative of a smallest value from the set of resume counters 306 that were active when execution of the currently executing program module was initiated.

Resume check module 310 is configured to perform a resume check operation in response to program counter 28 being loaded with a new program counter value. In some examples, resume check module 310 may perform the resume check operation in accordance with the resume check techniques illustrated in FIG. 16. Resume check module 310 may receive the current program counter value from program counter 28 and the current active flags 304 and resume counter values 306 from thread registers 302 to perform the resume check operation. Resume check module 310 may also modify active flags 304, resume counters 306 and MINRC 308 as part of the resume check operation. In addition, resume check module 310 may update program state register 316 based on the outcome of the resume check operation.

In some examples, after completing the resume check operation, resume check module 310 may send a signal to one or both of fetch module 30 and decode module 32 indicating that the resume check operation has completed. When fetch module 30 receives the signal that the resume check operation has completed, fetch module 30 may forward the fetched instruction to decode module 32 for further processing. In response to receiving the instruction, decode module 32 may check active flags 304 and update the active and inactive status of processing elements 14 based the current state of active flags 304, which may have been modified by the resume check operation. If the instruction is of a type that is issuable to processing elements 14, decode module 32 may issue the instruction to processing elements 14 in conjunction with or after updating the active and inactive status of processing elements 14. Although the example control flow module 34 illustrates resume check module 310 as signaling fetch module 30 upon completion of the resume check operation, in other examples, resume check module 158 may send the signal indicating that the resume check has completed to decode module 32. In such examples, when decode module 32 receives the signal, decode module 32 may check active flags 304 and update the active and inactive status of processing elements 14 based the current state of active flags 304.

When decode module 32 decodes instruction, if decode module 32 determines that the instruction is a branch instruction (i.e., a conditional branch instruction), then decode module 32 may send a signal to branch condition evaluator 312 indicating that the current instruction is a conditional branch instruction and provide information indicative of the branch condition to branch condition evaluator 312 for further processing. In some examples, if decode module 32 determines that the instruction is not a branch instruction (e.g., a jump instruction, a subroutine instruction, or a sequential instruction), then decode module 32 may send a signal to branch condition evaluator 160 indicating that the current instruction is not a conditional branch instruction.

Decode module 32 provides control information to event information generator 162 for further processing. In some examples, the control information may be the instruction itself. In further examples, the control information may include information, such as, e.g., information indicative of whether the instruction is a control flow instruction or a sequential instruction; if the instruction is a control flow instruction, information indicative of whether the instruction is a branch instruction, a jump instruction, a call instruction, or a return instruction; and if the instruction is a branch or jump instruction, information indicative of whether the branch or jump instruction is a forward or backward branch or jump instruction; and if the instruction is a branch instruction, information specifying the branch condition.

If the currently processed instruction is a conditional branch instruction, branch condition evaluator 312 may evaluate the branch condition for each active thread. In some examples, branch condition evaluator 312 may receive the result of a comparison operation or a zero check operation from processing elements 14 via communication path 22. In further examples, branch condition evaluator 312 may access one or more registers in data store 18, via communication path 24, and perform a comparison operation or a zero check operation. In any case, branch condition evaluator 312 may determine whether the branch condition is satisfied or not satisfied for each active thread. In some examples, branch condition evaluator 312 may forward information indicative of whether the branch condition is satisfied or not satisfied for each active thread to event information generator 314. In additional examples, branch condition evaluator 312 may determine whether the branching divergence for the current instruction is uniform or divergent and forward information indicative of whether the branching divergence is uniform or divergent to event information generator 314. In further examples, if the branching divergence is uniform for the branch instruction, branch condition evaluator 312 may determine whether the branch condition is uniformly satisfied or uniformly not satisfied, and forward information indicative of whether the branch condition is uniformly satisfied or uniformly not satisfied to event information generator 314.

Event information generator 314 receives control information from decode module 32 and, if the currently processed instruction is a branch instruction, receives branch condition information from branch condition evaluator 312. In some examples, event information generator 314 may also receive branching divergence information from branch condition evaluator 312 if the currently processed instruction is a branch instruction. If event information generator 314 does not receive branching divergence information from branch condition evaluator 312, then event information generator 314 may determine whether the branching divergence for the current instruction is uniform or divergent. Event information generator 314 may also determine whether the target program counter value for the currently processed instruction is less than or equal to the MINRC 308. Event information generator 314 generates events based on the received information, and provides the events to state transition block 318, thread deactivator 320, subroutine handler 322 and next instruction block 328.

In some examples, event information generator 314 may generate the following events:
Jb: Jump backward instruction
JfL: Jump forward instruction, target is less than or equal to MINRC
JfG: Jump forward instruction, target is greater than MINRC
BbuT: Branch backward instruction, all threads are uniform, condition is true
BbuF: Branch backward instruction, all threads are uniform, condition is false
BfuTL: Branch forward instruction, all threads are uniform, condition is true, Target is less than or equal to MINRC
BfuTG: Branch forward instruction, all threads are uniform, condition is true, Target is greater than MINRC
BfuF: Branch forward instruction, all threads are uniform, condition is false
Bbd: Branch backward instruction, threads are divergent
Bfd: Branch forward instruction, threads are divergent
S: Sequential instruction
Call: Jump to subroutine entry location
Ret: Jump to the next instruction immediately after call in the caller According to the above-identified events, an instruction may be a sequential instruction (S), a jump instruction (J), a branch instruction (B), a call instruction (Call), or a return instruction (Ret). For jump or branch instructions, the jump or branch direction may be either backward (b) or forward (f). For branch instructions, the branching divergence may be either uniform (u) or divergent (d). For branch instructions, the branching condition may be either true (T) or false (F). A true branch condition may correspond to a satisfied branch condition, and a false branch condition may correspond to an unsatisfied branch condition. The forward jump range may depend on whether the target is greater than the MINRC. Thus, a comparison result may be defined to indicate that the target is less than or equal to the MINRC (L) or that the target is greater than the MINRC (G).

Program state register 316 may store a program state for the program executing in processing system 10. In some examples, program state register 316 may store the following three states:
State 0: All threads are active.
State 1: At least one thread is active and at least one thread is inactive.
State 2: All threads are inactive.

In some examples, processing system 10 may be configured such that the initial state and final state of a program are each state 0.

State transition block 318 may receive an event from event information generator 314 and a current program state from program state register 316, generate a new program state based on the received events and the current program state, and store the new program state in program state register 316. State transition block 318 may generate the new program state in accordance with the state transition diagram described in further detail with respect to FIG. 20 and/or in accordance with the state transition table described in further detail with respect to FIG. 21.

Thread deactivator 320 may receive an event from event information generator 314 and a current program state from program state register 316, determine whether to deactivate one or more threads based on the event and the current program state, and deactivate one or more threads in response to certain combinations of events and current program states. When deactivating threads, thread deactivator 320 may update active flags 304 and resume counters 306 for the threads being deactivated. Thread deactivator 320 may deactivate threads in accordance with the state transition table described in further detail with respect to FIG. 21.

Subroutine handler 322 may receive an event from event information generator 314, and manage call stack 324, MINRC stack 326 and MINRC 308 based on the received event. For example, in response to receiving a Call event, subroutine handler 322 may push the MINRC value currently stored in MINRC 308 onto MINRC stack 326, and initialize MINRC 308 to a default value. Initializing MINRC 308 to the default value may include overwriting the MINRC value corresponding to the caller program that was previously stored in MINRC 308. Also in response to receiving a Call event, subroutine handler 322 may push a return address onto call stack 324. The return address may correspond to a next sequential instruction in the caller program that occurs immediately after the call instruction currently being processed.

In response to receiving a Ret event, subroutine handler 322 may pop the most recently stored MINRC value off of MINRC stack 326 and store the popped MINRC value in MINRC 308. Storing the popped MINRC value in MINRC 308 may include overwriting the MINRC value corresponding to the callee subroutine program that was previously stored in MINRC 308. Also in response to receiving a Ret event, subroutine handler 322 may pop the most recently stored return address off of call stack 324 and cause program counter 28 to be loaded with value corresponding to the popped return address. For example, subroutine handler 322 may pass the popped return address to next instruction block 328, which may select a program counter value corresponding to the popped return address to load into program counter 28 on the next instruction cycle.

Next instruction block 328 may receive an event from event information generator 314 and a current program state from program state register 316, determine a new program counter value to load into program counter 28, and load the new program counter value into program counter 28. The new program counter value may be indicative of a next instruction to be processed by control unit 12. Next instruction block 328 may determine the new program counter value in accordance with the state transition table described in further detail with respect to FIG. 21.

As discussed above, resume check module 310 may update program state register 316 based on the outcome of the resume check operation. This update may be performed by resume check module 310 in an asynchronous manner. For example, if the program state was State 1 prior to performing the resume check operation, and all inactive threads are reactivated, program state register 316 may change program state register 316 to State 0 in an asynchronous fashion to reflect that all threads are activated. It should be noted that state transition block 318 generates the new program state based on the current program state that is available after any updating by resume check module 310. Similarly, thread deactivator 320 determines whether to deactivate one or more threads based on the current program state that is available after any updating by resume check module 310, and next instruction block 328 determines a new program counter value based on the current program state that is available after any updating by resume check module 310. As such, although the program state may change between two different states during a single processing cycle due to a resume check, the final state for the processing cycle, i.e., the state that occurs after the resume check is complete, is used as the current program state for processing by each of state transition block 318, thread deactivator 320 and next instruction block 328.

In some examples, each of the components in control flow module 34 may be implemented as one or more hardware components within a processor. For example, thread registers 302, active flags 304, resume counters 306, MINRC 308, program state register 316, call stack 324, and/or MINRC stack 326 may each be implemented as one or more hardware registers. As another example, resume check module 310, branch condition evaluator 312, event information generator 314, state transition block 318, thread deactivator 320, subroutine handler 322 and/or next instruction block 328 may be implemented as combinational logic hardware and/or as a combination of combinational logic hardware and hardware registers.

Figure 20:
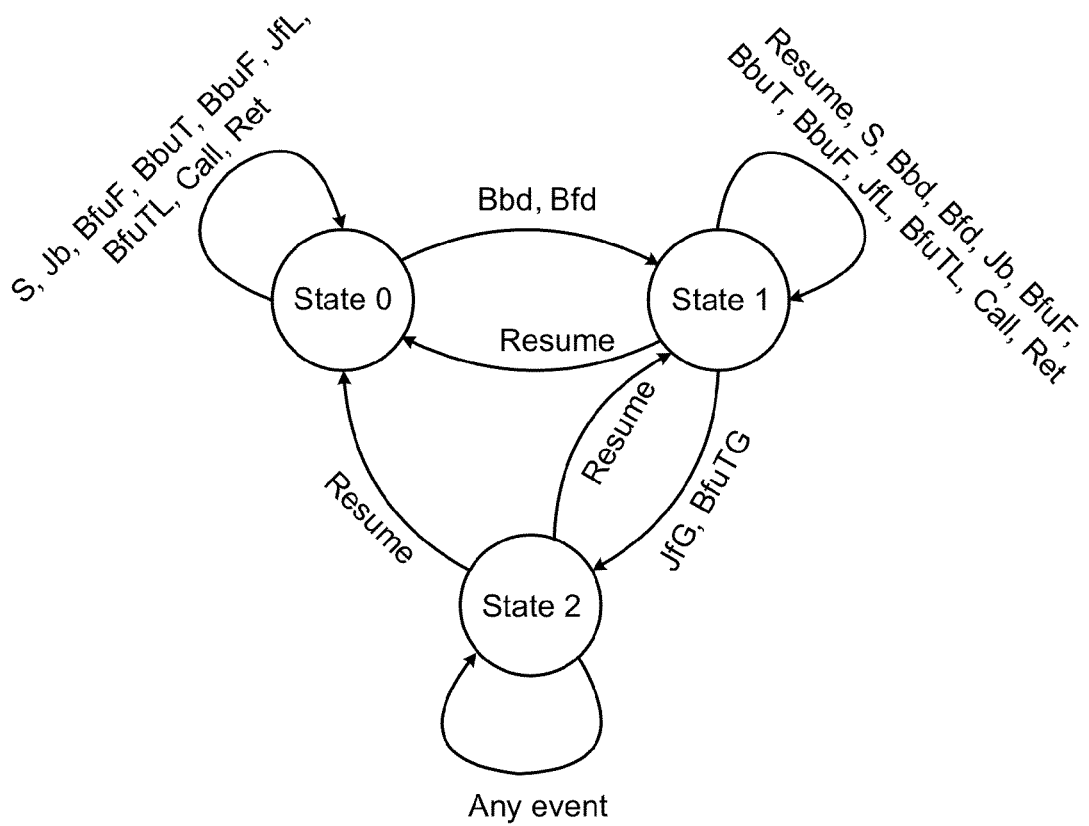
FIG. 20 is a state transition diagram that characterizes exemplary operation of the control flow module illustrated in FIG. 19 according to this disclosure.

FIG. 20 is a state transition diagram that characterizes exemplary operation of control flow module 34 illustrated in FIG. 19 according to this disclosure. The arrows shown in FIG. 20 represent transitions between the different states identified by the circles. The arrows are associated with one or both of events generated by event information generator 314 and a resume event. A resume event may be an asynchronous state transition that occurs as the result of a resume check operation where one or more threads are reactivated. The state transitions associated with the remaining events generated by event information generator 314 may be synchronous state transitions. A synchronous state transition may occur between processing cycles, and an asynchronous state transition may occur during the processing cycle. If an asynchronous state transition occurs during a processing cycle due to the resume check, then the state that occurs after the asynchronous transition is used to determine the next state for the next processing cycle.

FIG. 21 is a state transition table that characterizes exemplary operation of the control flow module 34 illustrated in FIG. 19 according to this disclosure. The state transition table in FIG. 21 includes an "OLD STATE" column, which represents the current program state, and a "NEW STATE" column, which represents either a new program state for a next processing cycle or a program state that occurs after an asynchronous transition due to a resume check operation. The state transition table also includes an "EVENT" column, which includes the events generated by event information generator 314. The indicator "n/a" in the "EVENT" column signifies that the state transition and action occurs due to a resume check operation and that the event is irrelevant for such a transition. The state transition table also includes an "ACTION" column that indicates what action takes place in response to a particular combination of a current program state and an event. The action labeled "Resume" in the "ACTION" column signifies that an asynchronous state transition occurs due to a resume check operation.

As shown in FIGS. 20 and 21, state transition block 318 selects State 0 as the new state to load into program state register 316 in response to the current state being State 0 and receiving an S event, a Jb event, a BfuF event, a BbuT event, a BbuF event, a JfL event, a BfuTL event, a Call event, or a Ret event. State transition block 318 selects State 1 as the new state to load into program state register 316 in response to the current state being State 0 and receiving a Bbd event or a Bfd event. State transition block 318 also selects State 1 as the new state to load into program state register 316 in response to the current state being State 1 and receiving an S event, a Jb event, a BbuF event, a BbuT event, a BfuF event, a Bbd event, a Bfd event, a JfL event, a BfuTL event, a Call event, or a Ret event. State transition block 318 selects State 2 as the new state to load into program state register 316 in response to the current state being State 1 and receiving a JfG event or a BfuTG event. State transition block 318 also selects State 2 as the new state to load into program state register 316 in response to the current state being State 2 and receiving any event. In response to reactivating one or more threads as part of a resume check operation, state transition block 318 may transition into State 0 or State 1 in an asynchronous manner.

As shown in FIG. 24, thread deactivator 320 may determine to deactivate one or more threads in response to the current state being either State 0 or State 1 and receiving a Bbd event or a Bfd event. The Bbd event and Bfd events may be referred to as divergence events resulting from the evaluation of a branch condition for a branch instruction. Thread deactivator 320 may determine to deactivate all active threads that do not satisfy the branch condition (i.e., false condition) in response to receiving a Bbd event, and to deactivate all active threads that satisfy the branch condition (i.e., true condition) in response to receiving a Bfd event. Thread deactivator 320 may utilize the technique illustrated in FIG. 14 to deactivate all active threads that do not satisfy the branch condition, and the technique illustrated in FIG. 15 to deactivate all active threads that satisfy the branch condition. Thread deactivator 320 may determine to deactivate all active threads in response to the current state being State 1 and receiving a JfG event or a BfuTG event. Thread deactivator 320 may utilize the technique illustrated in FIG. 11 to deactivate all active threads.

As shown in FIG. 24, next instruction block 328 may select one of the following program counter values to load into program counter 28 in response to various combinations of current program state and events: (1) a program counter value indicative of the next sequential instruction (i.e., "PC+1"); (2) a program counter value indicative of a target instruction (i.e., a target program counter value); (3) a minimum resume counter value (MINRC), or a program counter value indicative of a return address. For example, next instruction block 328 may select a program counter value indicative of the next sequential instruction (i.e., "PC+1") to load into program counter 28 in response to the current state being State 0 and receiving an S event, a BfuF event, a BbuF event, or a Bfd event. Next instruction block 328 may also select a program counter value indicative of the next sequential instruction to load into program counter 28 in response to the current state being State 1 and receiving an S event, a BbuF event, a BfuF event, or a Bfd event. Next instruction block 328 may also select a program counter value indicative of the next sequential instruction to load into program counter 28 in response to the current state being State 2 and receiving any event other than a JfL event or a JfG event.

Next instruction block 328 may select a program counter value indicative of a target instruction (i.e., a target program counter value) to load into program counter 28 in response to the current state being State 0 and receiving a Jb event, a BbuT event, a JfL event, a BfuTL event, a Bbd event, or a Call event. In the case where the event is a Call event, the target instruction may correspond to the subroutine entry point. Next instruction block 328 may also select a program counter value indicative of a target instruction to load into program counter 28 in response to the current state being State 1 and receiving a Jb event, a BbuT event, a Bbd event, a JfL event, a BfuTL event, or a Call event. Next instruction block 328 may also select a program counter value indicative of a target instruction to load into program counter 28 in response to the current state being State 2 and receiving a JfL event.

Next instruction block 328 may select the MINRC value to load into program counter 28 in response to the current state being State 1 and receiving a JfG event or a BfuTG event. Next instruction block 328 may also select the MINRC value to load into program counter 28 in response to the current state being State 2 and receiving a JfG event.

Next instruction block 328 may select a program counter value indicative of a return address to load into program counter 28 in response to the current state being State 0 and receiving a Ret event. Next instruction block 328 may also select a program counter value indicative of a return address to load into program counter 28 in response to the current state being State 1 and receiving a Ret event.

FIGS. 22-28 illustrate example pseudo-code for implementing the subroutine execution techniques of this disclosure. In particular, FIG. 22 illustrates example pseudo-code for implementing a resume check operation according to this disclosure. In some examples, the pseudo-code illustrated in FIG. 22 may correspond to the flow diagram illustrated in FIG. 16. FIG. 23 illustrates example pseudo-code for implementing jump instruction processing according to this disclosure. In some examples, the pseudo-code illustrated in FIG. 23 may correspond to the flow diagrams illustrated in FIGS. 10 and 11. FIG. 24 illustrates example pseudo-code for implementing branch instruction processing according to this disclosure. In some examples, the pseudo-code illustrated in FIG. 24 may correspond to the flow diagrams illustrated in FIGS. 11-15.

FIG. 25 illustrates example pseudo-code for implementing call instruction processing according to this disclosure. In some examples, the pseudo-code illustrated in FIG. 25 may correspond to the flow diagram illustrated in FIG. 8. As shown in FIG. 25, control flow unit 34 may push a value stored in MINRC register 42 for a caller program onto a MINRC stack in stack storage structure 52 to save the state of the MINRC corresponding to the caller program. In addition, control flow unit 34 may overwrite the value stored in MINRC register 42 with a default value (i.e., "MAX"). The default value may be used to initialize the MINRC for the callee program. Because the MINRC of the callee program corresponds to the smallest resume counter for all threads that are active when execution of the subroutine is initiated, all resume counters used to calculate the MINRC for the callee program are associated with active threads when the MINRC of the callee program is initialized. As discussed above, when a thread is active, the resume counter may be equal to an "infinite value" (e.g., a maximum register value), which in this case is denoted by "MAX." Therefore, when initialized, the MINRC for the callee program is equal to "MAX," which is the value of all resume counters associated with active threads when the callee program begins execution. As execution of the callee program progresses, one or more threads may be deactivated, which would then cause the MINRC to be updated to other values.

The call instruction may include a target value indicative of a target program instruction that corresponds to the first instruction of the callee subroutine. When executing the call instruction, control flow unit 34 may load program counter 28 with a value corresponding to the target instruction of the callee subroutine. Also when executing the call instruction, control flow unit 34 may push a return address, which corresponds to the next sequential instruction after the call instruction in the caller program, onto a call stack in stack storage structure 52.

The call stack specified in the pseudo-code may initially be empty at the entry point to the main program. In addition to pushing the return address onto the call stack, other state variables might also be pushed onto the call stack upon execution of a call instruction and popped off of the call stack after execution of a return instruction.

FIG. 26 illustrates example pseudo-code for implementing return instruction processing according to this disclosure. In some examples, the pseudo-code illustrated in FIG. 26 may correspond to the flow diagram illustrated in FIG. 9. As shown in FIG. 26, control flow unit 34 may pop the most recently saved MINRC value off of the MINRC stack in stack storage structure 52. The most recently saved MINRC value may correspond to a saved state of the MINRC corresponding to the caller program. Control flow unit 34 may overwrite a value stored in MINRC register 42 with the popped MINRC value. In addition, control flow unit 34 may pop the most recently saved return address from the call stack in stack storage structure 52, and load a value corresponding to the popped return address into program counter 28.

After executing the return instruction, MINRC register 42 is restored to the state it was in prior to executing the subroutine call instruction. By pushing and popping MINRC values onto and off of a stack as described above, the techniques of this disclosure may be able to implement subroutine-specific MINRCs while, in some examples, maintaining just a single MINRC register 42.

The example pseudo-code reproduced above saves the state of the return address and the state of the MINRC to two different stacks. That is, the return address is pushed onto a call stack and the MINRC is pushed onto a MINRC stack. In other examples, however, the return address and MINRC may be pushed onto the same stack as part of a single stack frame.

FIG. 27 illustrates example pseudo-code for performing an update MINRC operation according to this disclosure. In some examples, the pseudo-code illustrated in FIG. 27 may correspond to the flow diagram illustrated in FIG. 17. As shown in FIG. 27, control flow unit 34 cycles through all of the resume counters associated with all inactive threads executing in processing system 10. For each inactive thread, control flow unit 34 may set the MINRC equal to the resume counter value corresponding to the respective inactive thread if both of the following conditions are satisfied: (1) the resume counter value for the inactive thread is less than the current MINRC value; and (2) the resume counter value for the inactive thread is greater than or equal to the entry point of the subroutine (i.e., a program counter value corresponding to the starting address of the subroutine). By conditioning the update of the MINRC on whether the resume counter value for an inactive thread is greater than or equal to the entry point of the subroutine, the update MINRC operation shown in FIG. 27 may prevent one or more resume counters that are associated with threads that were inactive prior to initiating execution of the subroutine from affecting the resulting MINRC value. In this way, control flow unit 34 may ensure that the updated MINRC value for a subroutine-specific MINRC is within the program space allocated for the subroutine.

FIG. 28 illustrates example pseudo-code for performing an update MINRC operation according to this disclosure. In some examples, the pseudo-code illustrated in FIG. 27 may correspond to the flow diagram illustrated in FIG. 18. As shown in FIG. 28, control flow unit 34 cycles through all of the resume counters associated with all inactive threads executing in processing system 10. For each inactive thread, control flow unit 34 may set the MINRC equal to the resume counter value corresponding to the respective inactive thread if both of the following conditions are satisfied: (1) the resume counter value for the inactive thread is less than the current MINRC value; and (2) a flag associated with the respective inactive thread indicates that the thread was active when execution of the subroutine program was initiated. Thus, the update MINRC operation described above effectively excludes those resume counters that are associated with threads that were inactive when execution of the subroutine program was initiated. In this way, control flow unit 34 may ensure that the updated MINRC value for a subroutine-specific MINRC is within the program space allocated for the subroutine.

Figure 29:
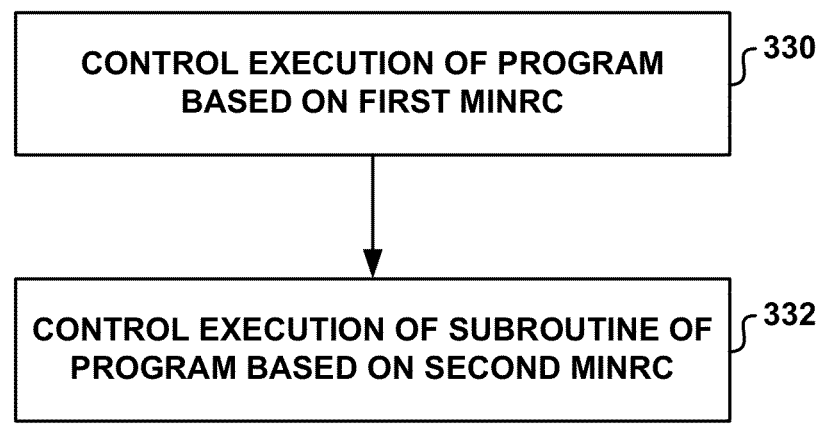
FIG. 29 is a flow diagram illustrating an example technique for controlling a processing system based on program module-specific MINRCs in accordance with this disclosure.

FIG. 29 is a flow diagram illustrating an example technique for controlling a processing system based on program module-specific MINRCs in accordance with this disclosure. Control unit 12 controls execution of a program based on a first MINRC (330). The first MINRC specifies a value that is indicative of a smallest resume counter value of a plurality of resume counter values associated with a plurality of threads. Control unit 12 controls execution of a subroutine of the program based on a second MINRC associated with the subroutine (332). The second MINRC specifies a value indicative of a smallest resume counter value from a subset of the plurality of resume counter values that corresponds to all of the threads that are active when execution of the subroutine is initiated. In some examples, controlling execution of a program module (e.g., a main program or a subroutine) based on a MINRC may include selecting a next instruction to execute in response to a forward jump instruction or a forward branch instruction where the branching condition is satisfied for all active threads based on the MINRC.

In some examples, each of the resume counter values may be indicative of a program counter value at which a respective one of the threads that corresponds to the respective resume counter value is scheduled to be activated if the respective one of the threads is inactive. In further examples, each of the resume counter values is equal to a default value if the respective one of the threads that corresponds to the respective resume counter value is active.

Figure 30:
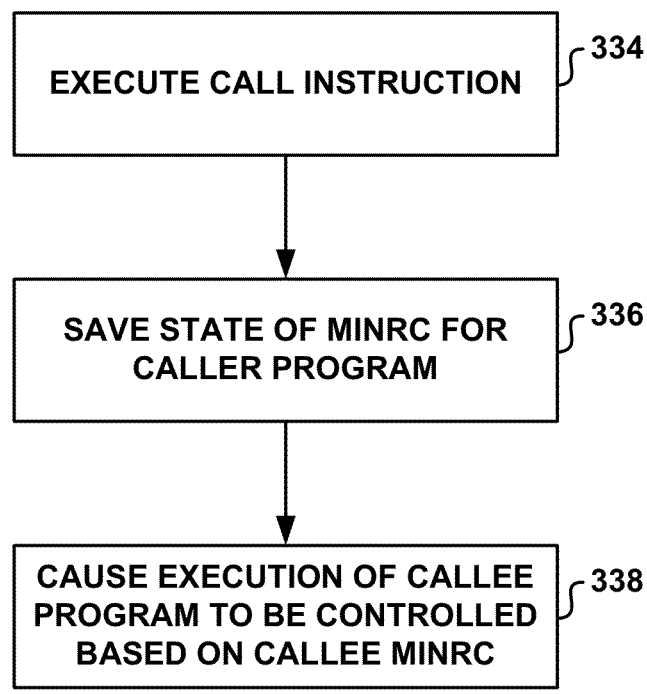
FIG. 30 is a flow diagram illustrating an example technique for executing a subroutine call instruction in accordance with this disclosure.

FIG. 30 is a flow diagram illustrating an example technique for executing a subroutine call instruction in accordance with this disclosure. Control unit 12 executes a call instruction (334). In response to executing the call instruction, control unit 12 saves a state of a first MINRC corresponding to the caller program (336). For example, control unit 12 may push a value stored in MINRC register 42 onto a stack storage structure 52. In response to executing the call instruction, control unit 12 causes execution of the callee subroutine program to be controlled based on a second MINRC corresponding to the callee subroutine program (338). That is, control unit 12 may cause the second MINRC to be used to control execution of the subroutine program (e.g., to control the selection of a next instruction in response to a forward jump instruction or a forward branch instruction where the branching condition is satisfied for all active threads). In some examples, in order to cause the second MINRC to be used to control execution of the subroutine program, control unit 12 may initialize MINRC register 42 such that MINRC register 42 stores an initial MINRC value for the second MINRC corresponding to the callee program. Initializing the MINRC register 42, in some examples, may include overwriting a value stored in MINRC register 42 corresponding to the first MINRC with an initial MINRC value corresponding to the second MINRC. The initial MINRC value stored in MINRC register 42 may be a default MINRC value (e.g., a maximum register value or a value that is greater than the program counter range needed for the program).

Figure 31:
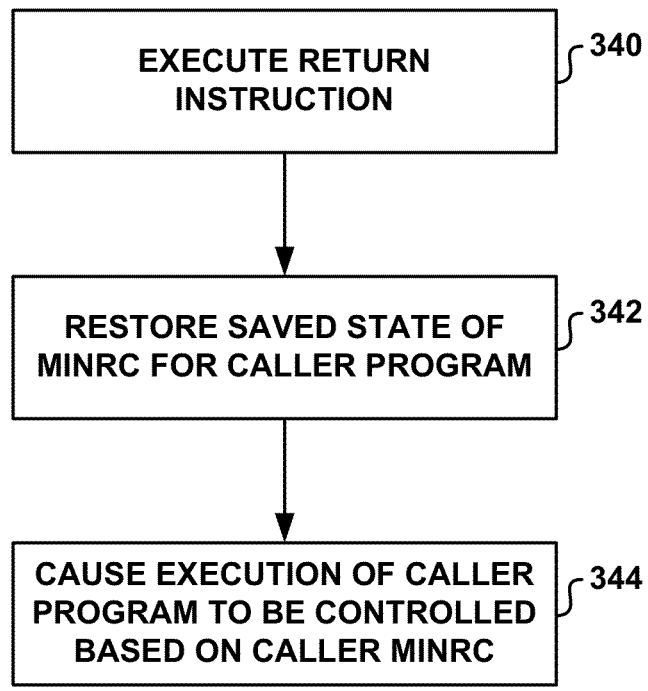
FIG. 31 is a flow diagram illustrating an example technique for executing a subroutine return instruction in accordance with this disclosure.

FIG. 31 is a flow diagram illustrating an example technique for executing a subroutine return instruction in accordance with this disclosure. Control unit 12 executes a return instruction (340). In response to executing the return instruction, control unit 12 restores a saved state of a first MINRC corresponding to the caller program of the subroutine that is currently being executed (342). For example, control unit 12 may pop a MINRC value stored in stack storage structure 52 that corresponds to the saved state of the first MINRC. In response to executing the return instruction, control unit 12 causes execution of the caller program to be controlled based on the first MINRC corresponding to the caller program (344). That is, control unit 12 may cause the first MINRC to be used to control execution of the caller program (e.g., to control the selection of a next instruction in response to a forward jump instruction or a forward branch instruction where the branching condition is satisfied for all active threads). In some examples, in order to cause execution of the caller program to be controlled based on the first MINRC corresponding to the caller program, control unit 12 may store the popped MINRC value in MINRC register 42. Storing the popped MINRC value in MINRC register 42 may, in some examples, include overwriting a value stored in MINRC register 42 that corresponds to a MINRC for the subroutine with a value corresponding to the popped MINRC value.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
controlling, with one or more processors, execution of a program based on a first minimum resume counter (MINRC), the first MINRC specifying a value that is indicative of a smallest resume counter value of a plurality of resume counter values associated with a plurality of threads of execution for the program; and
controlling, with the one or more processors, execution of a subroutine of the program based on a second MINRC associated with the subroutine, the second MINRC specifying a value indicative of a smallest resume counter value from a subset of the plurality of resume counter values that corresponds to all of the threads that are active when execution of the subroutine is initiated.

2. The method of claim 1, further comprising:
saving a state of the first MINRC in response to executing a subroutine call instruction; and
causing execution of the subroutine to be controlled based on the second MINRC in response to executing the subroutine call instruction.

3. The method of claim 2,
wherein saving the state of the first MINRC comprises pushing a value stored in a MINRC register for the first MINRC onto a stack storage structure, and
wherein causing execution of the subroutine to be controlled based on the second MINRC comprises overwriting the value stored in the MINRC register with an initial value for the second MINRC.

4. The method of claim 2, further comprising:
causing execution of the program to be controlled based on the saved state of the first MINRC in response to executing a subroutine return instruction.

5. The method of claim 4, wherein causing execution of the program to be controlled based on the saved state of the first MINRC comprises:
popping the saved state of the first MINRC from a stack storage structure; and
overwriting a value stored in the MINRC register with a value corresponding to the saved state of the first MINRC.

6. The method of claim 1, wherein each of the resume counter values is indicative of a program counter value at which a respective one of the threads that corresponds to the respective resume counter value is scheduled to be activated if the respective one of the threads is inactive.

7. The method of claim 6, wherein each of the resume counter values is equal to a default value if the respective one of the threads that corresponds to the respective resume counter value is active.

8. The method of claim 1, further comprising:
setting the second MINRC to a value indicative of the smallest resume counter value from the subset of the plurality of resume counter values.

9. The method of claim 8, wherein setting the second MINRC comprises:
for each inactive thread, setting the second MINRC equal to a resume counter value for the respective inactive thread if the resume counter value for the respective inactive thread is less than the second MINRC and the resume counter value for the respective inactive thread is greater than or equal to a value indicative of a first instruction of the subroutine.

10. The method of claim 8, wherein setting the second MINRC comprises:
for each inactive thread, setting the second MINRC equal to a resume counter value for the respective inactive thread if the resume counter value for the respective inactive thread is less than the second MINRC value and a flag associated with the respective inactive thread indicates that the inactive thread was active when execution of the subroutine was initiated.

11. The method of claim 10, further comprising:
for each of the threads, in response to initiating execution of the subroutine, setting a flag corresponding to the respective thread to active status if the thread is active when execution of the subroutine was initiated; and for each of the threads, in response to initiating execution of the subroutine, setting the flag corresponding to the respective thread to an inactive status if the thread is not active when execution of the subroutine was initiated.

12. A device comprising:
one or more processors configured to control execution of a program based on a first minimum resume counter (MINRC) and control execution of a subroutine of the program based on a second MINRC associated with the subroutine, the first MINRC specifying a value that is indicative of a smallest resume counter value of a plurality of resume counter values associated with a plurality of threads of execution for the program, the second MINRC specifying a value indicative of a smallest resume counter value from a subset of the plurality of resume counter values that corresponds to all of the threads that are active when execution of the subroutine is initiated.

13. The device of claim 12, wherein the one or more processors is further configured to save a state of the first MINRC in response to executing a subroutine call instruction, and cause execution of the subroutine to be controlled based on the second MINRC in response to executing the subroutine call instruction.

14. The device of claim 13, wherein the one or more processors is further configured to push a value stored in a MINRC register for the first MINRC onto a stack storage structure, and overwrite the value stored in the MINRC register with an initial value for the second MINRC.

15. The device of claim 13, wherein the one or more processors is further configured to cause execution of the program to be controlled based on the saved state of the first MINRC in response to executing a subroutine return instruction.

16. The device of claim 15, wherein the one or more processors is further configured to pop the saved state of the first MINRC from a stack storage structure and overwrite a value stored in the MINRC register with a value corresponding to the saved state of the first MINRC.

17. The device of claim 12, wherein each of the resume counter values is indicative of a program counter value at which a respective one of the threads that corresponds to the respective resume counter value is scheduled to be activated if the respective one of the threads is inactive.

18. The device of claim 17, wherein each of the resume counter values is equal to a default value if the respective one of the threads that corresponds to the respective resume counter value is active.

19. The device of claim 12, wherein the one or more processors is further configured to set the second MINRC to a value indicative of the smallest resume counter value from the subset of the plurality of resume counter values.

20. The device of claim 19, wherein the one or more processors is further configured to, for each inactive thread, set the second MINRC equal to a resume counter value for the respective inactive thread if the resume counter value for the respective inactive thread is less than the second MINRC and the resume counter value for the respective inactive thread is greater than or equal to a value indicative of a first instruction of the subroutine.

21. The device of claim 19, wherein the one or more processors is further configured to, for each inactive thread, set the second MINRC equal to a resume counter value for the respective inactive thread if the resume counter value for the respective inactive thread is less than the second MINRC value and a flag associated with the respective inactive thread indicates that the inactive thread was active when execution of the subroutine was initiated.

22. The device of claim 21, wherein the one or more processors is further configured to, for each of the threads, set a flag corresponding to the respective thread to active status in response to initiating execution of the subroutine if the thread is active when execution of the subroutine was initiated, and for each of the threads, set the flag corresponding to the respective thread to an inactive status in response to initiating execution of the subroutine if the thread is not active when execution of the subroutine was initiated.

23. The device of claim 12, wherein the device comprises a wireless communication device.

24. The device of claim 12, wherein the device comprises a mobile phone handset.

25. An apparatus comprising:
means for controlling execution of a program based on a first minimum resume counter (MINRC), the first MINRC specifying a value that is indicative of a smallest resume counter value of a plurality of resume counter values associated with a plurality of threads of execution for the program; and means for controlling execution of a subroutine of the program based on a second MINRC associated with the subroutine, the second MINRC specifying a value indicative of a smallest resume counter value from a subset of the plurality of resume counter values that corresponds to all of the threads that are active when execution of the subroutine is initiated.

26. The apparatus of claim 25, further comprising:
means for saving a state of the first MINRC in response to executing a subroutine call instruction; and means for causing execution of the subroutine to be controlled based on the second MINRC in response to executing the subroutine call instruction.

27. The apparatus of claim 26,
wherein the means for saving the state of the first MINRC comprises means for pushing a value stored in a MINRC register for the first MINRC onto a stack storage structure, and wherein the means for causing execution of the subroutine to be controlled based on the second MINRC in response to executing the subroutine call instruction comprises means for overwriting the value stored in the MINRC register with an initial value for the second MINRC.

28. The apparatus of claim 26, further comprising:
means for causing execution of the program to be controlled based on the saved state of the first MINRC in response to executing a subroutine return instruction.

29. The apparatus of claim 28, wherein the means for causing execution of the program to be controlled based on the saved state of the first MINRC in response to executing a subroutine return instruction comprises:
means for popping the saved state of the first MINRC from a stack storage structure; and means for overwriting a value stored in the MINRC register with a value corresponding to the saved state of the first MINRC.

30. The apparatus of claim 25, wherein each of the resume counter values is indicative of a program counter value at which a respective one of the threads that corresponds to the respective resume counter value is scheduled to be activated if the respective one of the threads is inactive.

31. The apparatus of claim 30, wherein each of the resume counter values is equal to a default value if the respective one of the threads that corresponds to the respective resume counter value is active.

32. The apparatus of claim 25, further comprising:
means for setting the second MINRC to a value indicative of a smallest resume counter value from the subset of the plurality of resume counter values.

33. A non-transitory computer-readable storage medium storing instructions that, when executed, cause one or more processors to:
control execution of a program based on a first minimum resume counter (MINRC), the first MINRC specifying a value that is indicative of a smallest resume counter value of a plurality of resume counter values associated with a plurality of threads of execution for the program; and
control execution of a subroutine of the program based on a second MINRC associated with the subroutine, the second MINRC specifying a value indicative of a smallest resume counter value from a subset of the plurality of resume counter values that corresponds to all of the threads that are active when execution of the subroutine is initiated.

34. The non-transitory computer-readable storage medium of claim 33, further comprising instructions that, when executed, cause one or more processors to:
save a state of the first MINRC in response to executing a subroutine call instruction; and
cause execution of the subroutine to be controlled based on the second MINRC in response to executing the subroutine call instruction.

35. The non-transitory computer-readable storage medium of claim 34,
wherein the instructions that cause the one or more processors to save the state of the first MINRC comprise instructions that cause the one or more processors to push a value stored in a MINRC register for the first MINRC onto a stack storage structure, and
wherein the instructions that cause the one or more processors to cause execution of the subroutine to be controlled based on the second MINRC in response to executing the subroutine call instruction comprise instructions that cause the one or more processors to overwrite the value stored in the MINRC register with an initial value for the second MINRC.

36. The non-transitory computer-readable storage medium of claim 34, further comprising instructions that, when executed, cause one or more processors to:
cause execution of the program to be controlled based on the saved state of the first MINRC in response to executing a subroutine return instruction.

37. The non-transitory computer-readable storage medium of claim 36, wherein the instructions that cause the one or more processors to cause execution of the program to be controlled based on the saved state of the first MINRC in response to executing a subroutine return instruction comprise instructions that cause the one or more processors to:
pop the saved state of the first MINRC from a stack storage structure; and
overwrite a value stored in the MINRC register with a value corresponding to the saved state of the first MINRC.

38. The non-transitory computer-readable storage medium of claim 33, wherein each of the resume counter values is indicative of a program counter value at which a respective one of the threads that corresponds to the respective resume counter value is scheduled to be activated if the respective one of the threads is inactive.

39. The non-transitory computer-readable storage medium of claim 38, wherein each of the resume counter values is equal to a default value if the respective one of the threads that corresponds to the respective resume counter value is active.

40. The non-transitory computer-readable storage medium of claim 33, further comprising instructions that, when executed, cause one or more processors to:
set the second MINRC to a value indicative of a smallest resume counter value from the subset of the plurality of resume counter values.

* * * * *